(12) United States Patent
Treciokas

(10) Patent No.: US 12,263,782 B2
(45) Date of Patent: Apr. 1, 2025

(54) SYSTEM AND METHOD FOR MEASURING TAILGATE DISTANCE AND ACCELERATION IN VEHICLES

(71) Applicant: Michael Gytis Treciokas, Ottawa (CA)

(72) Inventor: Michael Gytis Treciokas, Ottawa (CA)

( * ) Notice: Subject to any disclaimer, the term of this patent is extended or adjusted under 35 U.S.C. 154(b) by 129 days.

(21) Appl. No.: 18/346,743

(22) Filed: Jul. 3, 2023

(65) Prior Publication Data
US 2024/0017666 A1   Jan. 18, 2024

Related U.S. Application Data

(60) Provisional application No. 63/367,681, filed on Jul. 5, 2022.

(51) Int. Cl.
| | |
|---|---|
| *B60Q 1/26* | (2006.01) |
| *B60K 35/215* | (2024.01) |
| *B60K 35/28* | (2024.01) |
| *B60K 35/81* | (2024.01) |

(52) U.S. Cl.
CPC .......... *B60Q 1/2696* (2013.01); *B60K 35/215* (2024.01); *B60K 35/28* (2024.01); *B60K 35/81* (2024.01); *B60K 2360/179* (2024.01); *B60K 2360/184* (2024.01); *B60K 2360/48* (2024.01)

(58) Field of Classification Search
CPC .... B60Q 1/2696; B60Q 1/381; B60Q 1/5037; B60Q 1/543; B60Q 1/535; B60Q 2900/40; B60K 35/215; B60K 35/28; B60K 35/81; B60K 2360/179; B60K 2360/184; B60K 2360/48
See application file for complete search history.

(56) References Cited

U.S. PATENT DOCUMENTS

| | | | | |
|---|---|---|---|---|
| 2007/0213924 | A1* | 9/2007 | Nagase | G08G 1/096861 701/414 |
| 2015/0307025 | A1* | 10/2015 | Hedley | B60Q 1/535 701/36 |
| 2023/0249614 | A1* | 8/2023 | Kim | B60Q 1/535 340/468 |

* cited by examiner

*Primary Examiner* — Omeed Alizada

(57) ABSTRACT

Microcontroller with firmware circuit measuring distance of car behind, Dcm in centimeters, 3-axis acceleration in g's, x-acceleration=axg, velocity in KPH, calculates tailgate with acceleration in car lengths being (Dcm/450.0)−((KPH*0.06214)*(1.0−(axg/SCALE))) and displays data on driver's 2×16 character LCD. At back, LED negative sign with 2×7 segment displaying measurement, with 2×16 segment displaying units. At back, left and right 30 LED+/− blue/yellow bargraph. Bargraph patterns on left 30 LED or 60 LED are, inside/outward, outside/inward, left/right turning, right/left. Right 30 LEDs are off or display left-right turning using y-accelerometer. LCD distance selectable in feet, meters, yards, for x-axis acceleration, tailgate with/without acceleration, pitch. Menuing data displayed. At back displaying yards, meters, acceleration, tailgate with/without acceleration. Pushbutton calibration for acceleration. Driver's menuing to be displayed on next power up uses Microcontroller EEPROM. Circuit powered by car battery.

25 Claims, 57 Drawing Sheets

PACKAGE DIMENSIONS

Notes:
1. All dimensions are in millimeters (inches), Tolerance is ±0.25(0.01")unless otherwise noted.
2. The specifications, characteristics and technical data described in the datasheet are subject to change without prior notice.

Unit: mm
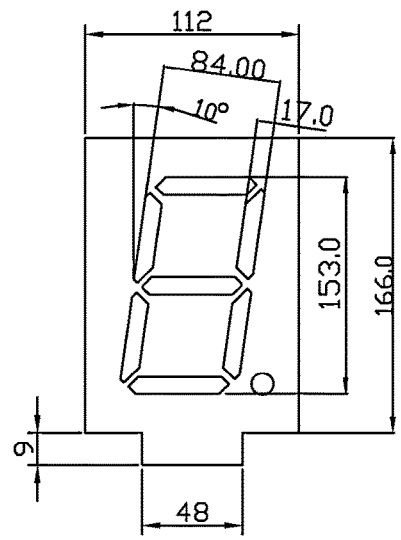
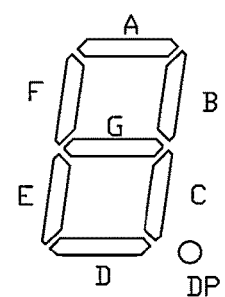
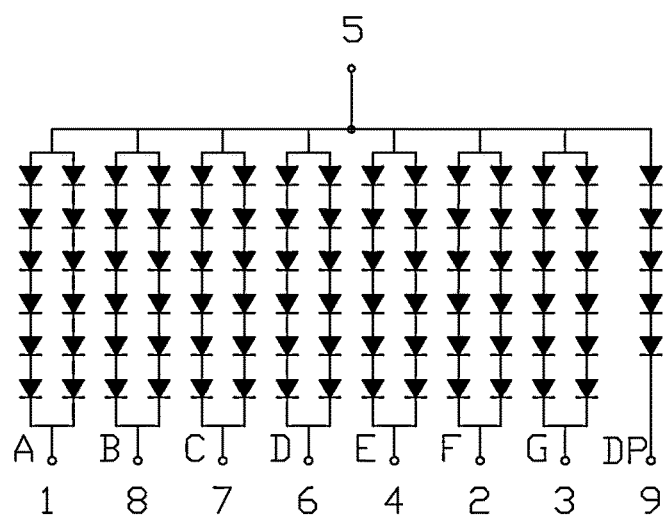
FIG. 32
(PRIOR ART)

FIG. 52  *SEE FIG. 57

| Message Number | LCD Display Message |
|---|---|
| MSG1 | LCD Displays Car Behind in Feet__ |
| MSG2 | LCD Displays Car Behind in Meters |
| MSG3 | LCD Displays Car Behind in Yards_ |
| MSG4 | LCD TG Tailgate_ w/o Acceleration |
| MSG5 | LCD TA Tailgate_ withAcceleration |
| MSG6 | 32LED In>Outward 32LED Lft-R Turn |
| MSG7 | 32LED In>Outward Right 32LED OFF_ |
| MSG8 | 32LED Out>Inward 32LED Lft-R Turn |
| MSG9 | 32LED Out>Inward Right 32LED OFF_ |
| MSG10 | 32LED Left>Right 32LED Lft-R Turn |
| MSG11 | 32LED Left>Right Right 32LED OFF_ |
| MSG12 | 32LED Right>Left 32LED Lft-R Turn |

| Continued Message Number | Continued LCD Display Message |
|---|---|
| MSG13 | 7SegTailgateWith Accel CarLengths |
| MSG14 | 32LED Right>Left Right 32LED OFF_ |
| MSG15 | 64LED In>Outward |
| MSG16 | 64LED Out>Inward |
| MSG17 | 64LED Left>Right |
| MSG18 | 64LED Right>Left |
| MSG19 | XXs Left32LED ON Right 32LED OFF_ |
| MSG20 | XXS Left32LED ON Right 32LED ON__ |
| MSG21 | 7Seg In Meters__ To Car Behind___ |
| MSG22 | 7Seg In Yards___ To Car Behind___ |
| MSG23 | 7SegAcceleration In +/-g Forward_ |
| MSG24 | 7Seg Tailgate__ in Car Lengths__ |
| MSG25 | Acceleration x=0 y=0 z=1 Calbrate |

SYSTEM AND METHOD FOR MEASURING TAILGATE DISTANCE AND ACCELERATION IN VEHICLES

CROSS REFERENCE TO RELATED APPLICATIONS

The following was filed as a provisional patent using material from myself, Michael Gytis Treciokas of Ottawa, Ontario, Canada. The provisional patent number is given below along with details.

U.S. 63/367,681 was filed on Jul. 5, 2022 with the title "MicroController with Firmware, Sensors for Car Displays Tailgate Severity/Cushion with Acceleration; Function of ax, Velocity and Distance of Car Behind into equation; ay for Swerve, az for Pitch, Car Driver Character Data Display, Rear Bargraph Patterns and Rear 7 Segment Displays Data". This present Utility patent document is a continuation of the mentioned provisional patent.

Also filed was U.S. 63/203,154 on Jul. 9, 2021 with the title "Vehicle or Car Driver Display and Rear Display for Distance, Velocity, (x,y,z) Acceleration and Pitch Sensors for Tailgate Severity, uses MCU with Firmware". And U.S. 63/038,811 on Jun. 13, 2020 with the title "Driver and Car Rear Display Distance, Velocity, Acceleration Sensors for Tailgate, Danger uses MCU". These expired provisional patents were also a continuation in part of the current utility patent.

The additions to the provisional patents mentioned that are in the utility patent was full readable schematics and an addition to the display at the back of the car to include a 2 character 16 segment display to display the units of the measurement number on the 2 digit 7 segment display run by a 40 in Microcontroller firmware. The three additional data lines needed to do this was taken from the 60 LED bargraph. One extra additional line for the minus sign was also taken from the 60 LED bargraph.

FEDERALLY SPONSORED RESEARCH AND DEVELOPMENT

Not Applicable

REFERENCE TO A "SEQUENCE LISTING"

Three text files Firmware.txt, Firmware2.txt and Firmware3.txt for main microcontroller, interface Redboard microcontroller and secondary microcontroller are downloaded to the USPTO website respectively.

PRIOR ART

Prior Art contained in this document on FIG. 31 and FIG. 32 for the large 7-segment display manufactured by CHINA YOUNG SUN LED TECHNOLOGY CO., LTD. part number YSD-1100AR7B-15 the pinout and size with segments is shown. And the large 16-segment display manufactured by Kingbright part number PSA23-11EWA the pinout and size with segments.

BACKGROUND OF THE INVENTION

Various measuring devices and warning devices and safety devices have been add to the car throughout the years. Headlights to see ahead. Tail lights for braking and revers. The horn to warn others of danger. And most recently blind spot checking and rear cameras. This utility patent adds a driver side instrument cluster and at the back of the car and a large digit and character display and dual colour bargraph. The instrument cluster warns the driver of the distance of the car behind and tailgate with or without acceleration along with acceleration in g's and angle of the car. The displays at the back can show one of distance in yard or meters acceleration in g's or tailgate with or without acceleration. Tailgate with and without acceleration is a new concept. The faster you travel, farther away the car behind can be safe. In other words the car behind has to be further away the faster you travel. If he is further way the tailgate reading is positive and if he is too close the tailgate reading is negative. Adding acceleration warns the driver that if the car decelerates quickly there it is less safe. This is reflexed in the tailgate with acceleration number in car length increasing more negative quickly. Acceleration has the opposite effect in that the acceleration in car lengths becomes more positive mean it is safer.

The present invention relates generally to car displays uses Microcontroller and sensors for tailgate with acceleration etc. and more specifically it relates to a MicroController with Firmware circuit calculates and displays tailgate with acceleration in car lengths given, sensors of 3-axis acceleration ax, velocity and distance of car behind, on drivers character display and rear minus sign with 2 digit measurement and 2 character units and rear 60 LED 2 colour for plus/minus bargraph with 8 patterns; ay for left/right turning, az for pitch. The car driver's LCD Display and for the car behind the LED bargraph and digital LED displays warns of dangerous situation like tailgating with acceleration, run by a microcontroller, connected to distance, velocity and acceleration sensors. The system displays and warns the driver behind of tailgating with and without acceleration, distance to the car in front, and acceleration of the car in front. And the driver's display displays and warns of distance to the car in behind, including tailgating with and without acceleration, acceleration itself and the pitch of his car.

BRIEF SUMMARY OF THE INVENTION

The invention generally relates to a car driver and rear display to warn of tailgates which includes the following. The MicroController is connected to A Distance Measuring Sensor, an accelerometer module and velocity from the car's OBD-II system, Firmware Drivers for each are on the microcontroller. The Data from these sensors is collected. The data output to the rear displays is selected using two pushbutton switches. The Driver's LCD displays everything but velocity. The Car Battery that powers two Voltage Regulators. One for the LED Display and the other for the rest of the circuitry.

There has thus been outlined, rather broadly, some of the features of the invention in order that the detailed description thereof may be better understood, and in order that the present contribution to the art may be better appreciated. There are additional features of the invention that will be described hereinafter.

In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

An object is to provide a MicroController with Firmware circuit calculates and displays tailgate with acceleration in car lengths given, sensors of 3-axis acceleration ax, velocity and distance of car behind, on drivers character display and rear minus sign with 2 digit measurement and 2 character units and rear 60 LED 2 colour for plus/minus bargraph with 8 patterns; ay for left/right turning, az for pitch; run by a microcontroller connected to distance, velocity and acceleration sensors. This is for the car driver's LCD Display and rear window LED bargraph and digital LED displays for the driver behind warns of dangerous situation like tailgating with acceleration.

Another object is to provide A MicroController with Firmware circuit calculates and displays tailgate with acceleration in car lengths given, sensors of 3-axis acceleration ax, velocity and distance of car behind, on drivers character display and rear minus sign with 2 digit measurement and 2 character units and rear 60 LED 2 colour for plus/minus bargraph with 8 patterns; ay for left/right turning, az for pitch, uses a microcontroller with Firmware, that uses the accelerometer in g's in the Axg, Ayg and Azg directions, car velocity in km/hr or KPH and distance between the driver's car and the car behind in centimeters Dcm giving the equation Tailgate in car lengths.

$$TGwAinCL = (Dcm/450.0) - ((KPH \times 0.6214)/10.0) \times (1.0 + (-Axg/SCALE))) \quad (1)$$

450.0 is the number of centimeters for one car length.
0.6214 converts KPH to MPH (Kilometer per hour to Miles per hour)
10.0 divides MPH to give car lengths for that velocity
SCALE depends on the maximum value of Axg Another object is to provide A MicroController with Firmware circuit calculates and displays tailgate with acceleration in car lengths given, sensors of 3-axis acceleration ax, velocity and distance of car behind, on drivers character display and rear minus sign with 2 digit measurement and 2 character units and rear 60 LED 2 colour for plus/minus bargraph with 8 patterns; ay for left/right turning, az for pitch, that has a UART LCD 2-line by 16-character display with associated firmware, to display to the driver, distance to the car behind, acceleration and tailgating with or without acceleration.

Another object is to provide A MicroController with Firmware circuit calculates and displays tailgate with acceleration in car lengths given, sensors of 3-axis acceleration ax, velocity and distance of car behind, on drivers character display and rear minus sign with 2 digit measurement and 2 character units and rear 60 LED 2 colour for plus/minus bargraph with 8 patterns; ay for left/right turning, az for pitch, that has two pairs of 30 superbright LEDs in a bargraph configuration with associated circuitry.

Another object is to provide a MicroController with Firmware circuit calculates and displays tailgate with acceleration in car lengths given, sensors of 3-axis acceleration ax, velocity and distance of car behind, on drivers character display and rear minus sign with 2 digit measurement and 2 character units and rear 60 LED 2 colour for plus/minus bargraph with 8 patterns; ay for left/right turning, az for pitch, that has a large two 7 segment LED digit display at the back with circuitry to display distance to the car behind, acceleration and tailgate with and without acceleration. A large two 16 segment LED character display at the back with circuitry to display unit of meters, yards, g's and car lengths. A four LED minus sign that turns on for negative data like acceleration, tailgate and tailgate with acceleration.

Another object is to provide A MicroController with Firmware circuit calculates and displays tailgate with acceleration in car lengths given, sensors of 3-axis acceleration ax, velocity and distance of car behind, on drivers character display and rear minus sign with 2 digit measurement and 2 character units and rear 60 LED 2 colour for plus/minus bargraph with 8 patterns; ay for left/right turning, az for pitch, to process and send the acceleration, velocity and distance data and calculated tailgate with and without acceleration to the LED minus sign, 7 segment LED, 16 segment LED, LCD character and bargraph LED displays.

Another object is to provide A MicroController with Firmware circuit calculates and displays tailgate with acceleration in car lengths given, sensors of 3-axis acceleration ax, velocity and distance of car behind, on drivers character display and rear minus sign with 2 digit measurement and 2 character units and rear 60 LED 2 colour for plus/minus bargraph with 8 patterns; ay for left/right turning, az for pitch, that can be powered by the car battery and turned on by the ignition switch.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

Abbreviations Used

BJT Bipolar Junction Transistor
MCU MicroController Unit
IC Integrated Circuit
OBD-II On-Board Diagnostic II
LED Light Emitting Diode
LCD Liquid Crystal Display
EEPROM Electrically Erasable Read Only Memory
UART Universal Asynchronous Receiver Transmitter
BCD Binary Coded Decimal
I2C Inter-Integrated Circuits Protocol
SPI Serial Peripheral Interface
Baud Bits per Second
Tx Transmit
Rx Receive
SDA, Serial Data for I2C Protocol
SCL Serial Clock for I2C Protocol
KPH Kilometers per Hour
MPH Miles per Hour

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 32 is a diagram of Prior Art from the data sheet of the 6.5 inch 7-segment display with sizing and its pinout FIG. 57 is a table showing LCD character messages for use with the flowcharts

DETAILED DESCRIPTION OF THE INVENTION

Overview

Figure 1:
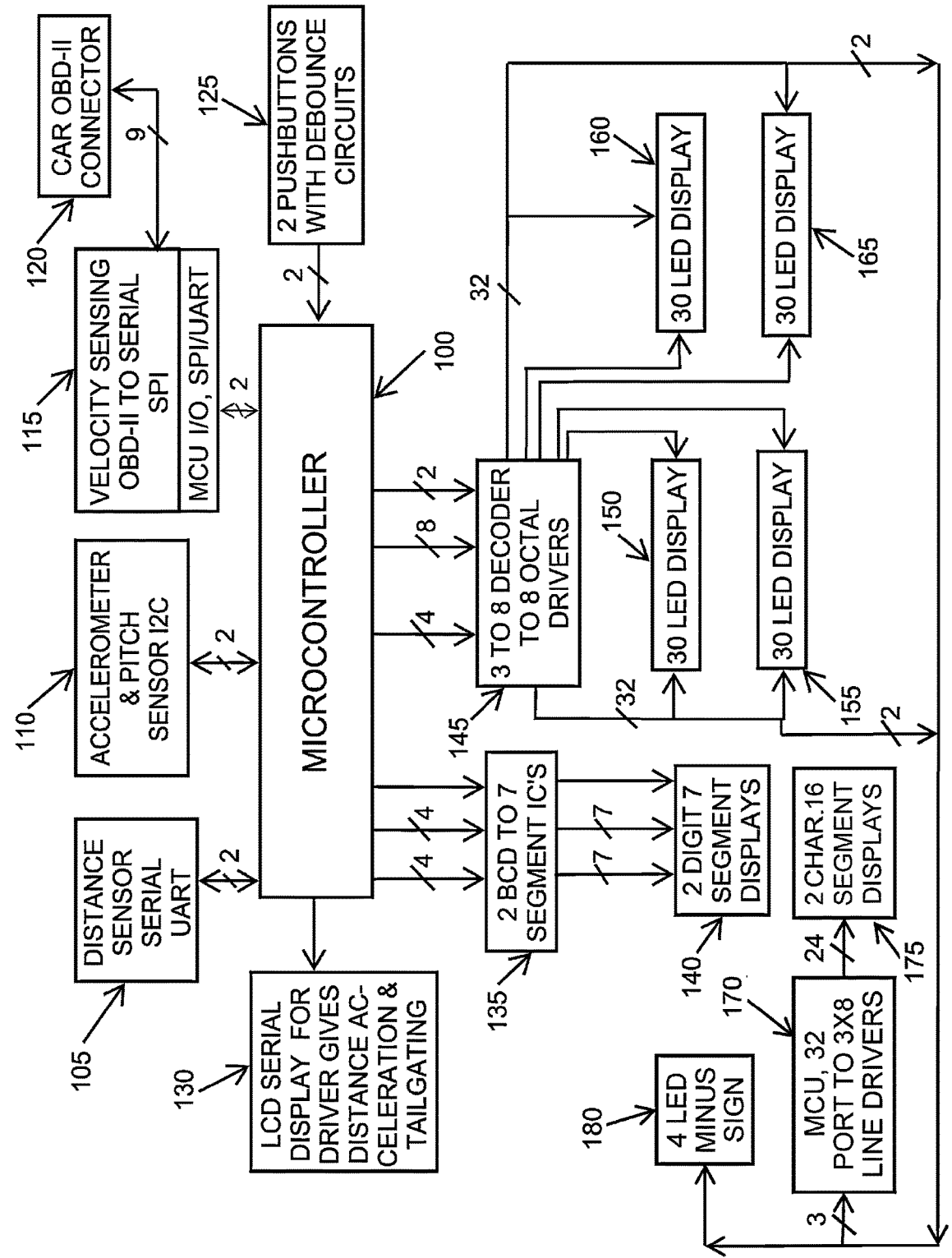
FIG. 1 is a block diagram representing the complete system.

Turning now descriptively to the drawings, in which similar reference characters denote similar elements throughout the several views, the figures illustrate The Car Battery powers two voltage regulators. One for the LED Digital Display and the other for the rest of the circuit. A Distance Measuring Sensor, an accelerometer module and velocity from the car's OBD-II system is connected to the microcontroller. Firmware Drivers for each are on the microcontroller. The Data from these sensors is collected. The data output to the displays is selected using two pushbutton switches, one for the rear digital LED 7 segment and 16 segment display and one for the rear analog LED bargraph display. The microcontroller's EEPROM holds the switch selections after power down. The Distance, Acceleration Data, Pitch and a Tailgate Monitor is also displayed to the upfront driver on an LCD Display.

FIG. 1 shows the car display warning system. 100 is the microcontroller that accepts sensor data and sends display information to the three displays. The Distance Sensor 105 provides distance, to the car behind, data up to 22 m using a UART and runs off of 5V. The Acceleration Sensor 110 provides acceleration and pitch data using an I2C two-line protocol and runs off of 5V. 120 The OBD-II connector is connected to the car's OBD-II system. It can provide velocity data, using 115 the OBD-II to serial board. It's UART in conjunction with the MCU communicates to ask for and get velocity data from the car's OBD-II system. The two pushbuttons 125 have debounce circuits to provide a steady ON when the pushbutton switch is pushed. These pushbutton switches are used for calibration, selection of what data is displayed and what bargraph pattern is used. The Serial LCD character Display 130 uses a software serial transmitter (TX) only. The UART from the MCU. It is placed by the instrument cluster and gives distance to the car behind, acceleration and if a tailgate from behind occurs and the severity of the tailgate with blinking. The BCD to 7 segment 135 accepts two pairs of 4 digital lines. Each one of the pair gives the number in binary to be displayed in decimal. For each of the two numbers, 7 lines are output that would display the number on the 7 segment displays 140. The decimal point is one line, from the MCU, that goes to a BJT transistor which drives the center decimal point to turn on when the number is in the format X.X instead of XX. The circuitry of 145 has a 3 to 8 decoder, where three lines plus the gate, select one of eight octal drivers. The 8 bits from the MCU go through a driver chip and are connected to the eight octal drivers. Four octal drivers provide 4×8=32 superbright LEDs 150 and 155. The other four octal drivers provide 32 superbright LEDs to 160 and 165. But four lines are used for data to the secondary MCU, 32 port 170 and minus sign 180. The superbright LED Banks work in pairs. For the pair only one of the two is ON. Two lines from the MCU or one line for each pair. When 150 ON then 155 is OFF. When 150 OFF then 155 is ON. And when 160 is ON then 165 is OFF. And when 160 is OFF then 165 is ON. For the LEDs different bargraph patterns can be displayed with different colors. The 3 inputs to the secondary MCU 170 produce 24 output lines that go through three 8 line drivers. These driver lines go to the 2 digit or character 16 segment displays 175. This displays the units and along with the minus sign 180 for the 7 segment measurement number 140.

Microcontroller Accepts Data FIG. 2, FIG. 3, FIG. 7, FIG. 29

In this embodiment, The Microcontroller U1 accepts the Distance Measuring Sensor Data J7 thru Tx/Rx UART. And accepts the Accelerometer data J5 thru I2C. And accepts the car velocity data thru the OBD-II to SPI CAN board and then into a small interface MCU TX/RX UART and then when polled, out through a UART J8 to the main microcontroller. Firmware Drivers decode the sensor interface and gather data.

Other embodiments would comprise of variations of the main embodiment. Other Microcontrollers could be used. A lower FLASH firmware programing size of the same architecture. Or if the OBD-II can access velocity, acceleration and distance from the OBD-II to serial board. Or another OBD-II PCB with CAN that outputs to a small interface MCU then outputs UART to the main MCU. One could use different FLASH and EEPROM. Or a PIC or AVR Microcontroller could be used with large pin count or selectable FLASH.

Figure 7:
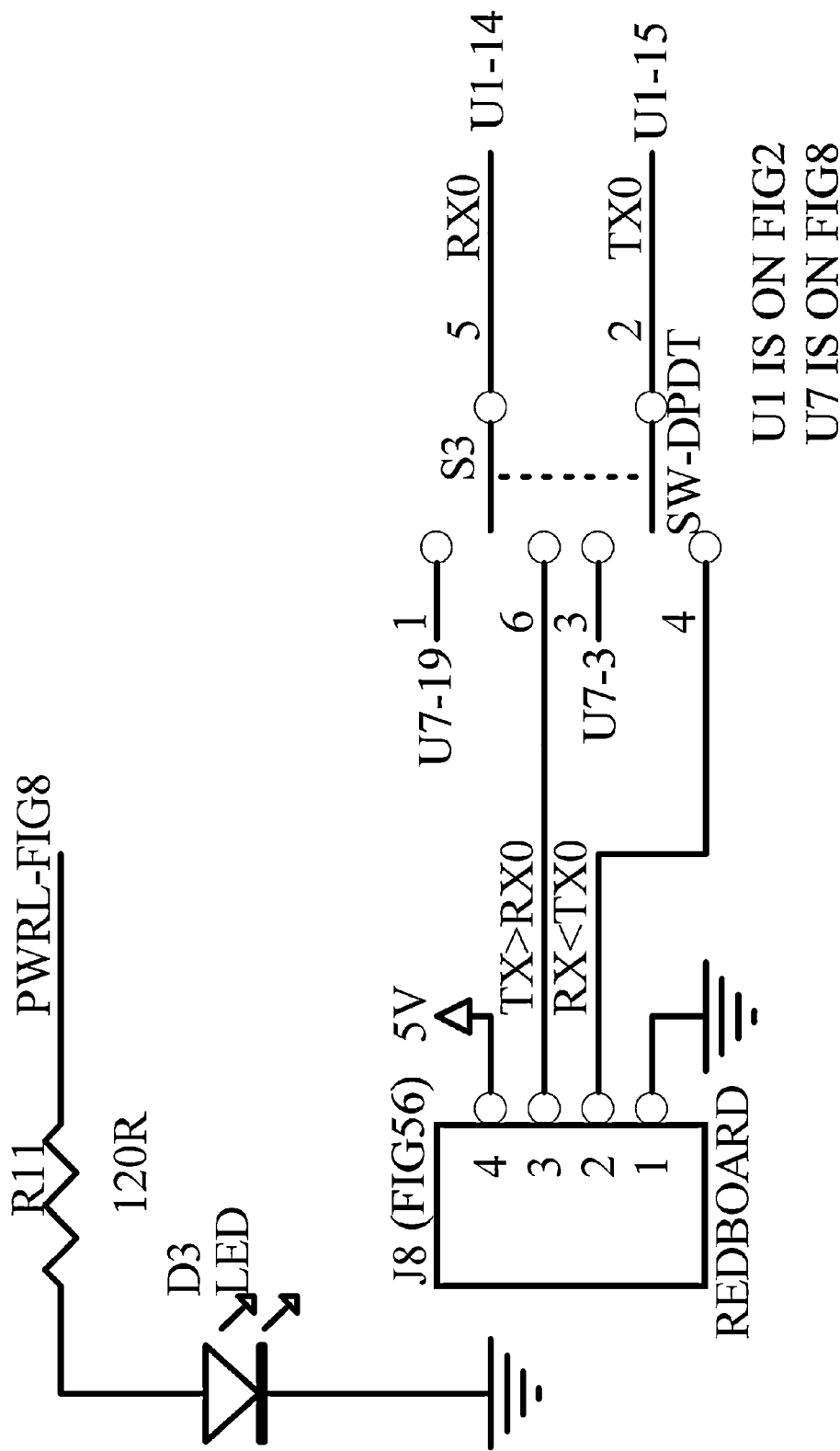
FIG. 7 is a circuit diagram of the schematic of the switch between the USB to UART programmer and the OBD-II interface MCU and the power up LED
Figure 30:
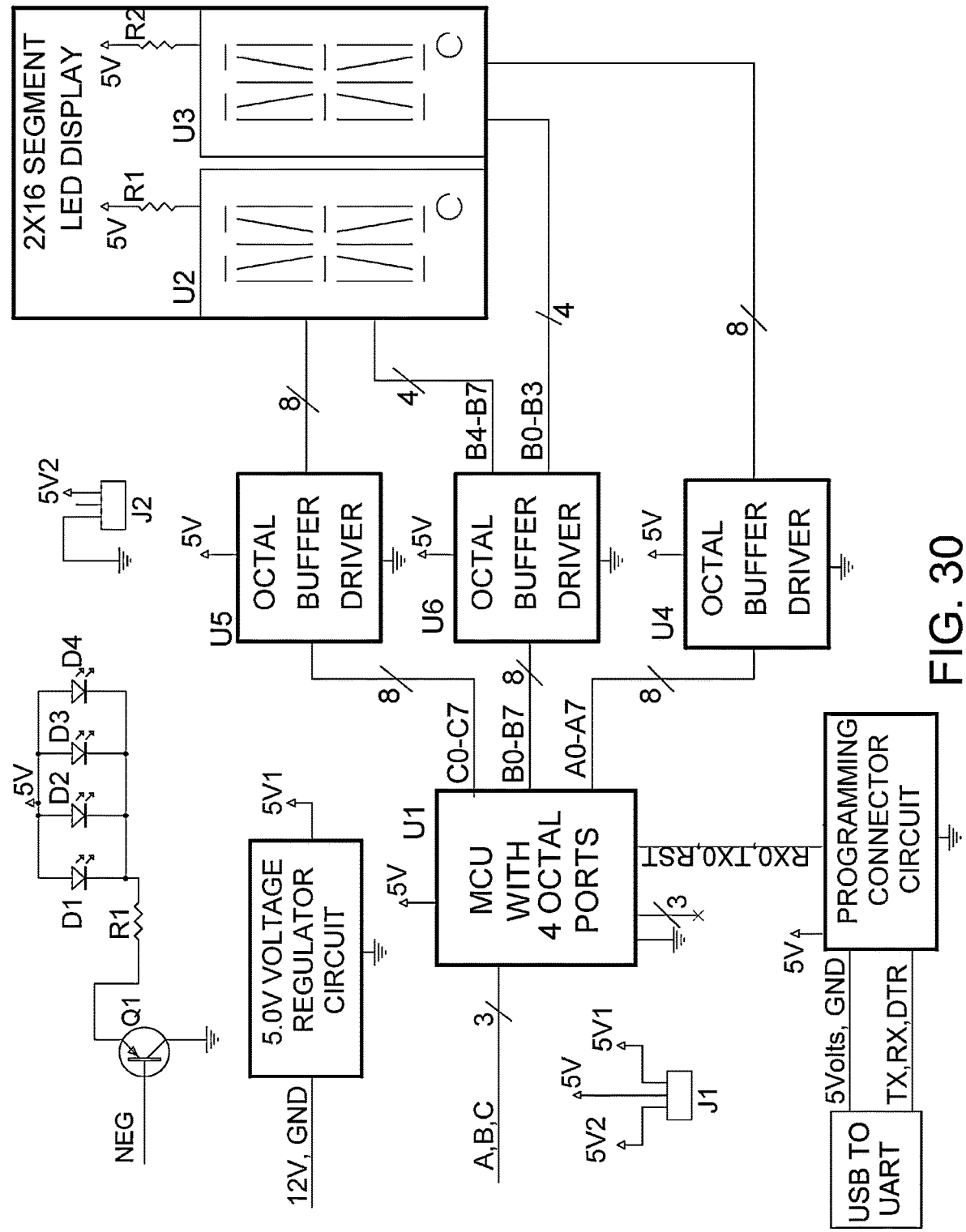
FIG. 30 is a circuit diagram of the schematic of the secondary microcontroller connected to three 8 line drivers going to 2 16 segment displays showing units of measure

Velocity Sensor on Car's OBD-II System FIG. 7, FIG. 30

The velocity on OBD-II system's car sensor has been put first, because it can be used for other embodiments with acceleration and distance. In this embodiment, the velocity sensor data is taken from the car's OBD-II system.

The CAN-BUS Shield provides your Arduino or Redboard with CAN-BUS capabilities and allows you to hack your vehicle. This shield allows you to poll the ECU for information including coolant temperature, throttle position, vehicle speed, and engine rpms. You can also store this data or output it to a screen to make an in-dash project. It uses the Microchip MCP2515 CAN controller with the MCP2551 CAN transceiver. CAN connection is via a standard 9-way sub-D for use with OBD-II cable. Ideal for automotive CAN application. The Redboard UART runs at 9600 baud sending data to the microcontroller.

CAN v2.0B up to 1 Mb/s

High speed SPI Interface (10 MHz)

Standard and extended data and remote frames

CAN connection via standard 9-way sub-D connector

A special OBD-II to DB9 cable is connected between the car's OBD-II and to the DB9 of the OBD-II to SPI. The SPI data from the board 5630 is connected a interface MCU 5620. The main MCU of the MCUPCB 5610 polls the interface MCU for velocity in KPH and collects data from its UART. MCUPCB Firmware collects the velocity data from the OBD-II sensor through the interface MCU.

Other embodiments would comprise of variations of the main embodiment. Other OBD-II to Serial UART boards could be used that is converted to a different interface protocol like I2C, SPI, Analog or UART at a different baud rate.

Figure 2:
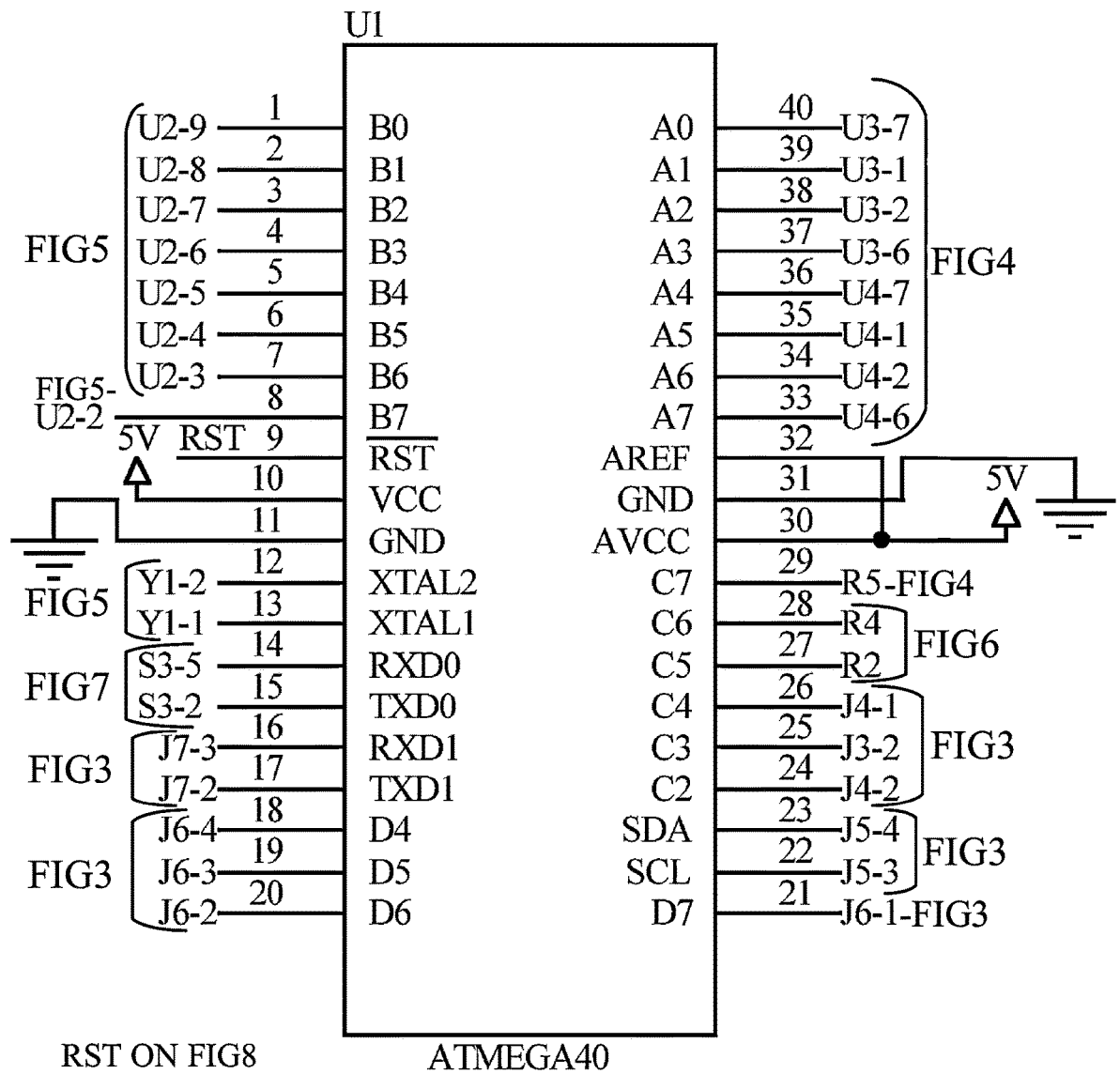
FIG. 2 is a circuit diagram representing the Microcontroller connected to IC pins it controls on MCUPCB.
Figure 3:
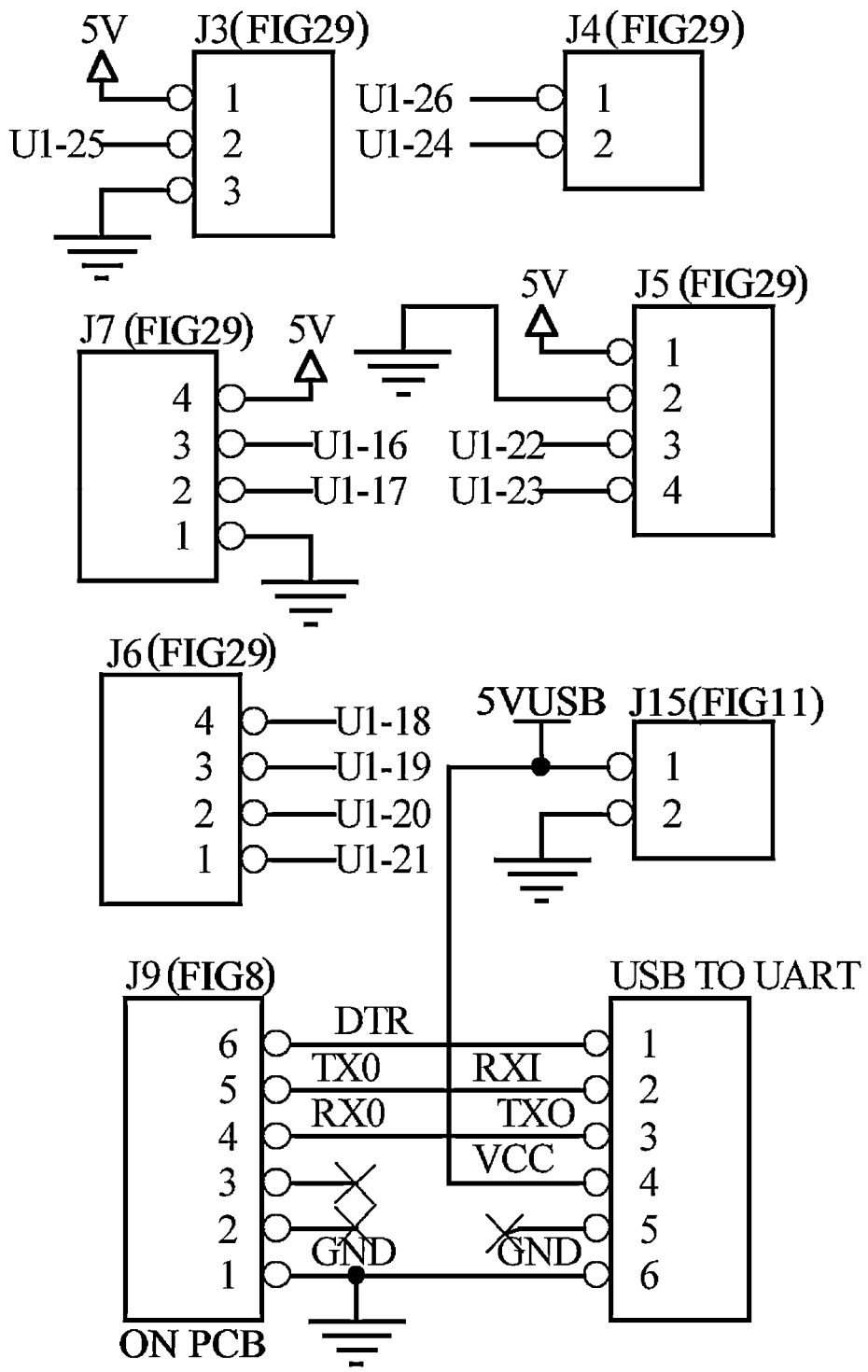
FIG. 3 is a circuit diagram representing headers connected to IC pins on MCUPCB.
Figure 29:
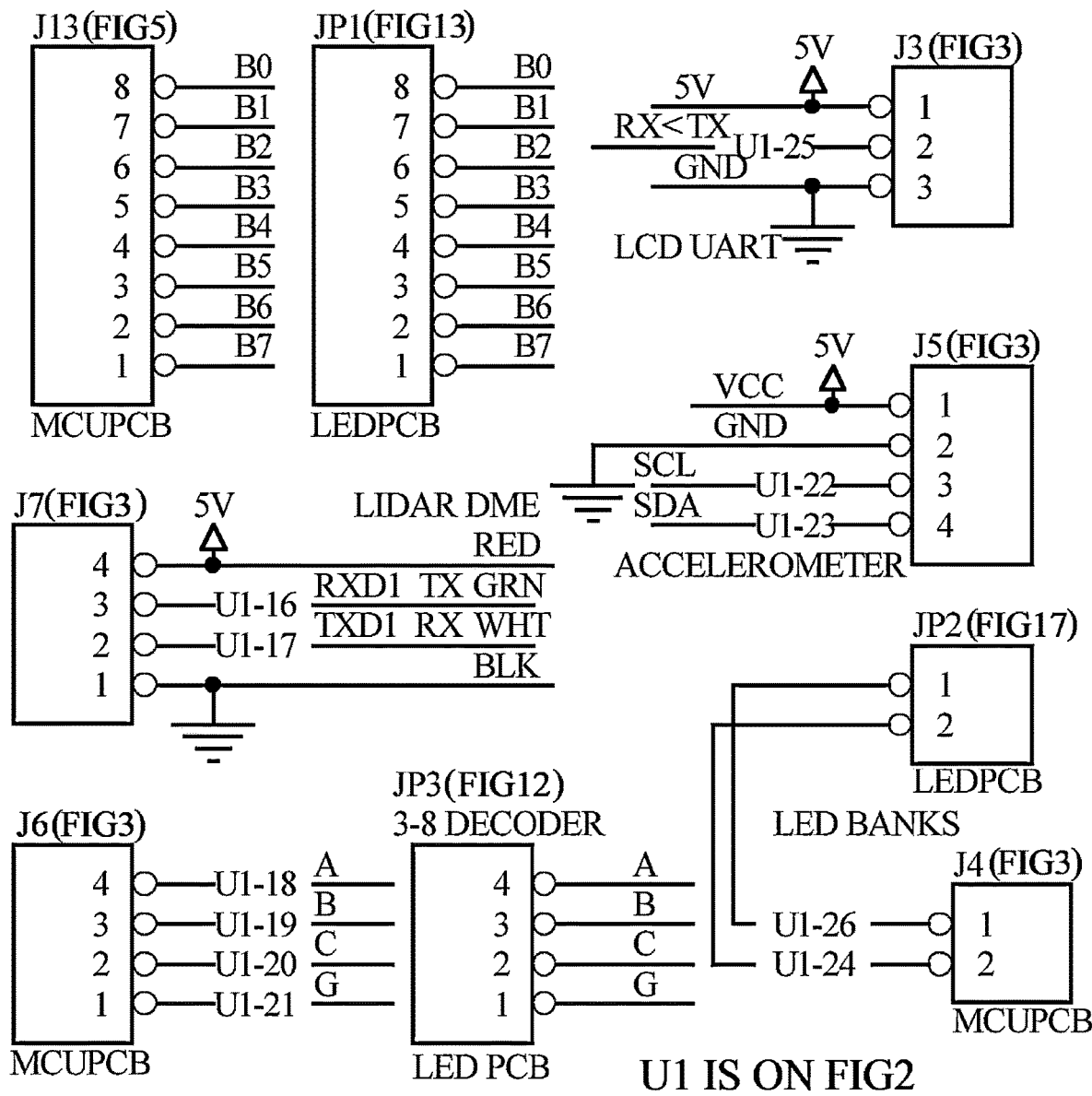
FIG. 29 is a circuit diagram of the schematic of the sensor headers on MCUPCB and the headers connections between the MCUPCB and the LEDPCB to have the LED array work

Distance Measuring Sensor FIG. 2, FIG. 3, FIG. 29

In this embodiment, The Distance Measuring Sensor J7 connector has a 5V supply and a Transmitting and Receiving UART interface. It runs at 115200 baud. It is an infrared sensor that can measure up to 40 meters. The UART interface connects to the ATMega microcontroller's TX1/RX1 pins. Firmware collects data from the sensor.

Other embodiments would comprise of variations of the main embodiment. Other Distance Measuring Sensors could be used. They could have a different interface protocol like I2C, SPI, Analog or UART at a different baud rate. Instead of infrared, ultrasonic could be used but it wouldn't be as good. Other sensors that don't have a measuring distance of 40 m could be used, like lower than 40 m and higher than 40 m.

Another embodiment would use the OBD-II connector and the OBD-II to Serial board. This board is the same one used for velocity. The master Microcontroller could request distance data for the car behind using the OBD-II system and a interface MCU. This would work for newer cars that have this data.

Accelerometer Module FIG. 2, FIG. 3, FIG. 29

In this embodiment, The Accelerometer Module J5 connector requires a 5V supply and has an SDA, SCL, I2C interface. using the 400 kHz fast I2C mode. Along with an X/Y/Z accelerometer the module has an angular speed or gyroscope in the X/Y/Z direction. The I2C interface connects to the ATMega microcontroller's I2C lines. Firmware collects the data from the sensor that can be zero calibrated. This embodiment uses the X/Y/Z accelerometer and X/Y/Z gyroscope readings. The accelerometer reading are used in calculations and displayed. Gyroscope reading were only displayed on the serial monitor.

Other embodiments would comprise of variations, of the main embodiment. Other Accelerometers without all the additional data could be used. They could have a different interface protocol like, SPI, Analog or UART. Or have less sensing capability. Another embodiment would use the OBD-II connector and the OBD-II to Serial board. This board is the same one used for velocity. The MCU could request acceleration and pitch data from the car's OBD-II system. This would work for newer cars that have this data.

Figure 6:
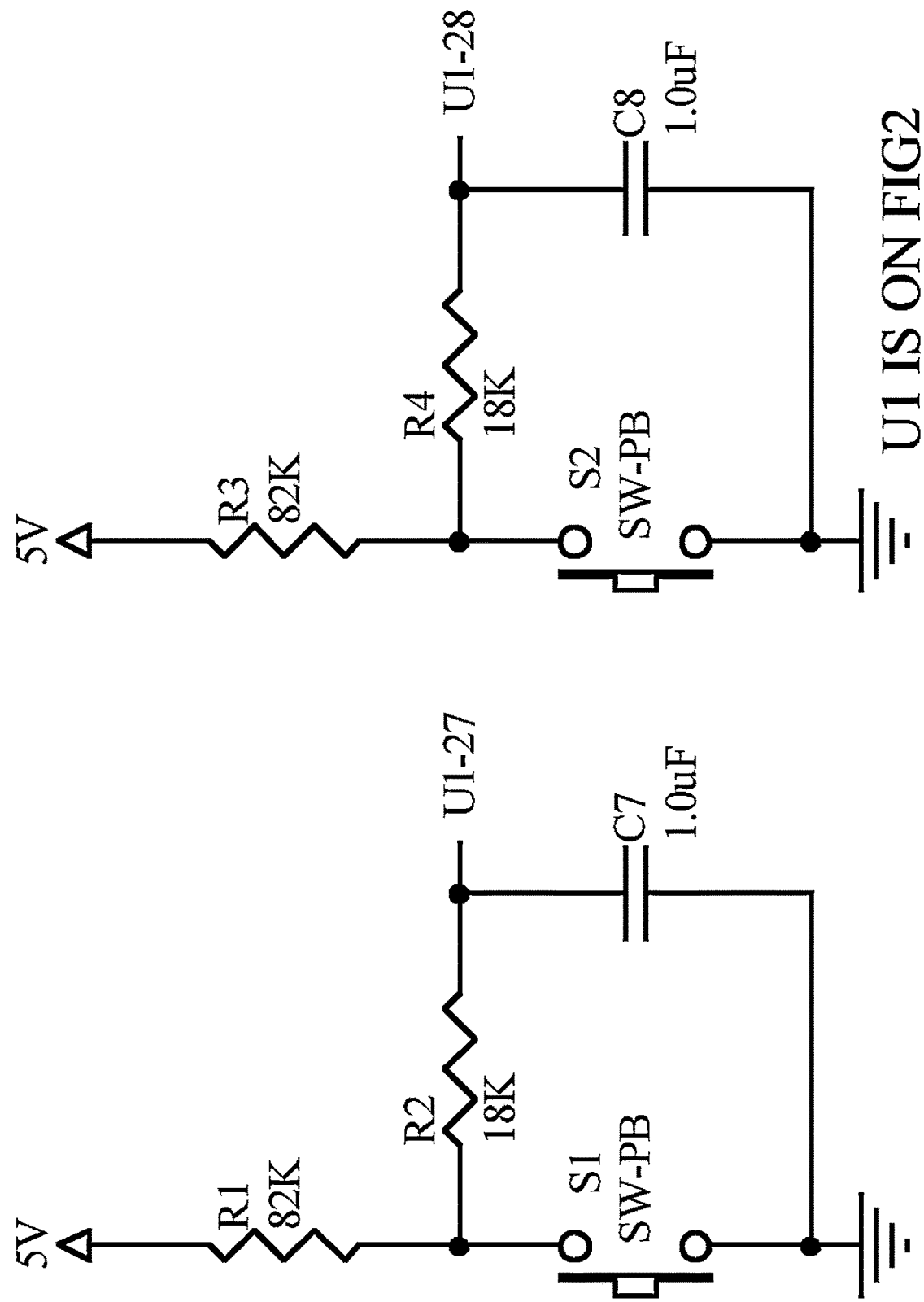
FIG. 6 is a circuit diagram of the two push button debounce schematics

Data Selection FIG. 2, FIG. 6

In this embodiment, Data selection is accomplished through normally open circuit pushbuttons. The pushbutton S1 selects between distance in meters or yards, acceleration, tailgate and tailgate with acceleration for the LED 7-segment and LED 16 segment display and the bargraph display both in the back of the car.

When push button S2 is pushed, the selected bargraph pattern is chosen. There is Inside/Outward, Outside/Inward. Left/Right, Right/Left on the left pair of 30 LED bank or on the two pair of 60 LED banks, FIG. 40, FIG. 30.

Figure 50:
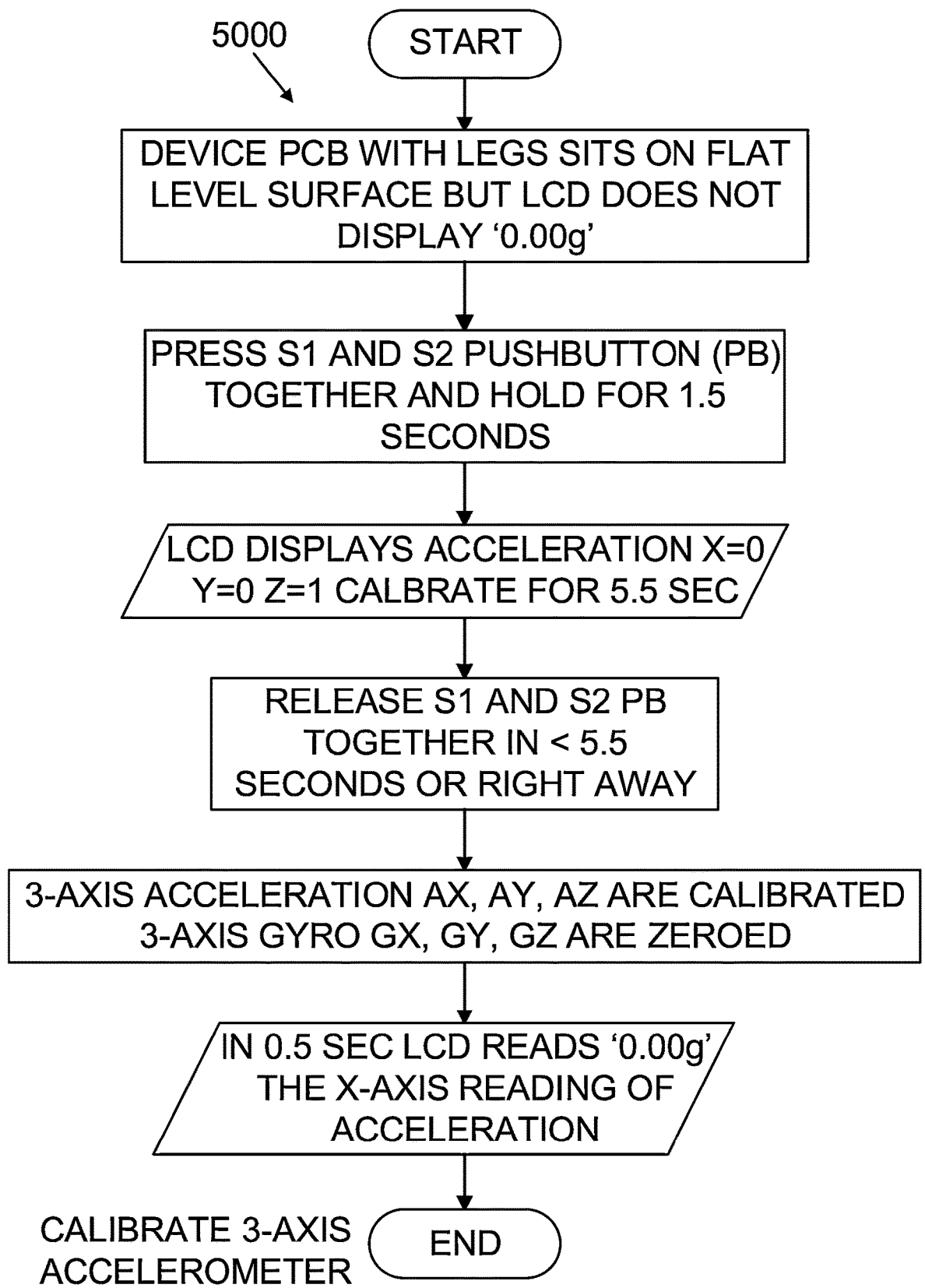
FIG. 50 is a flow chart when pushing S1 and S2 together for the first hold then acceleration ax, ay, az and gyroscope gx, gy, gz are zeroed CALIBRATE 3-AXIS ACCELEROMETER

Holding down both pushbuttons for a short time calibrates X/Y/X acceleration and X/Y/Z gyroscope, FIG. 50, FIG. 30.

Figure 33:
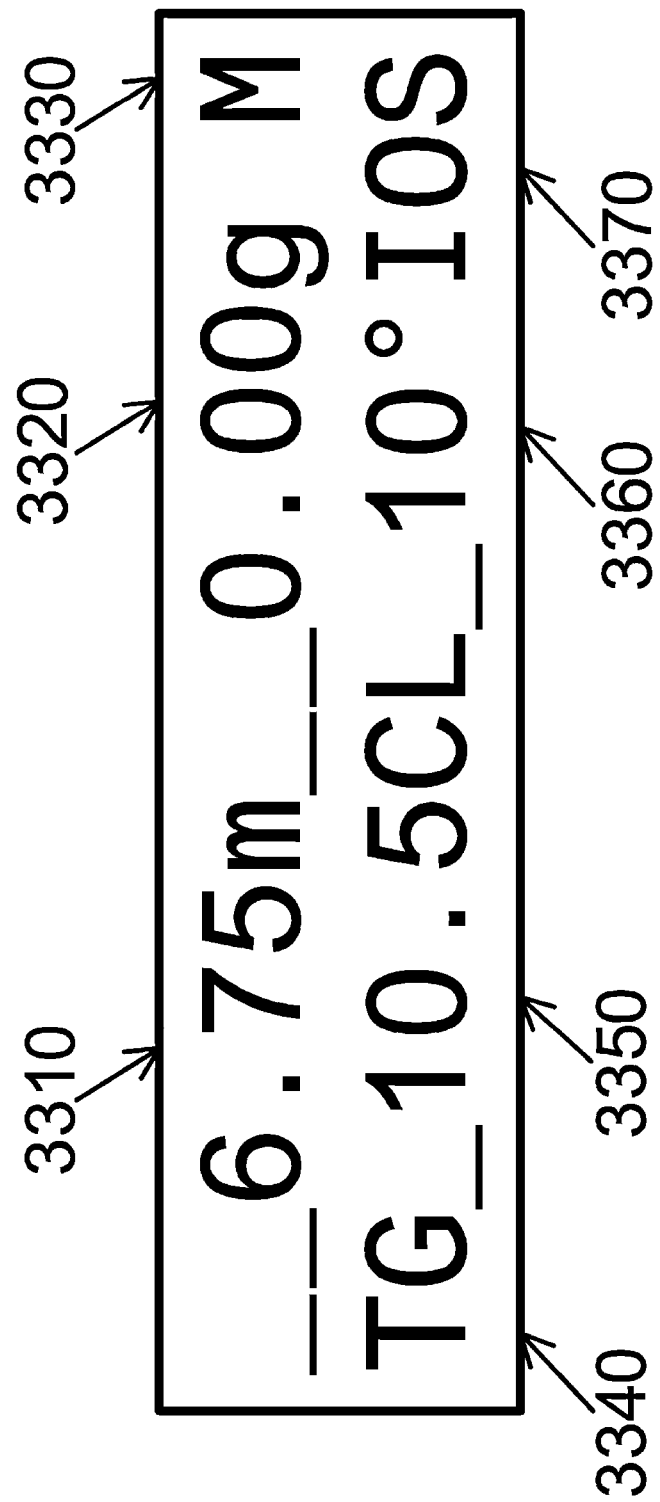
FIG. 33 is a diagram of the LCD display with data displayed and pushbutton menuing
Figure 34:
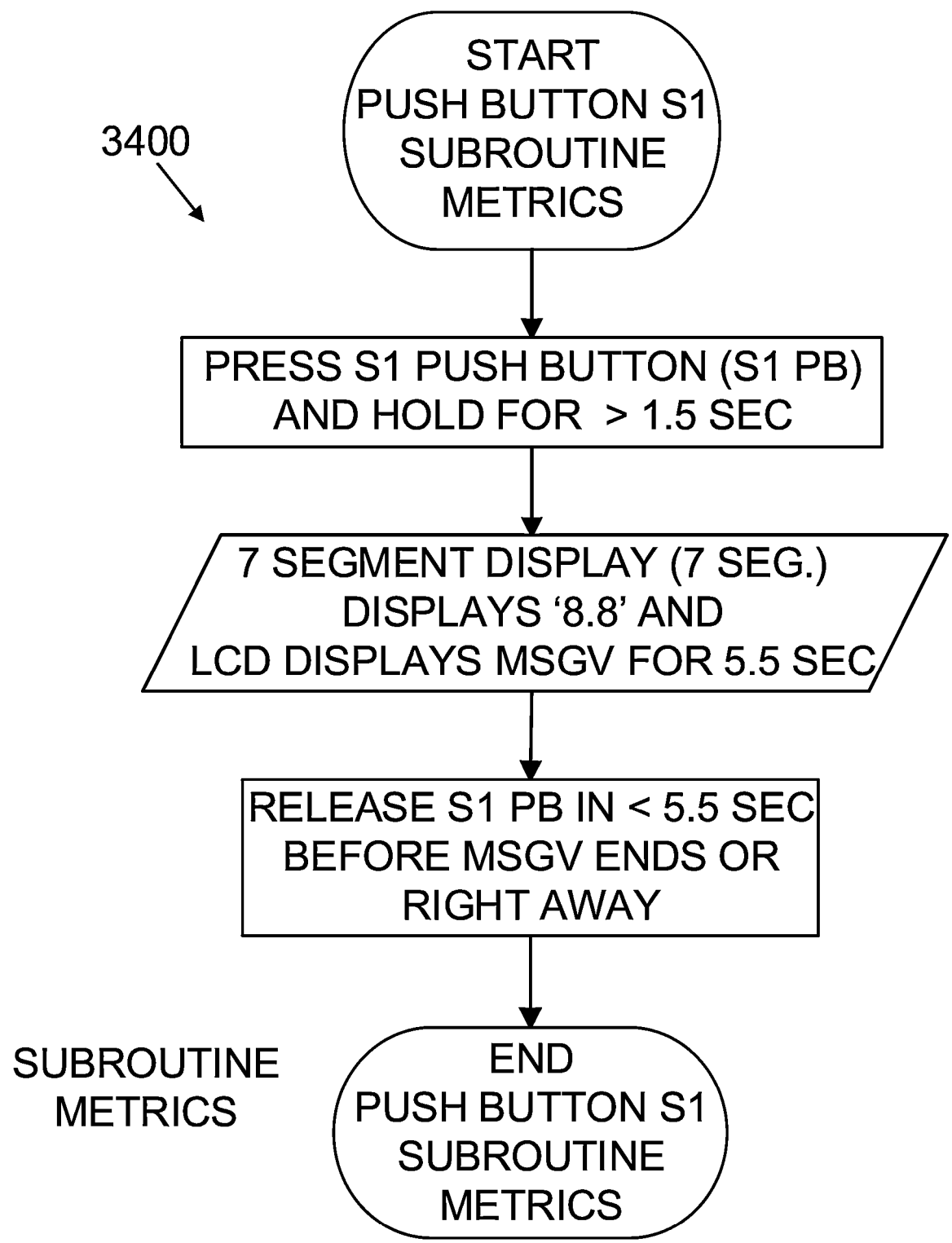
FIG. 34 is a flow chart of the subroutine called Metrics to hold down pushbutton S1 to change data to be displayed on the 7-segment display and LED bargraph
Figure 35:
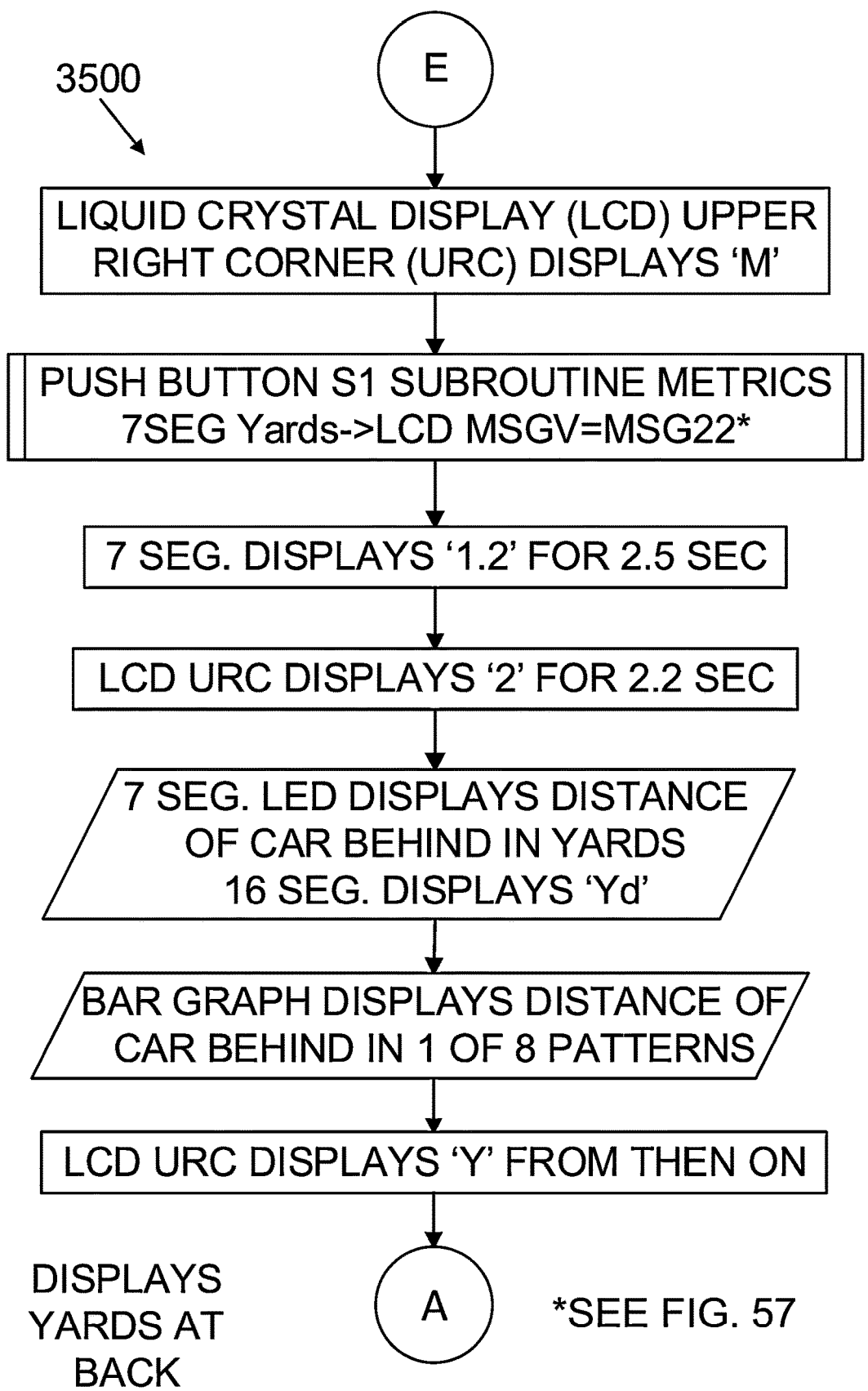
FIG. 35 is a flow chart when pushing S1 changes data displayed at rear to distance of car behind in yards (Y) DISPLAYS YARDS AT BACK
Figure 36:
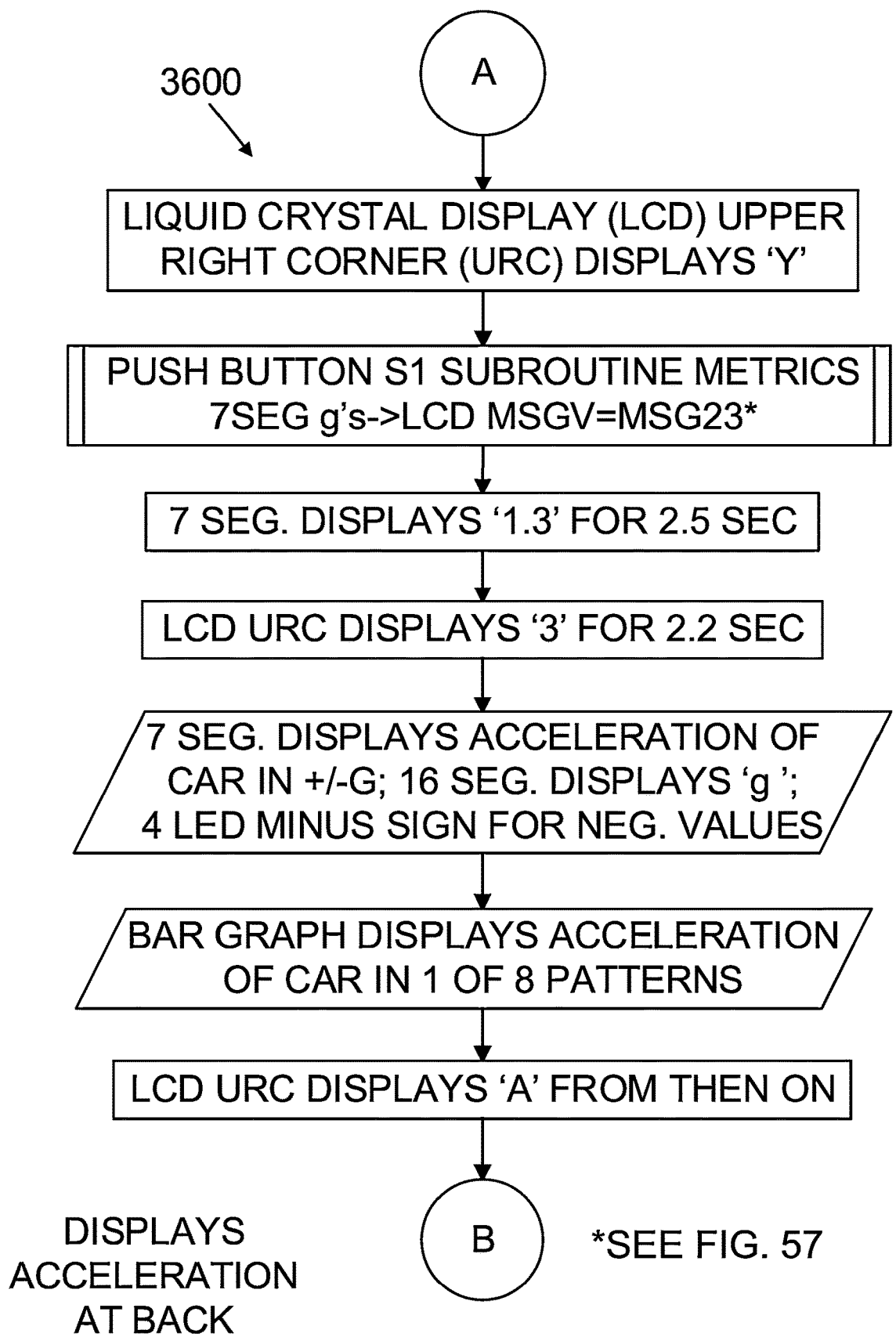
FIG. 36 is a flow chart when pushing S1 changes data displayed at rear to acceleration (A) DISPLAYS ACCELERATION AT BACK
Figure 37:
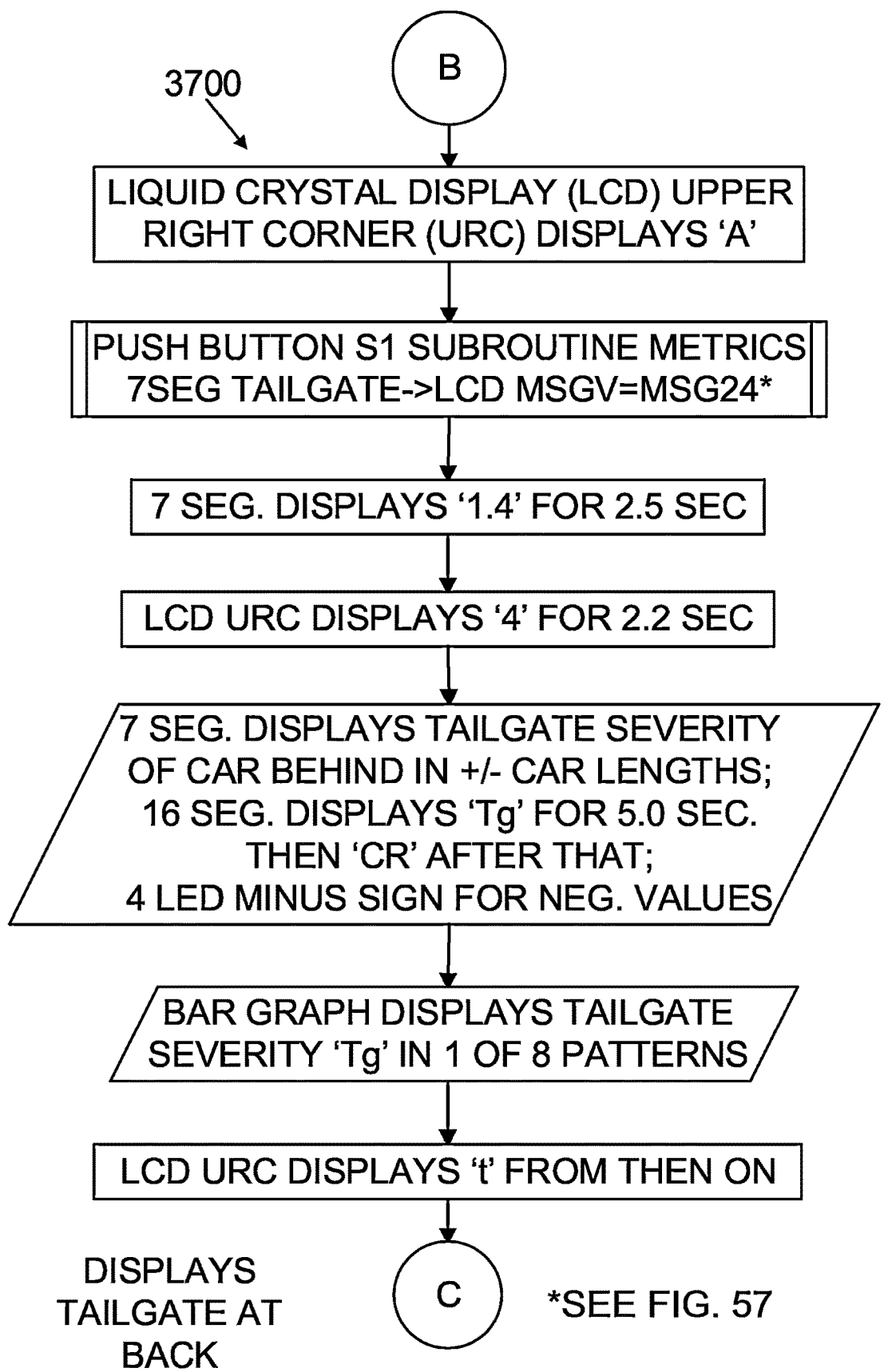
FIG. 37 is a flow chart when pushing S1 changes data displayed at rear to tailgate severity (t) DISPLAYS TAILGATE AT BACK
Figure 38:
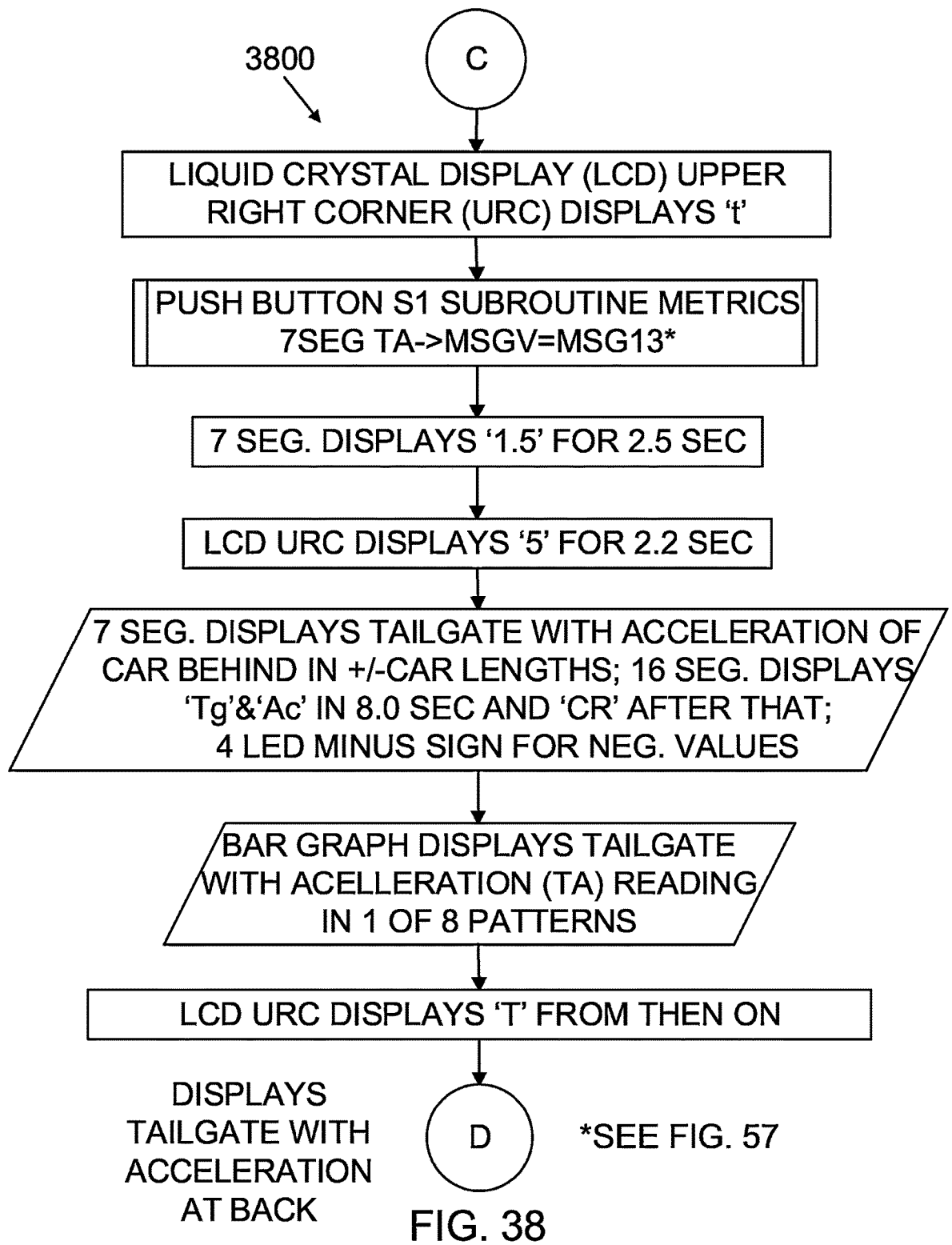
FIG. 38 is a flow chart when pushing S1 changes data displayed at rear tailgate with acceleration (T) DISPLAYS TAILGATE WITH ACCELERATION AT BACK
Figure 39:
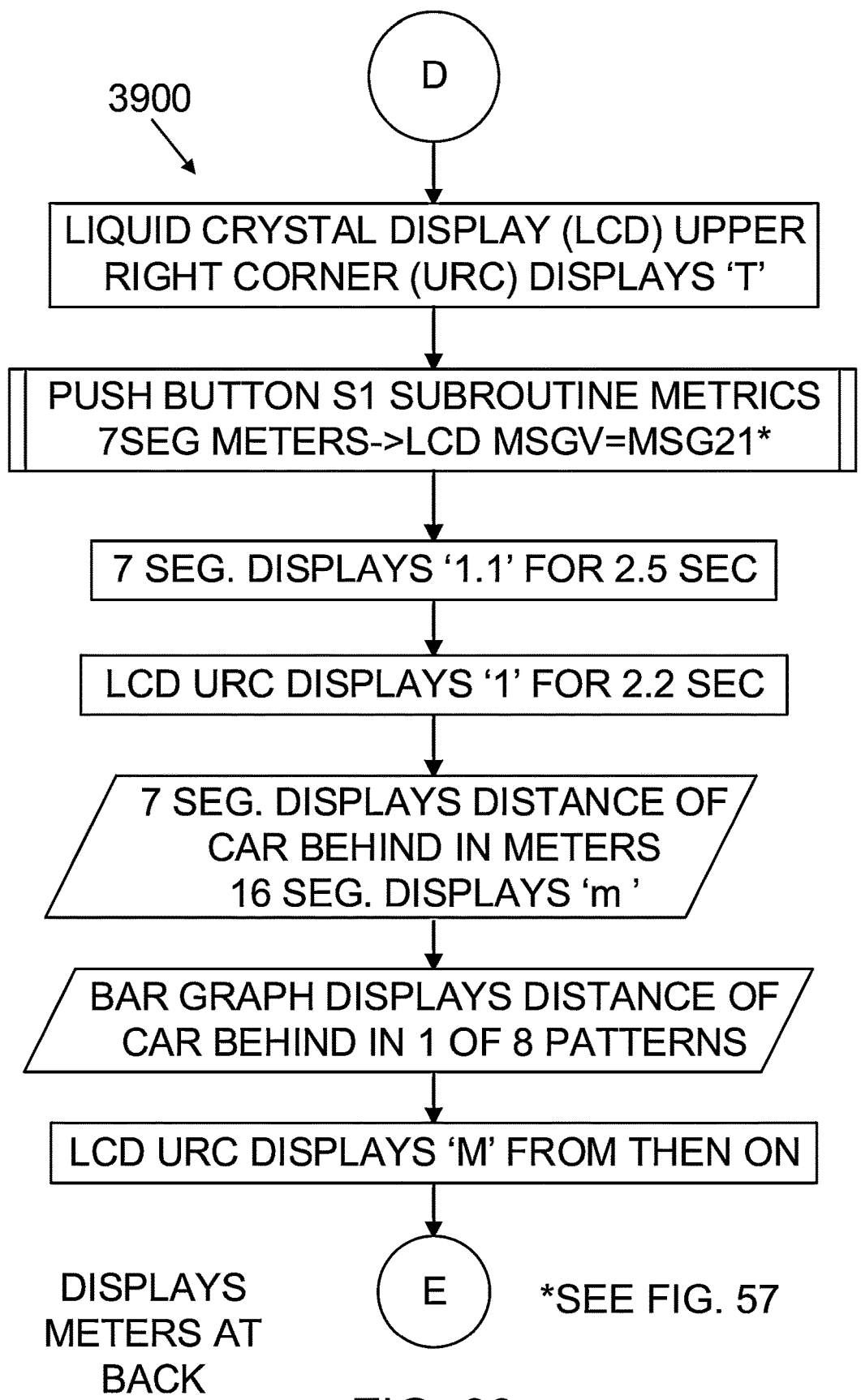
FIG. 39 is a flow chart when pushing S1 changes data displayed at rear to distance of car behind in meters (M) DISPLAYS METERS AT BACK
Figure 51:
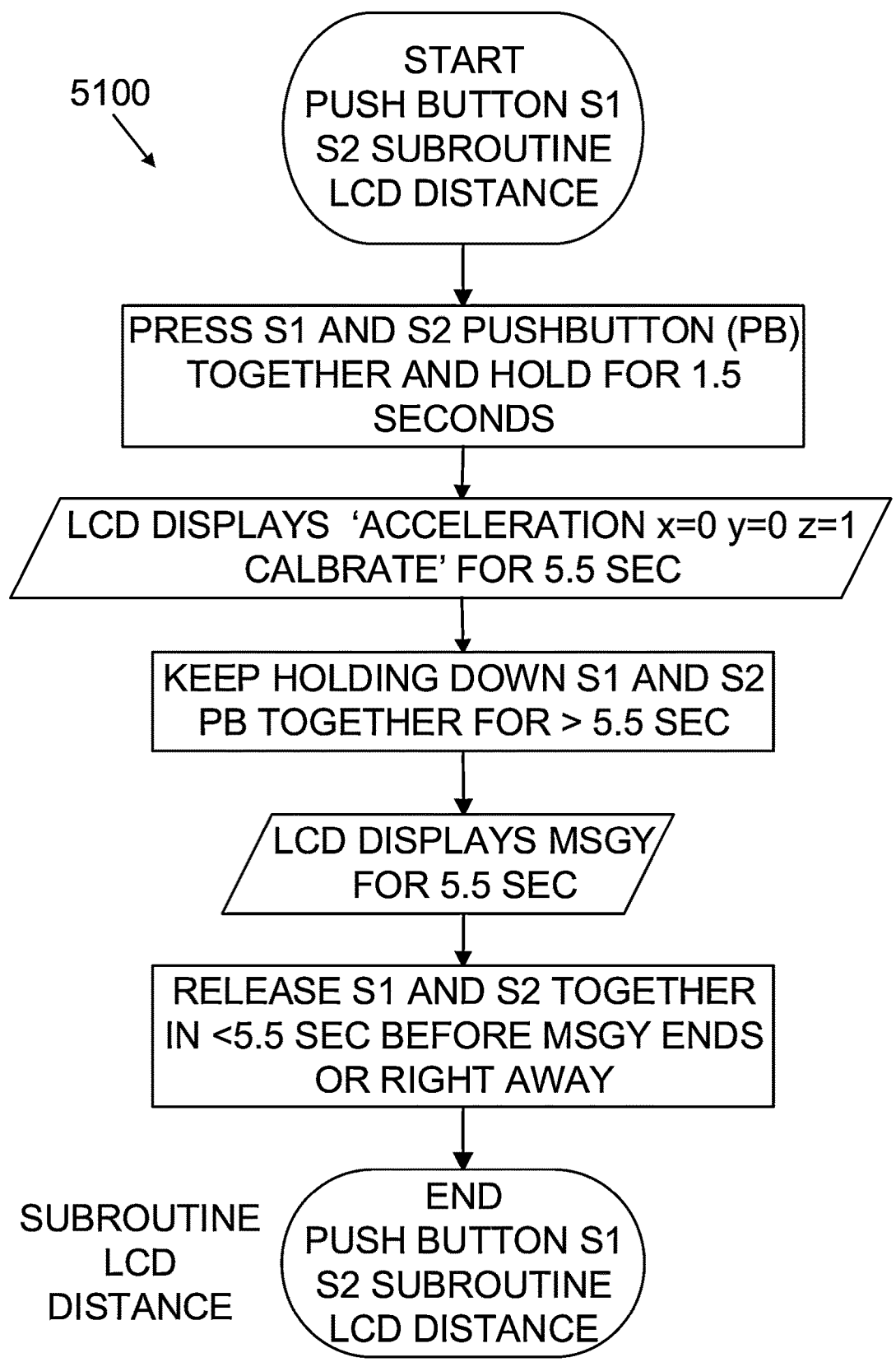
FIG. 51 is a flow chart that shows a subroutine when pushing S1 and S2 together for the second hold selects the units distance of car behind is measured SUBROUTINE LCD DISTANCE
Figure 52:
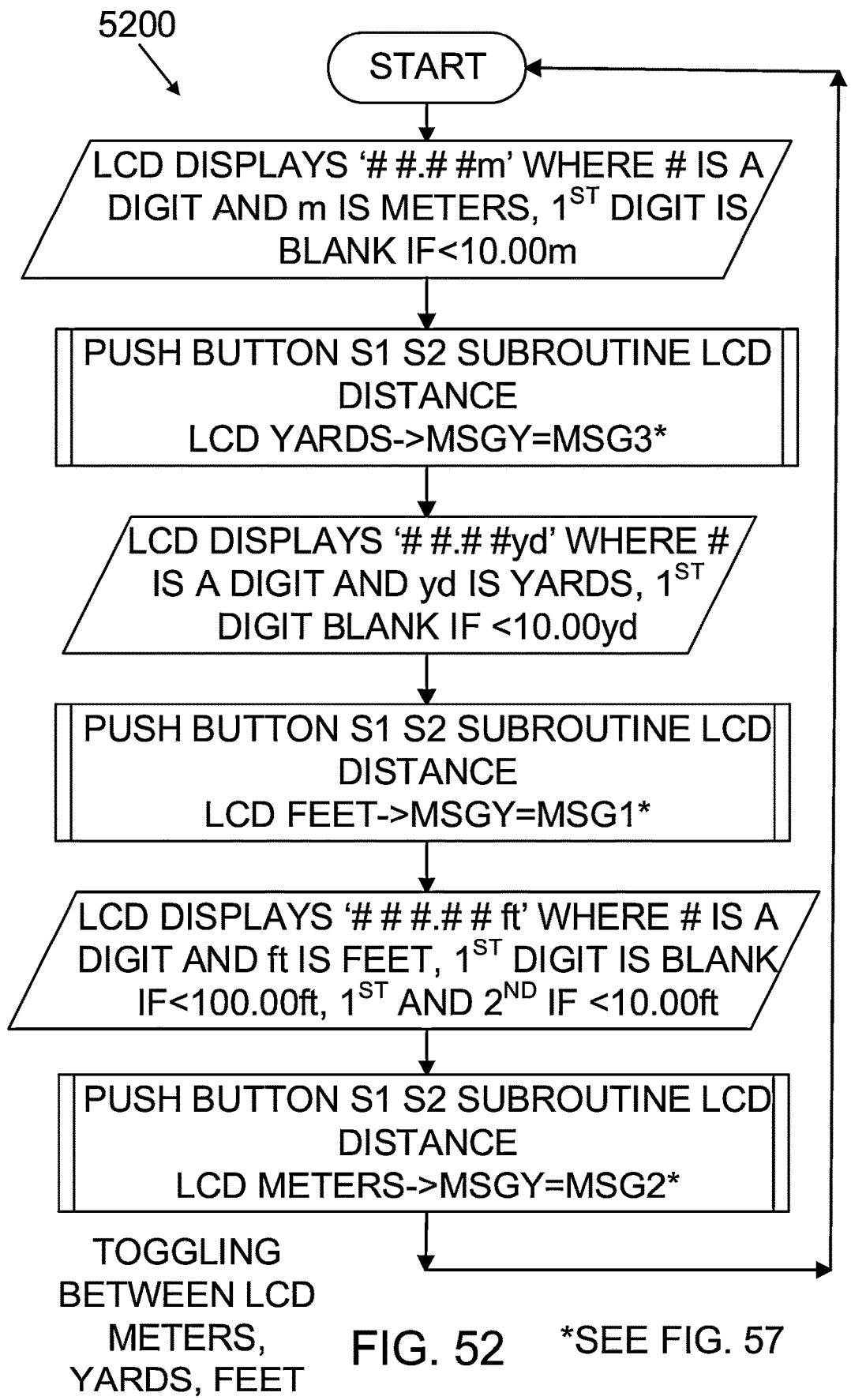
FIG. 52 is a flow chart that shows pushing S1 and S2 together toggles between meters, yards, and feet TOGGLING BETWEEN LCD METERS, YARDS, FEET

Holding down both pushbuttons for a little longer changes the distance type on the LCD character display between meters, yards and feet, FIG. 51, FIG. 52, FIG. 33

Figure 40:
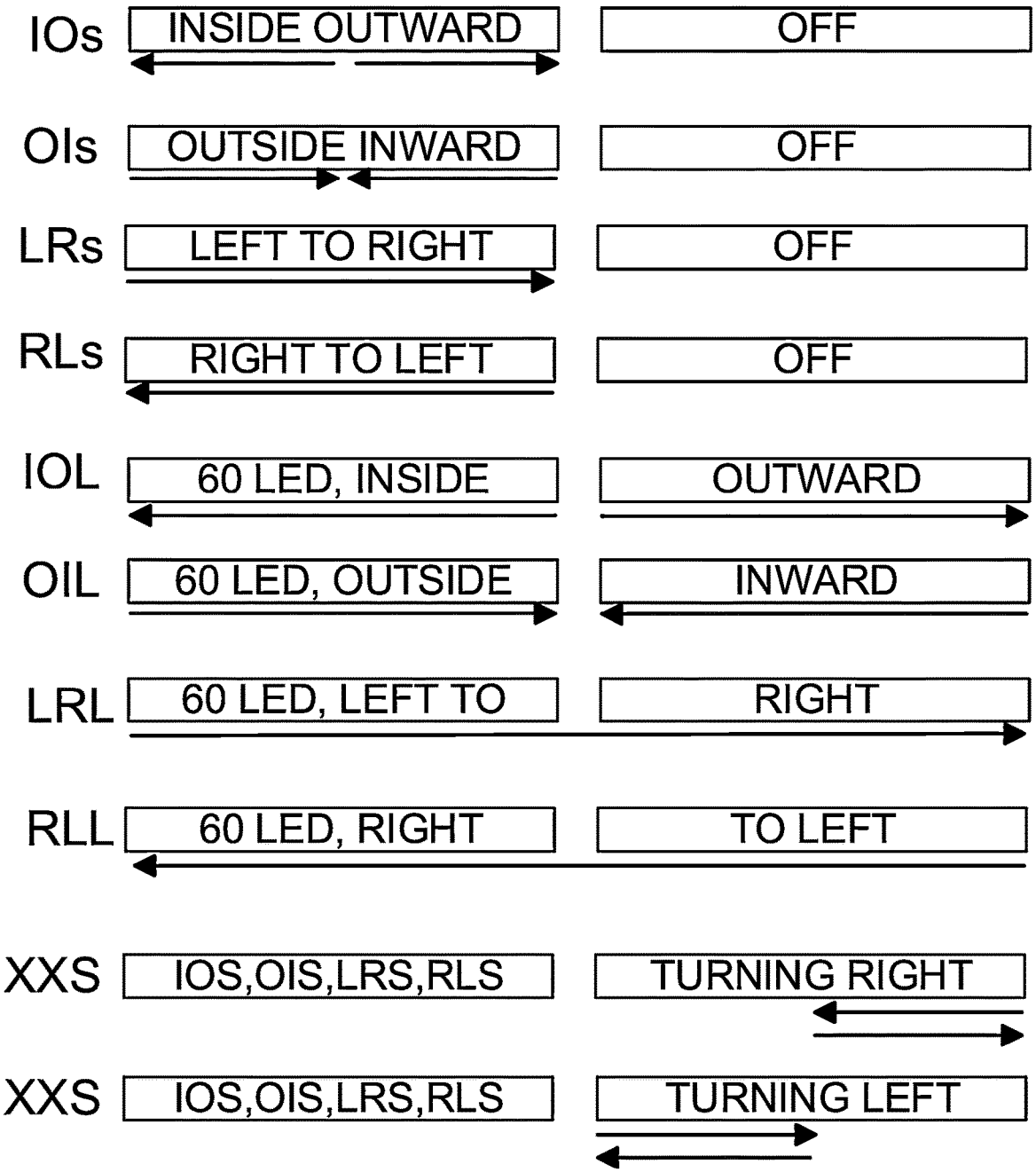
FIG. 40 is a diagram showing the different LED bargraph patterns and how they are recognized on the LCD display
Figure 41:
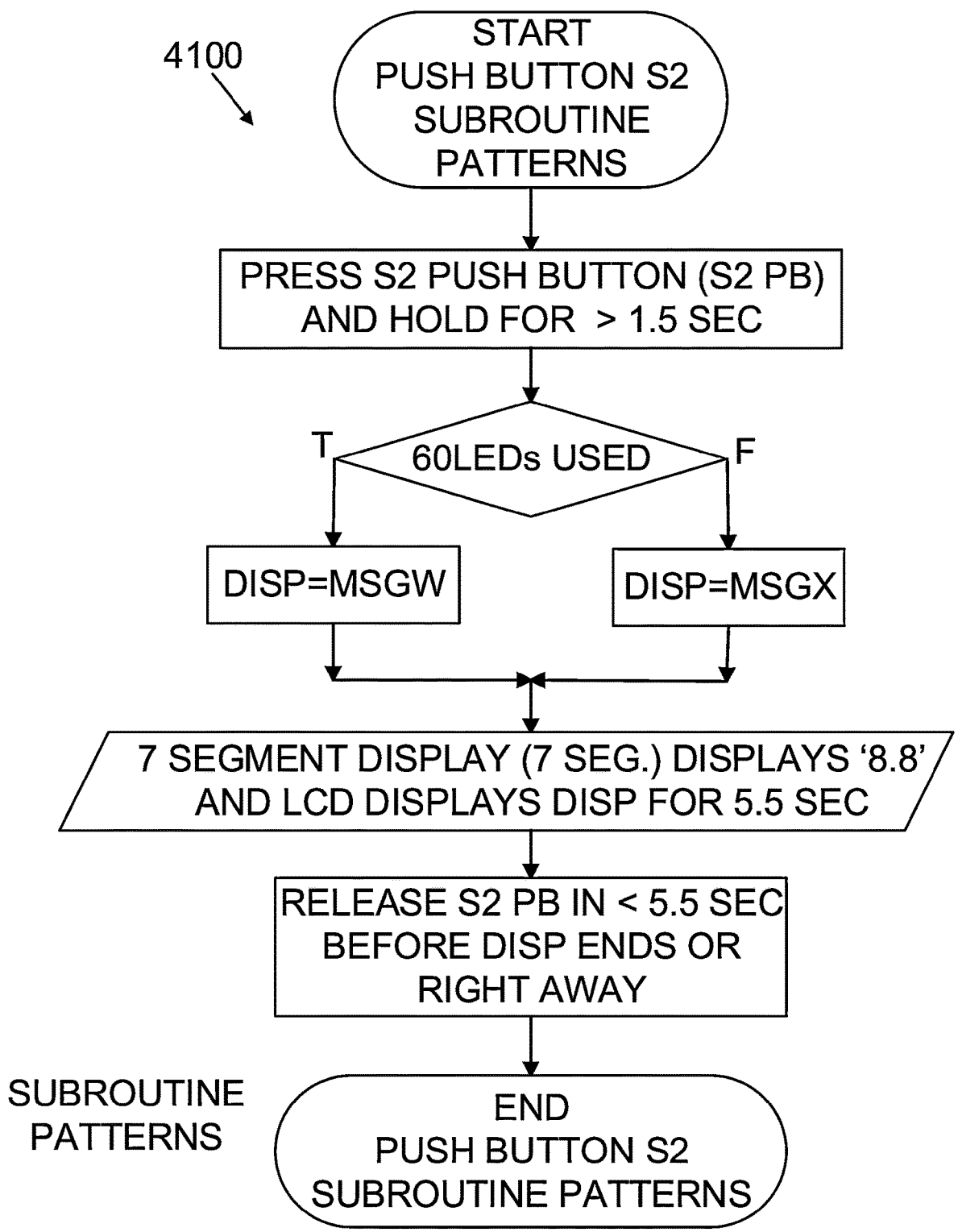
FIG. 41 is a flow chart that show a subroutine when S2 is push bargraph patterns change SUBROUTINE PATTERNS
Figure 42:
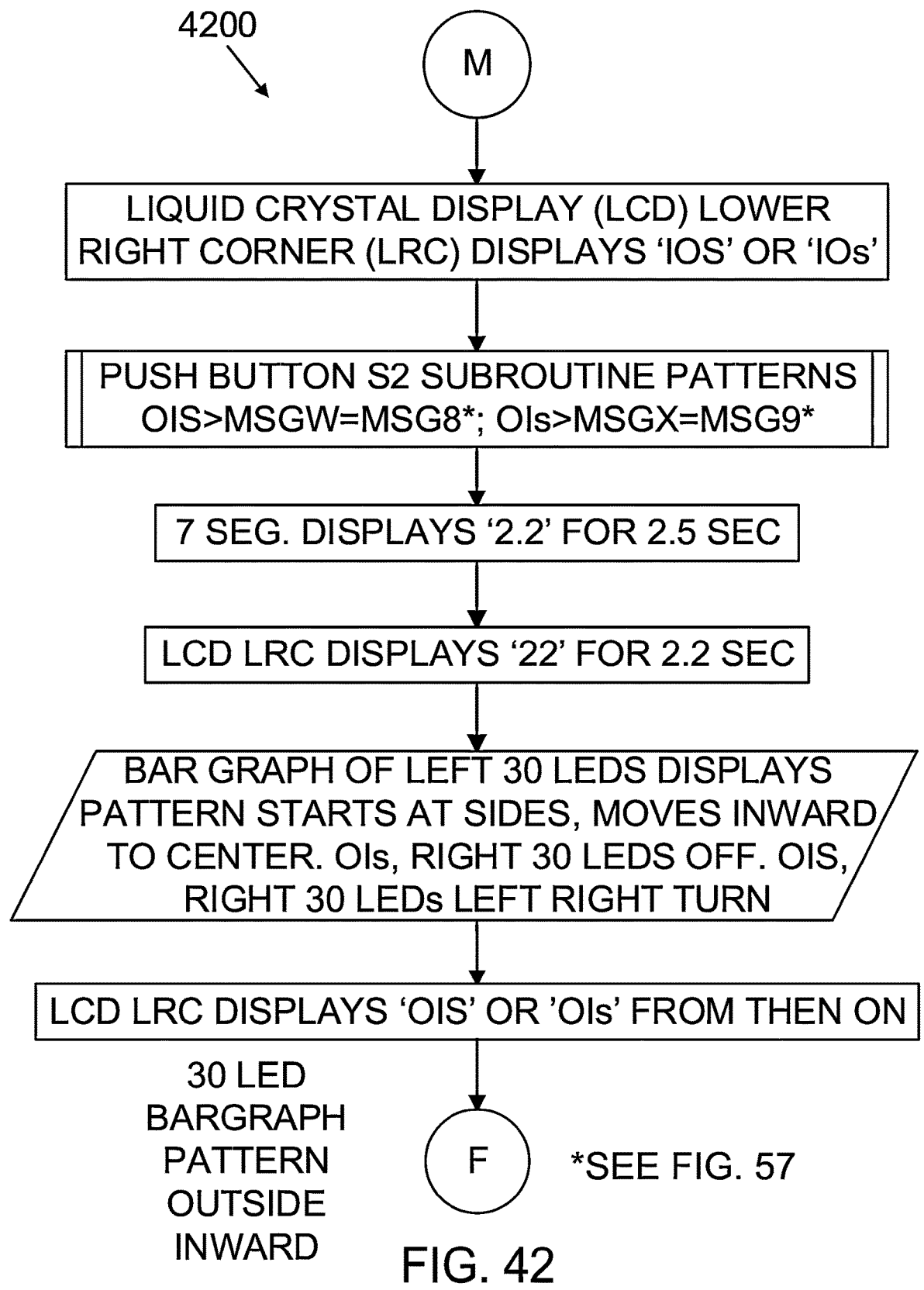
FIG. 42 is a flow chart when pushing S2 changes pattern displayed at rear left LED bank to start outside moves inward (IOS) for right LED bank off (IOs) for right bank left right data 30 LED BARGRAPH PATTERN OUTSIDE INWARD
Figure 43:
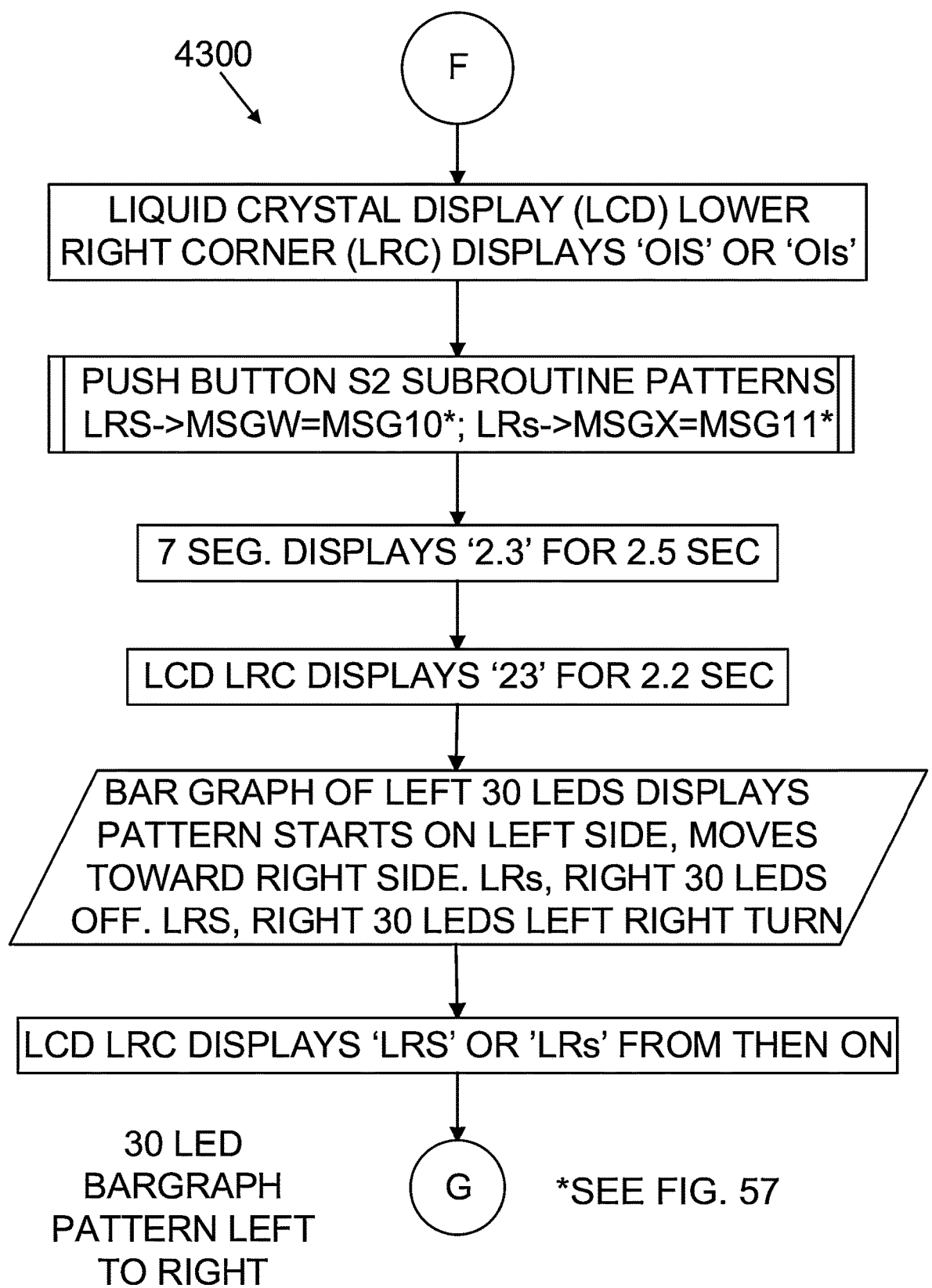
FIG. 43 is a flow chart when pushing S2 changes pattern displayed at rear left LED bank to start left moves right (LRS) for right LED bank off, (LRs) for right bank left right data 30 LED BARGRAPH PATTERN LEFT TO RIGHT
Figure 44:
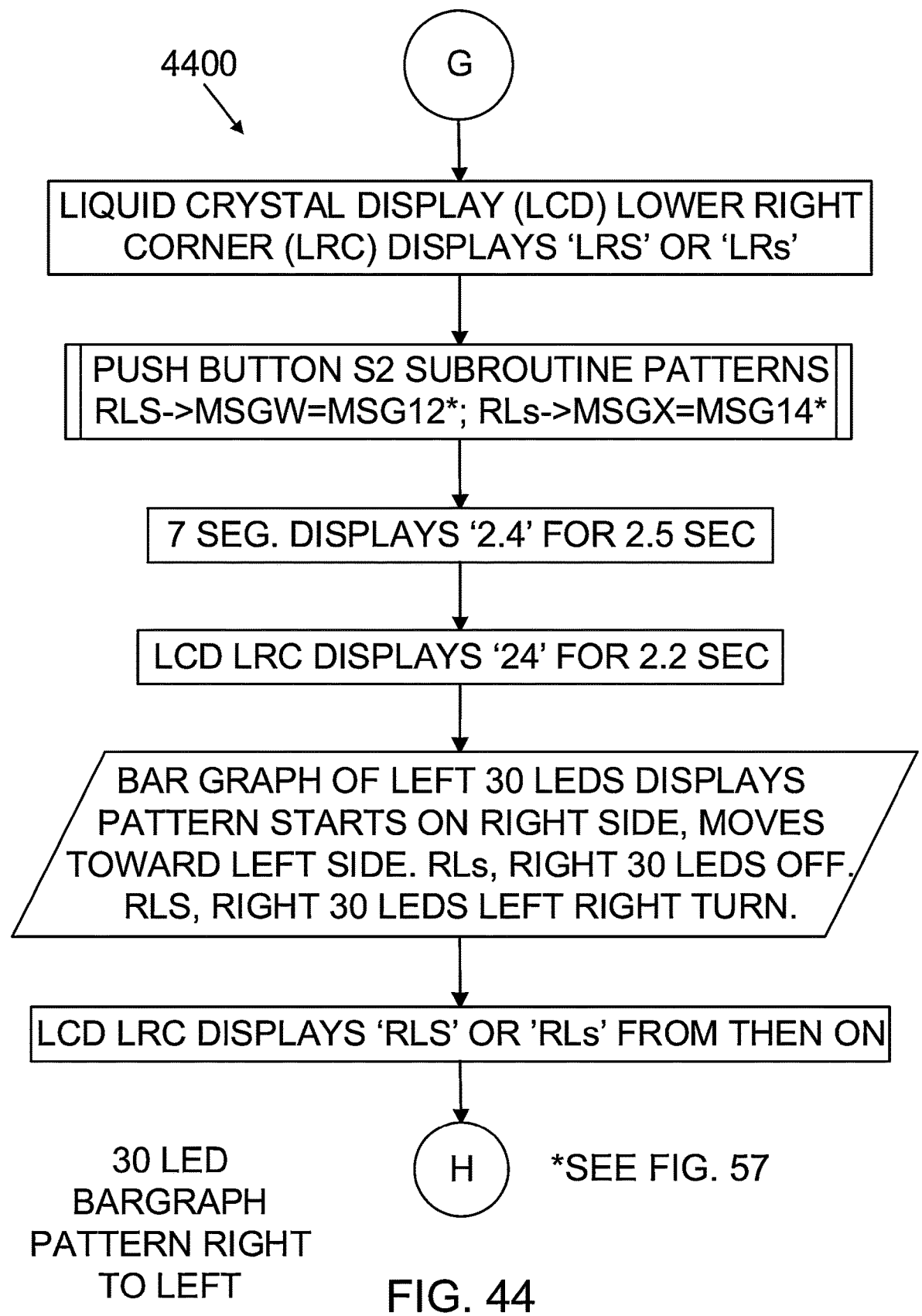
FIG. 44 is a flow chart when pushing S2 changes pattern displayed at rear left LED bank to start right and moves left (RLS) for right LED bank off, (RLs) for right bank left right data 30 LED BARGRAPH PATTERN RIGHT TO LEFT
Figure 45:
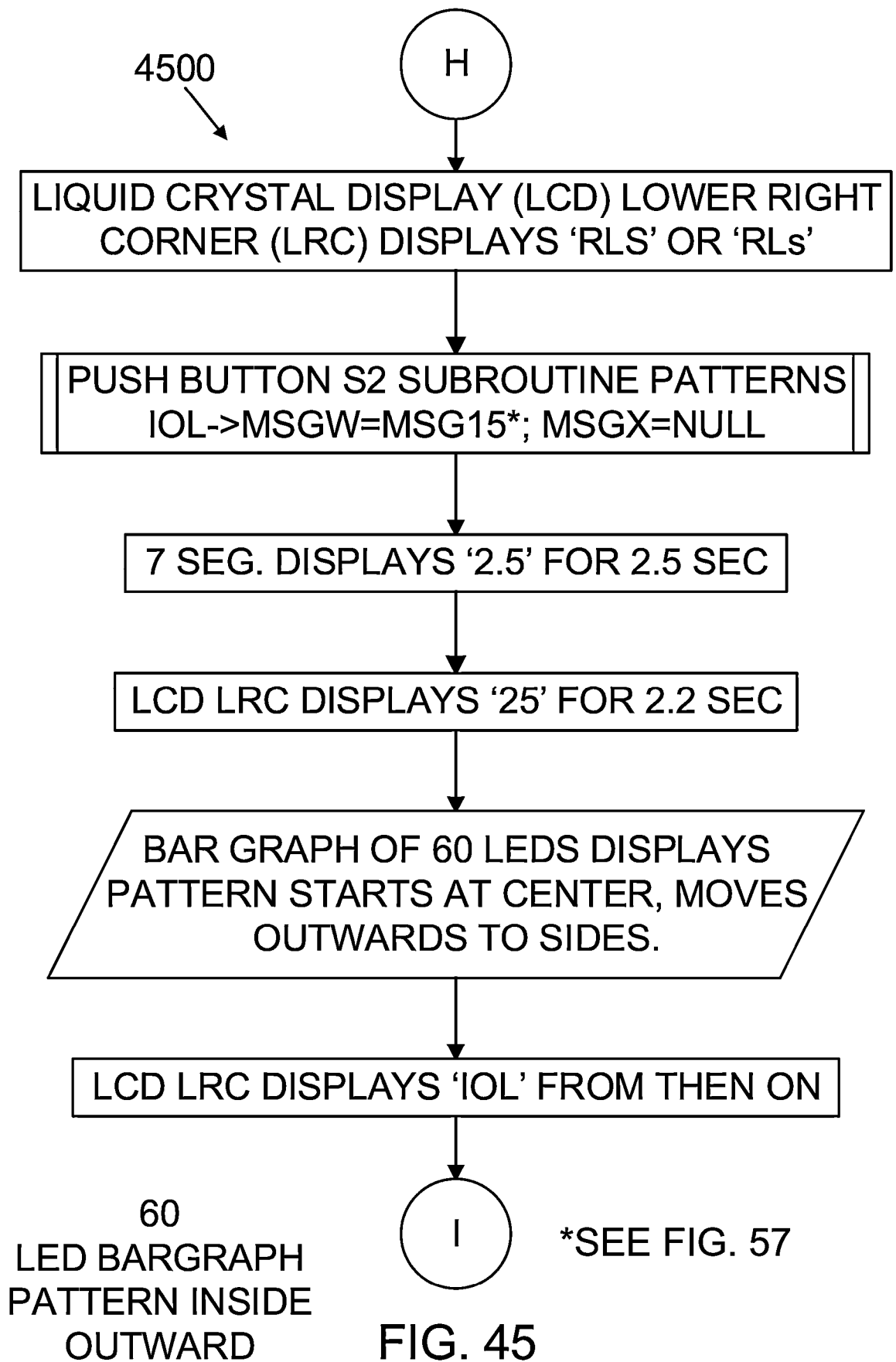
FIG. 45 is a flow chart when pushing S2 changes pattern displayed at rear left and right LED banks to start inside and moves outward (IOL) 60 BARGRAPH PATTERN INSIDE OUTWARD
Figure 46:
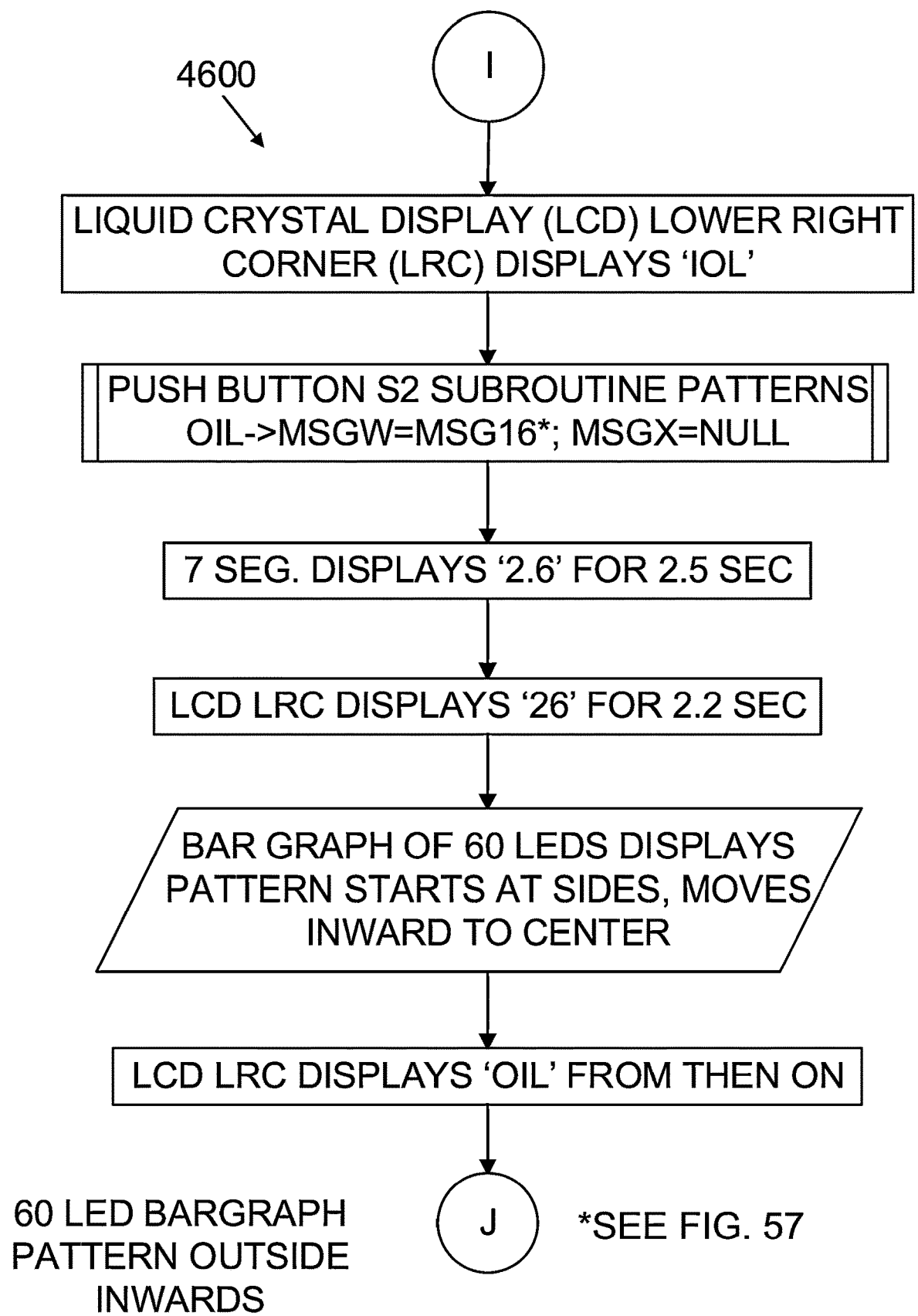
FIG. 46 is a flow chart when pushing S2 changes pattern displayed at rear left and right LED banks to start outside and move inward (OIL) 60 LED BARGRAPH PATTERN OUTSIDE INWARD
Figure 47:
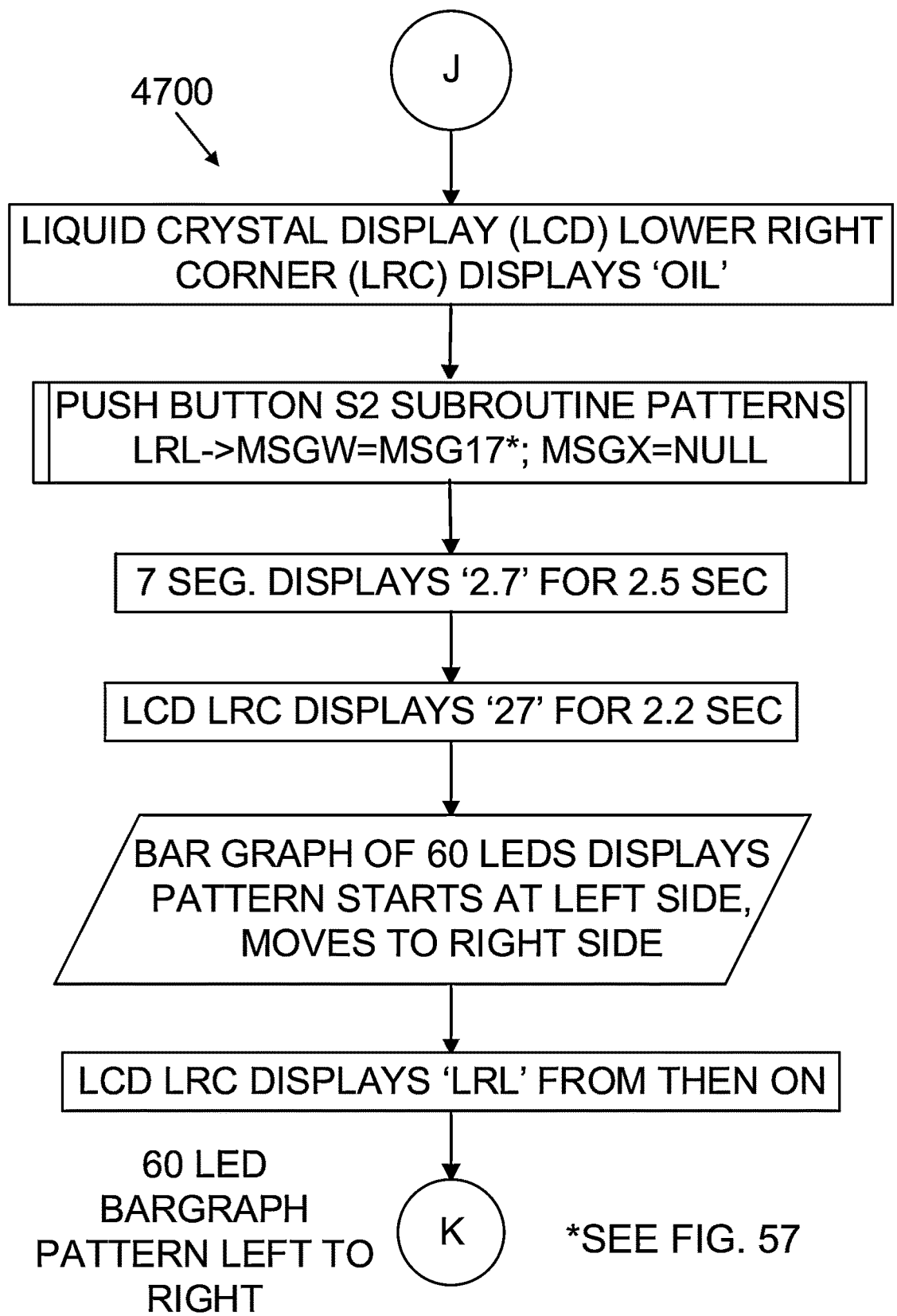
FIG. 47 is a flow chart when pushing S2 changes pattern displayed at rear left and right LED banks to start left and move right (LRL) 60 LED BARGRAPH PATTERN LEFT TO RIGHT
Figure 48:
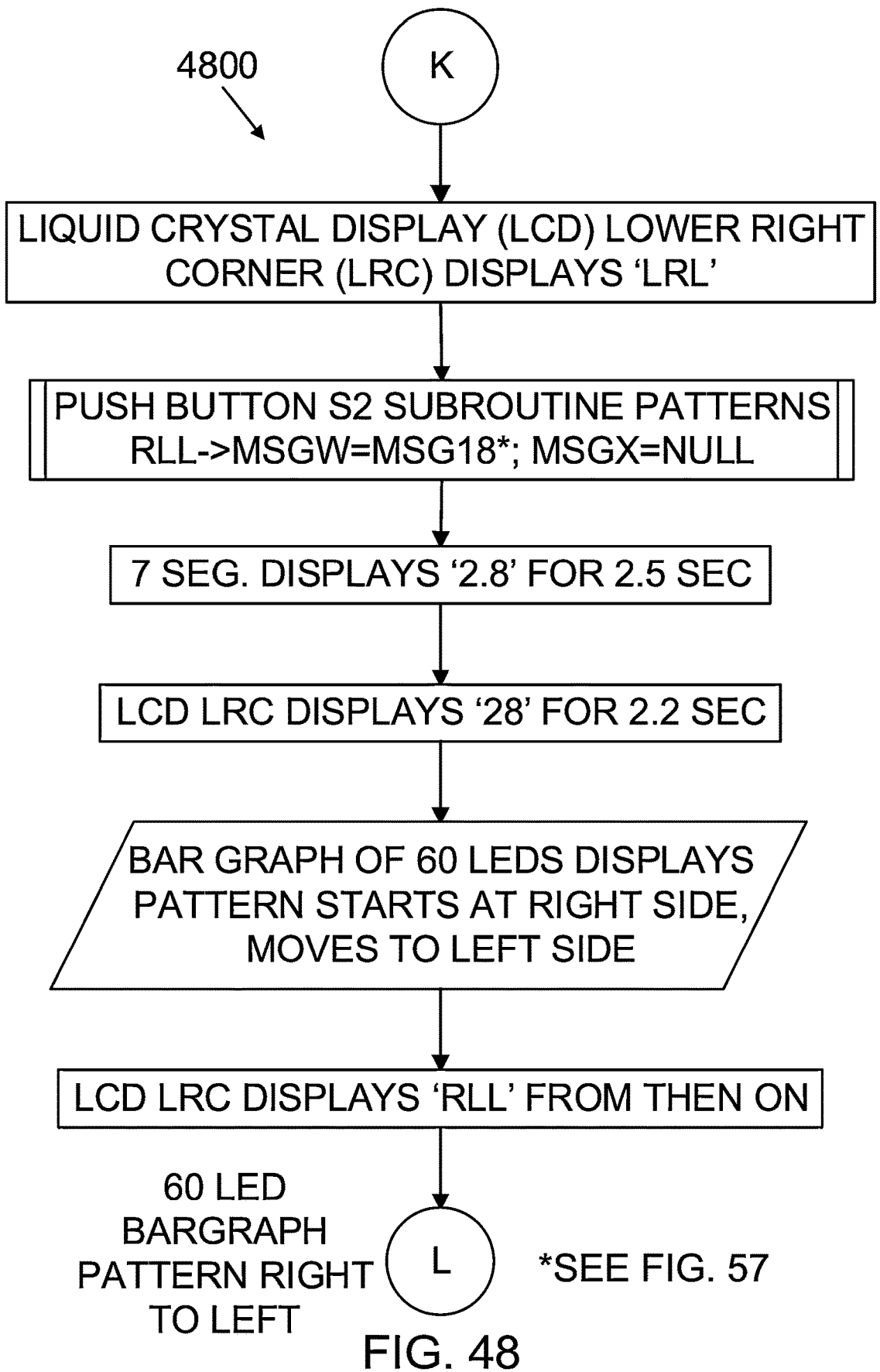
FIG. 48 is a flow chart when pushing S2 changes pattern displayed at rear left and right LED banks to start right and move left (RLL) 60 LED BARGRAPH PATTERN RIGHT TO LEFT
Figure 49:
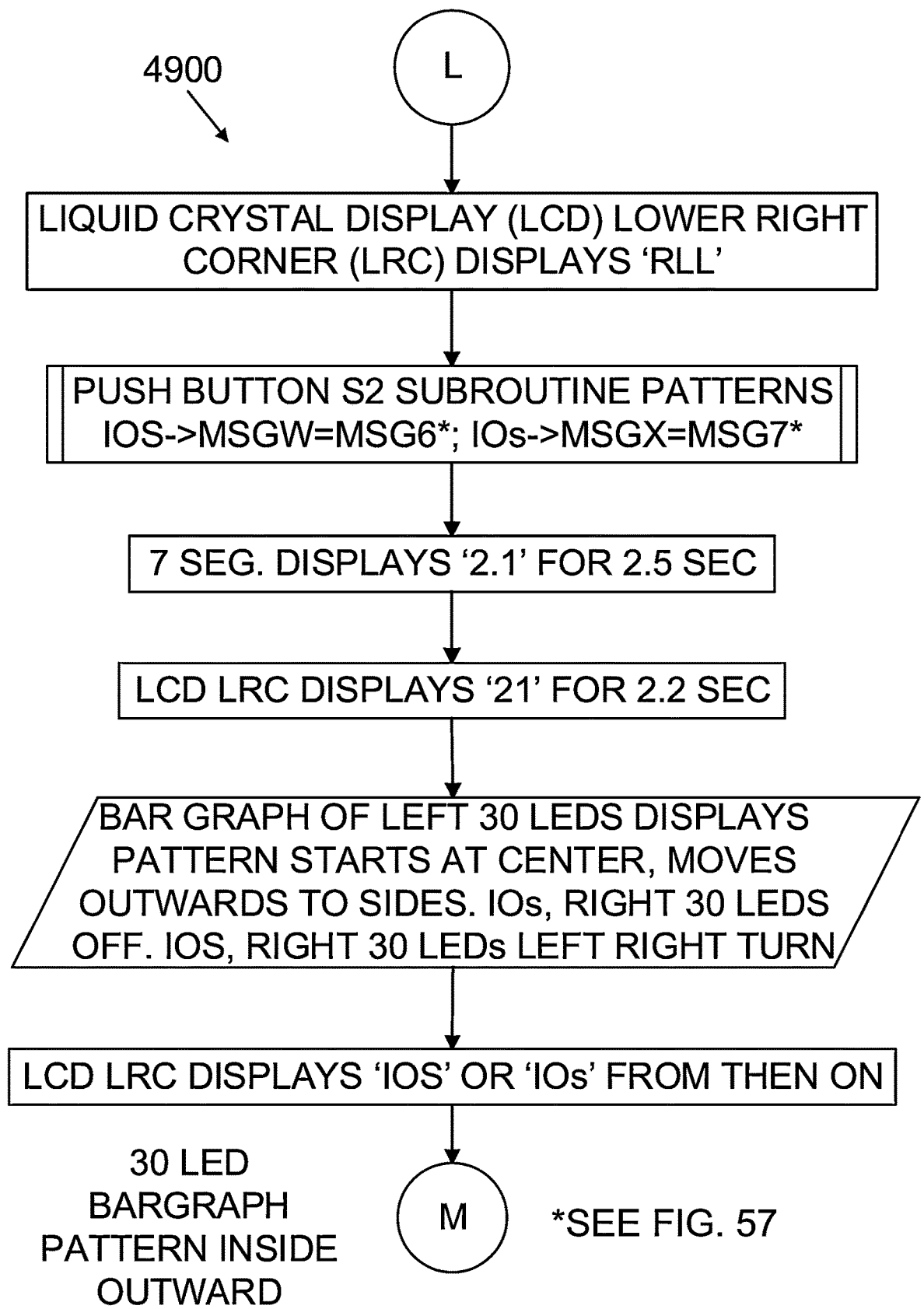
FIG. 49 is a flow chart when pushing S2 changes pattern displayed at rear left LED bank to start inside and move outward, (IOS) for right LED bank off, (IOs) for right bank left right data 30 LED BARGRAPH PATTERN INSIDE OUTWARD
Figure 53:
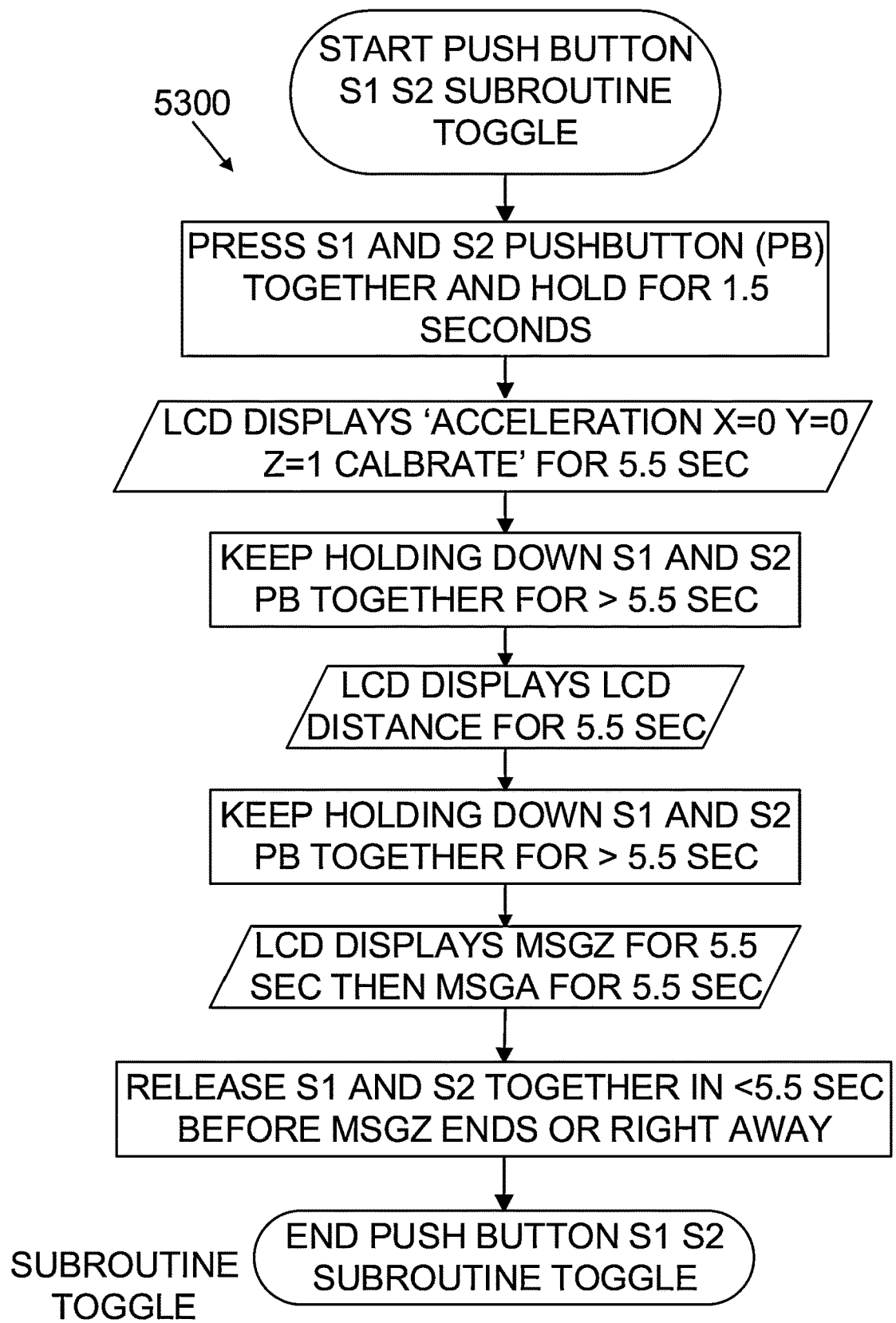
FIG. 53 is a flow chart that show a subroutine when pushing S1 and S2 together for the third hold toggles between Tailgate with and without acceleration TG, TA and the right bargraph showing left right turn or nothing XXS, XXs SUBROUTINE TOGGLE
Figure 54:
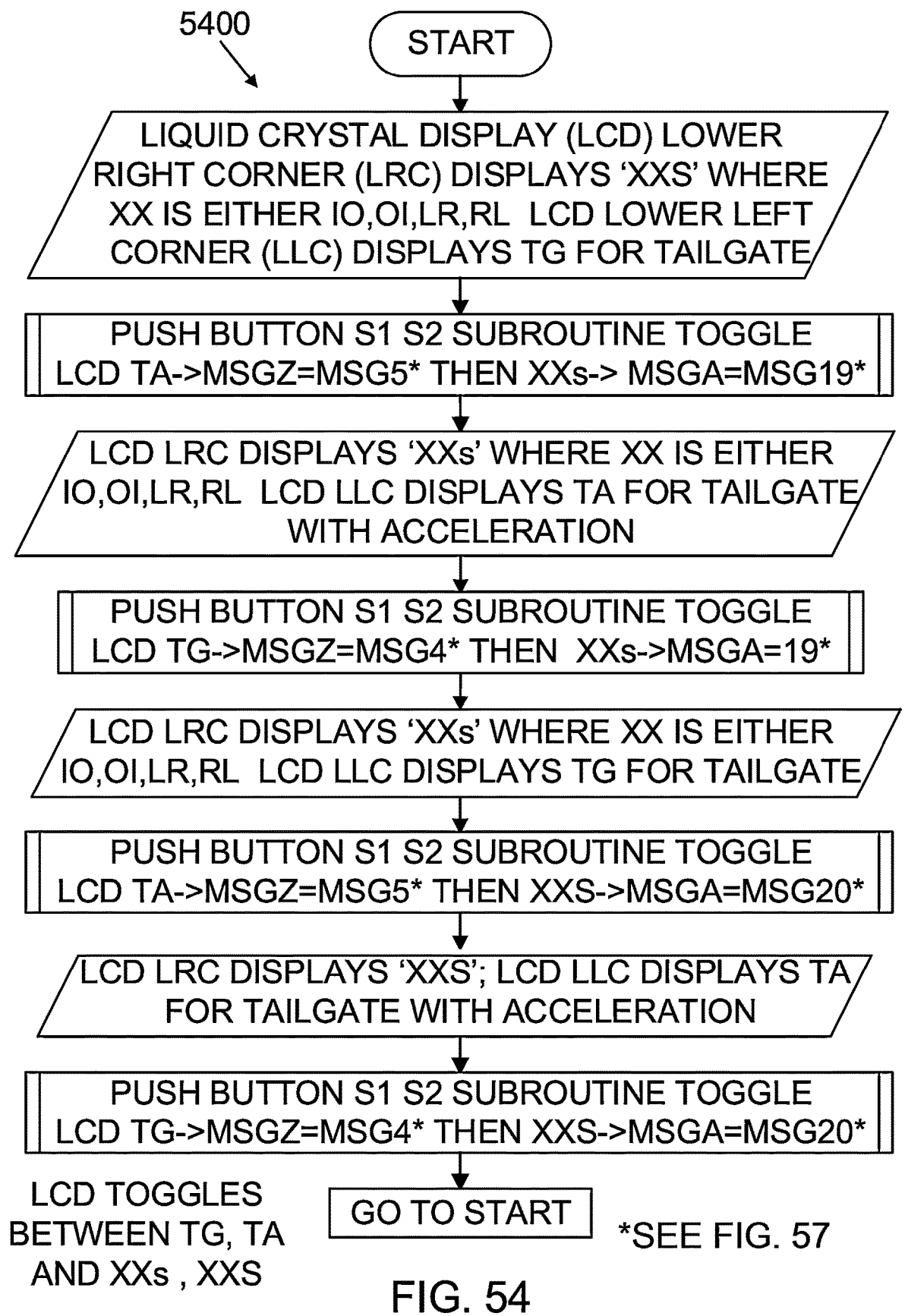
FIG. 54 is a flowchart that show the toggle items XXs and TG then XXs and TA then XXS and TG and XXS and TA LCD TOGGLES BETWEEN TG, TA, XXs, XXS

Holding down both pushbuttons a little longer with a left 30 LED bank display, then the right bank may show right and left turning or not, FIG. 40, 'XXS' or 'XXs' respectively and the LCD tailgate bargraph may be with or without acceleration TA, TG respectively, FIG. 53, FIG. 54, FIG. 40.

Figure 4:
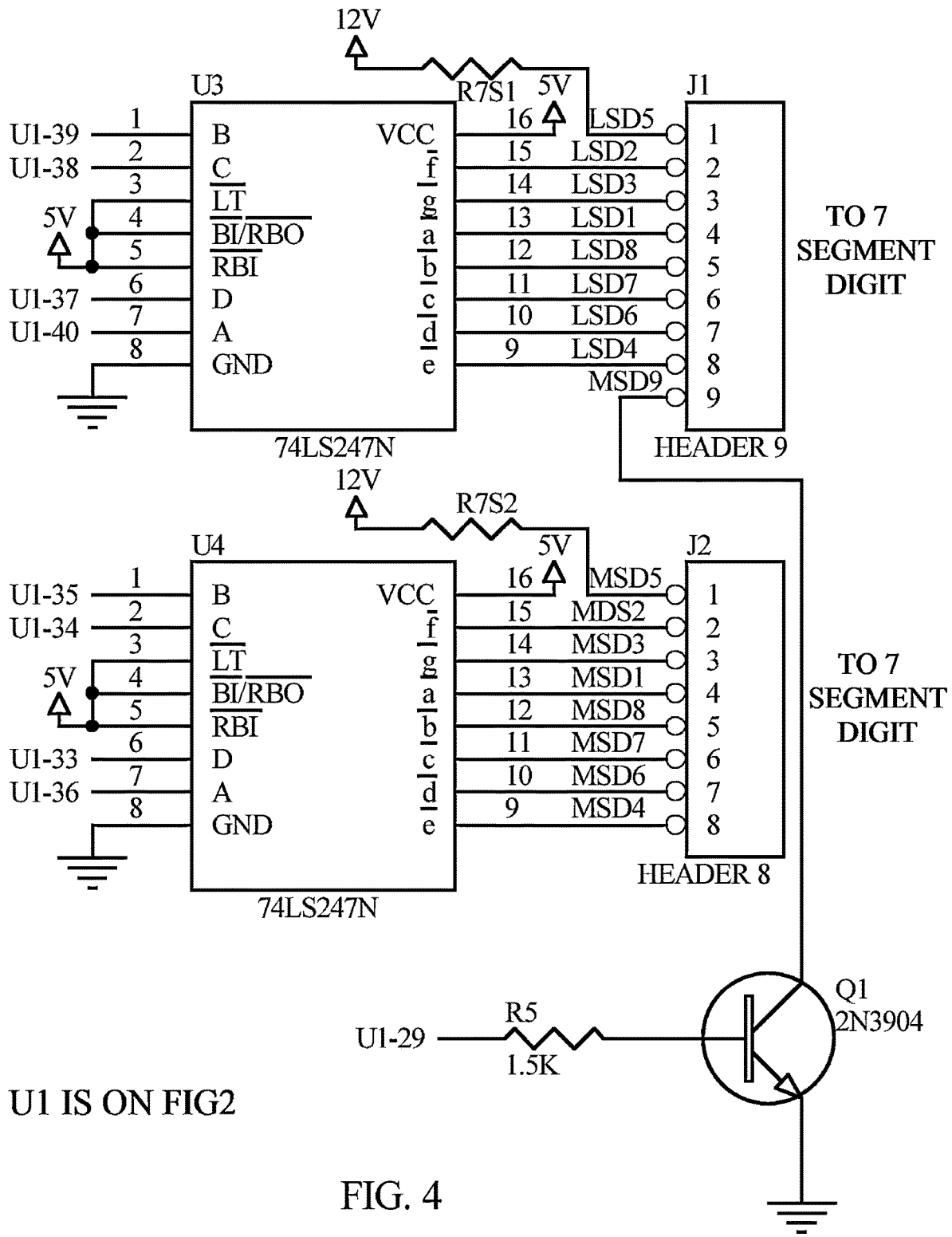
FIG. 4 is a circuit diagram representing a schematic circuit for 2 digit 7 segment display
Figure 31:
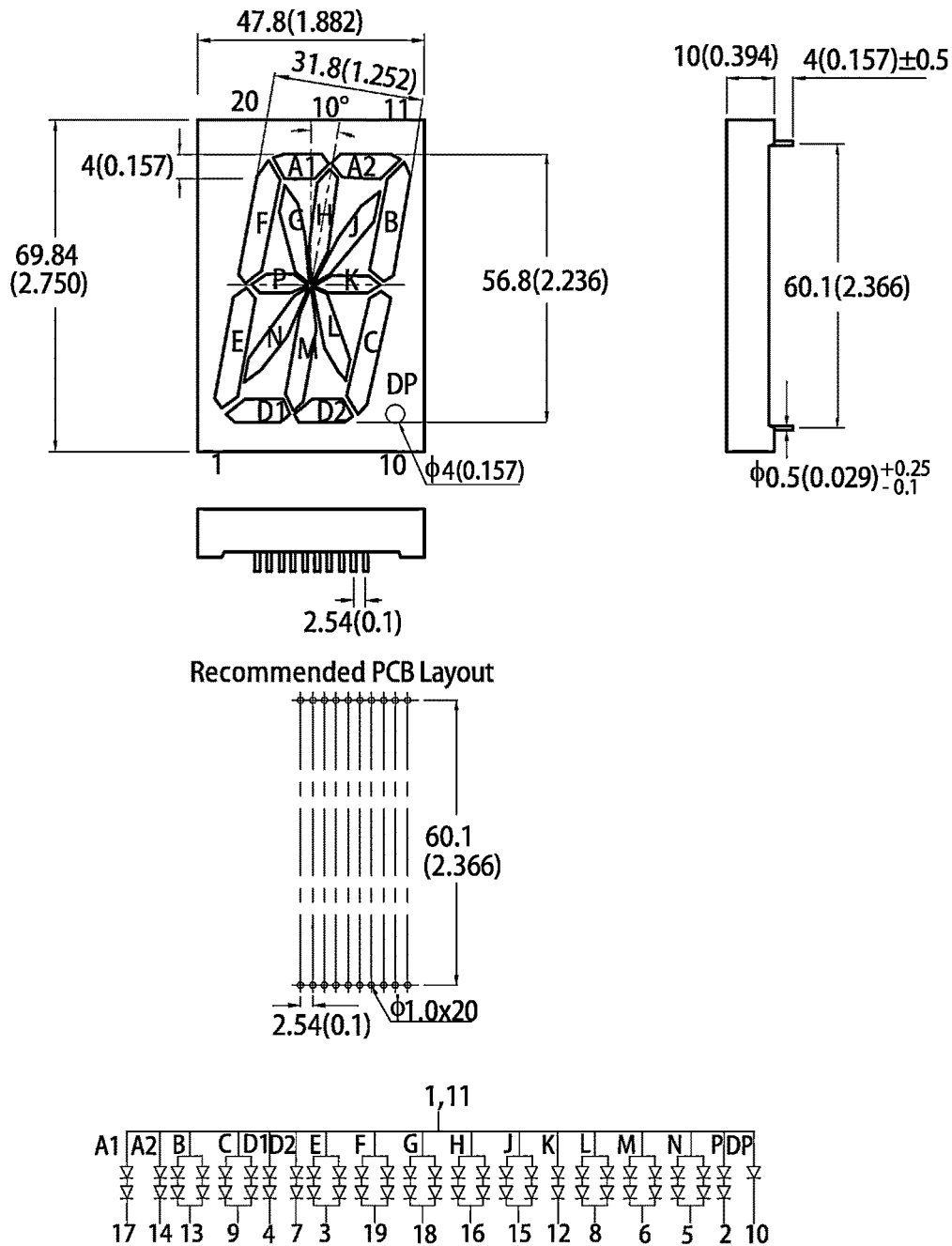
FIG. 31 is a diagram of Prior Art from the data sheet of the 16-segment display with sizing and its pinout

Two Digit 7-Segment Display FIG. 2, FIG. 4, FIG. 31

In this embodiment, the large 6.5" tall digital display consists of two 7 seven segment digits that run off of 12V and is common anode. The display circuit uses two BCD to 7 Segment IC's, the 74LS247.

The IC is open collector so it is either open circuit, for the LEDs in the 7-segment display to be off. Or conducts allowing current from 12V to go through the LEDs and light them up. The A0 to A3 and A4 to A7 of the microcontroller go to ABCD of the first BCD to 7 segment and ABCD of the second BCD to 7 segment respectively.

The binary number of ABCD is converted to 7 segments of the display FIG. 31 A to G and turns on the LEDs on the seven-segment display to display the number. A decimal point in between the digits is connected to another microcontroller line and a BJT transistor. The decimal point is used to scale the digital read out, from 0.1 to 99.

Other embodiments would comprise of variations of the main embodiment. The BCD to Seven Segment IC comes in a variety of versions. There is the 74LS47, 7447, CD4543, MC4511. Some do not have open collector so the 7 Segment Display would change to a 5V or similar display.

Two Character 16-Segment Display and Minus Sign FIG. 30

In this embodiment two large 2.24", 16 segment by two character displays are common anode and use 5V. They display the units of measurement for the 7 segment measurement data. One data line comes from the LED bargraph and turns the four LED minus sign on or off by transistor driver. This is for the 7 segment because some measurements like tailgate and acceleration can be negative. Three other data lines from the LED bargraph give a selection of eight possibilities for the 16 segment display.

But only five selections are needed. Distance in meters displays 'm' on the 16 segment. Distance in yards displays 'Yd'. Acceleration in g's displays 'g'. The tailgate with and without acceleration display multiple 16 segment characters. For tailgate the display is 'TG' for tailgate then 'CR' for Cars or car lengths. For tailgate with acceleration the display is 'TA', for tailgate with acceleration 'AC' for acceleration and 'CR' for Cars or car lengths.

Because of this, the secondary 40 pin microcontroller ATMEGA324 was used. It converts the three inputs to 24 lines that go through 3 each 74ABT573N current drivers and light up the segment to produce the characters. Some segments are unused 16×2−24=8 or 4 per character.

There is a USB UART to microcontroller circuit to program and power the board or it can be powered by a voltage regulator circuit selectable by jumper switch.

Other embodiments would comprise of variations, of the main embodiment. There are large 16 segment displays that come in different colours with different semiconductor used. There are other 40 pin microcontrollers. The FLASH required is small and no EEPROM, to save settings, is needed. The 74ABT573N driver IC's could be changed to 74ACT573N or other logic. Or the 74XXX373N could be used. It has the same function but a different pin out.

Figure 5:
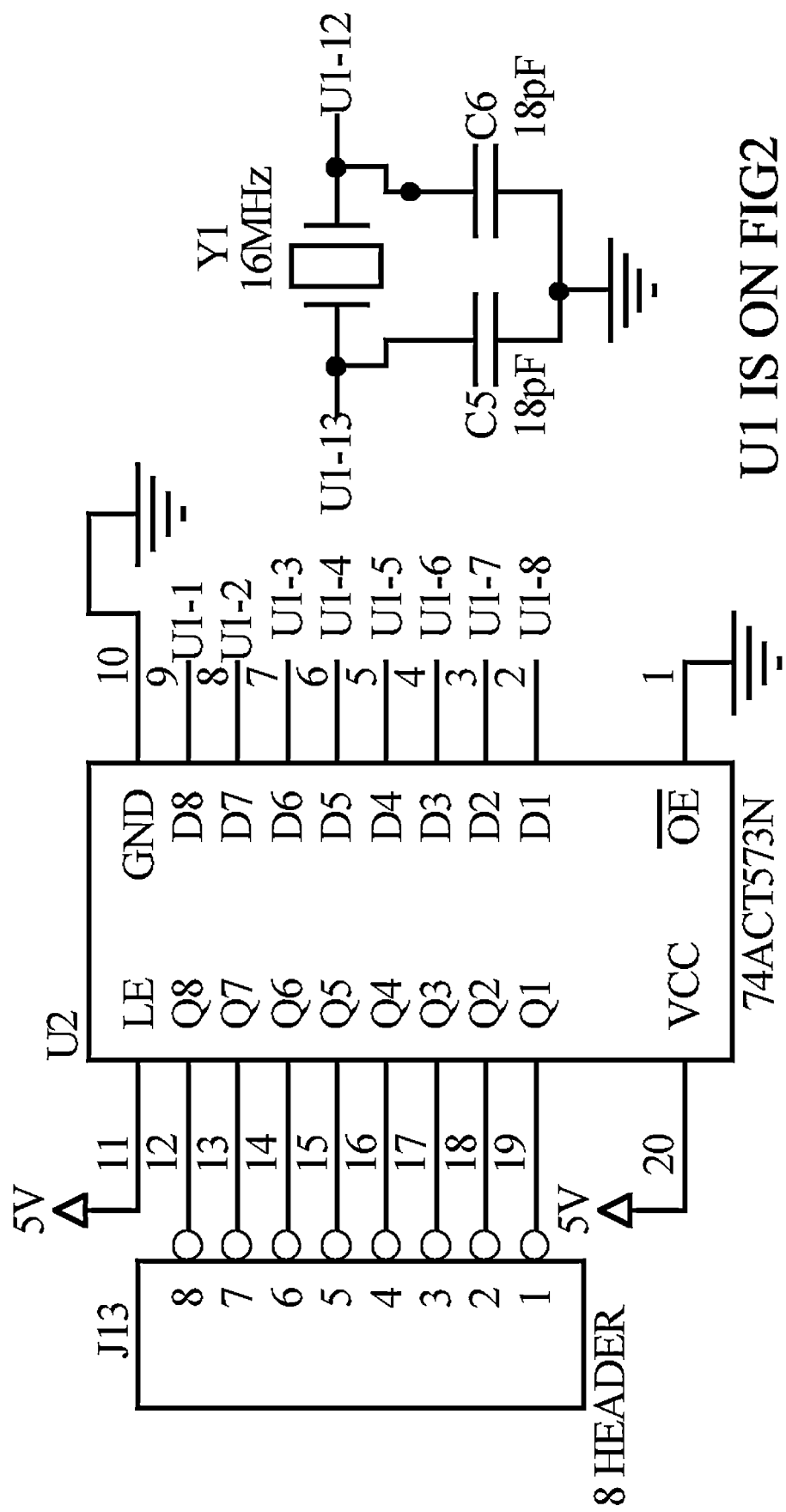
FIG. 5 is a circuit diagram representing a driver and header for 8 bits going to LEDPCB and the MCU's crystal oscillator.
Figure 8:
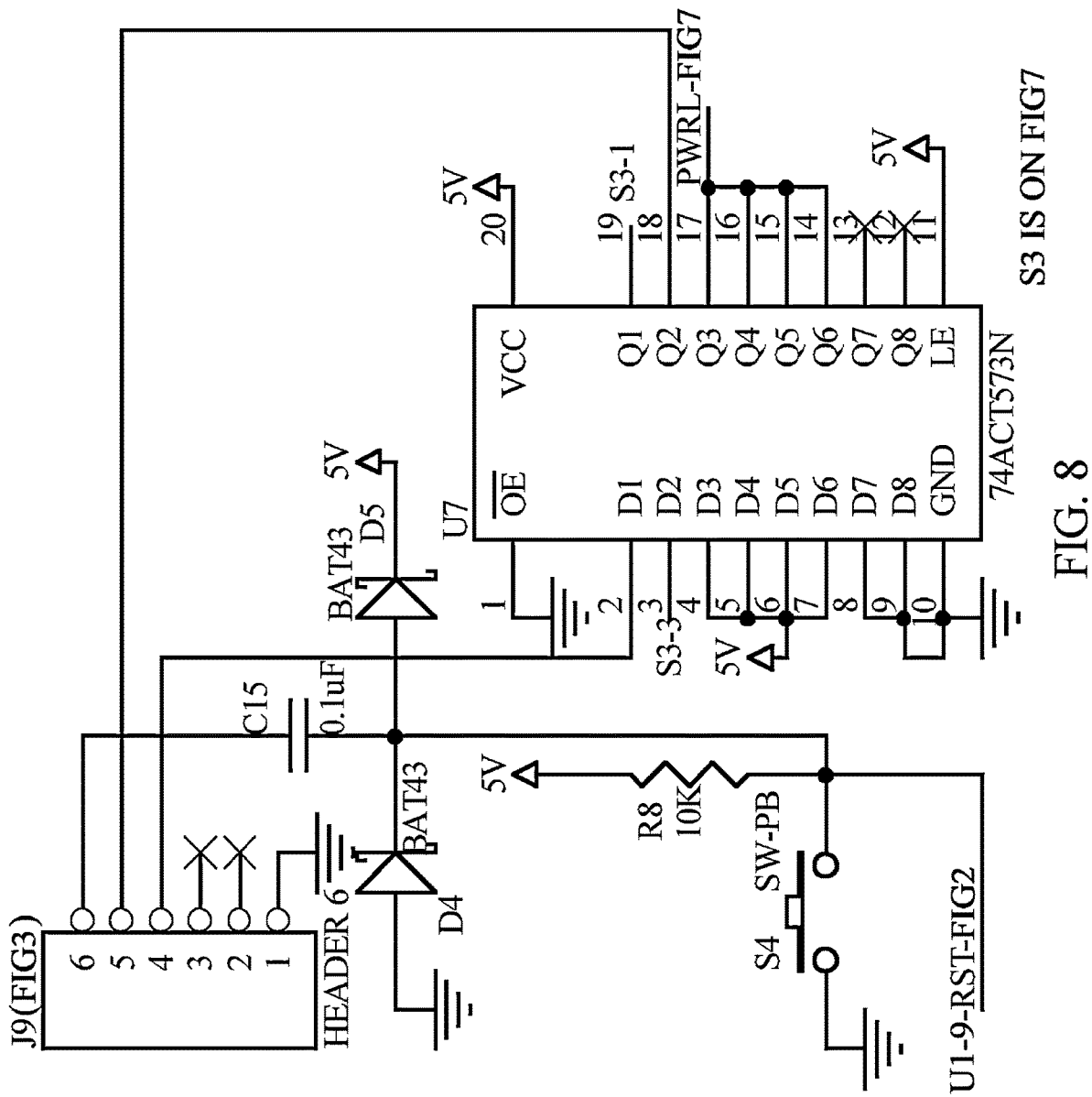
FIG. 8 is a circuit diagram of the schematic of the connector for the USB to UART programmer the reset switch and IC driver
Figure 12:
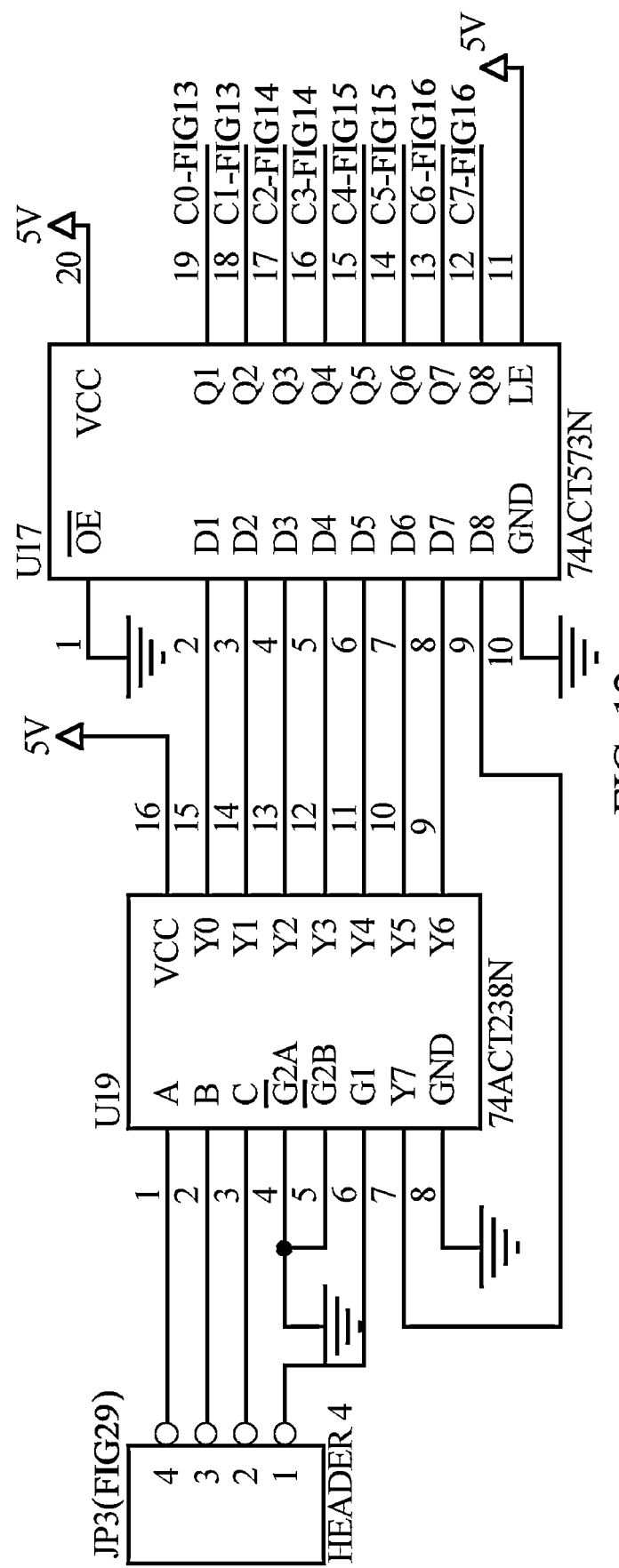
FIG. 12 is a circuit diagram of the schematic of the 3 to 8 decoder and its driver on the LEDPCB
Figure 13:
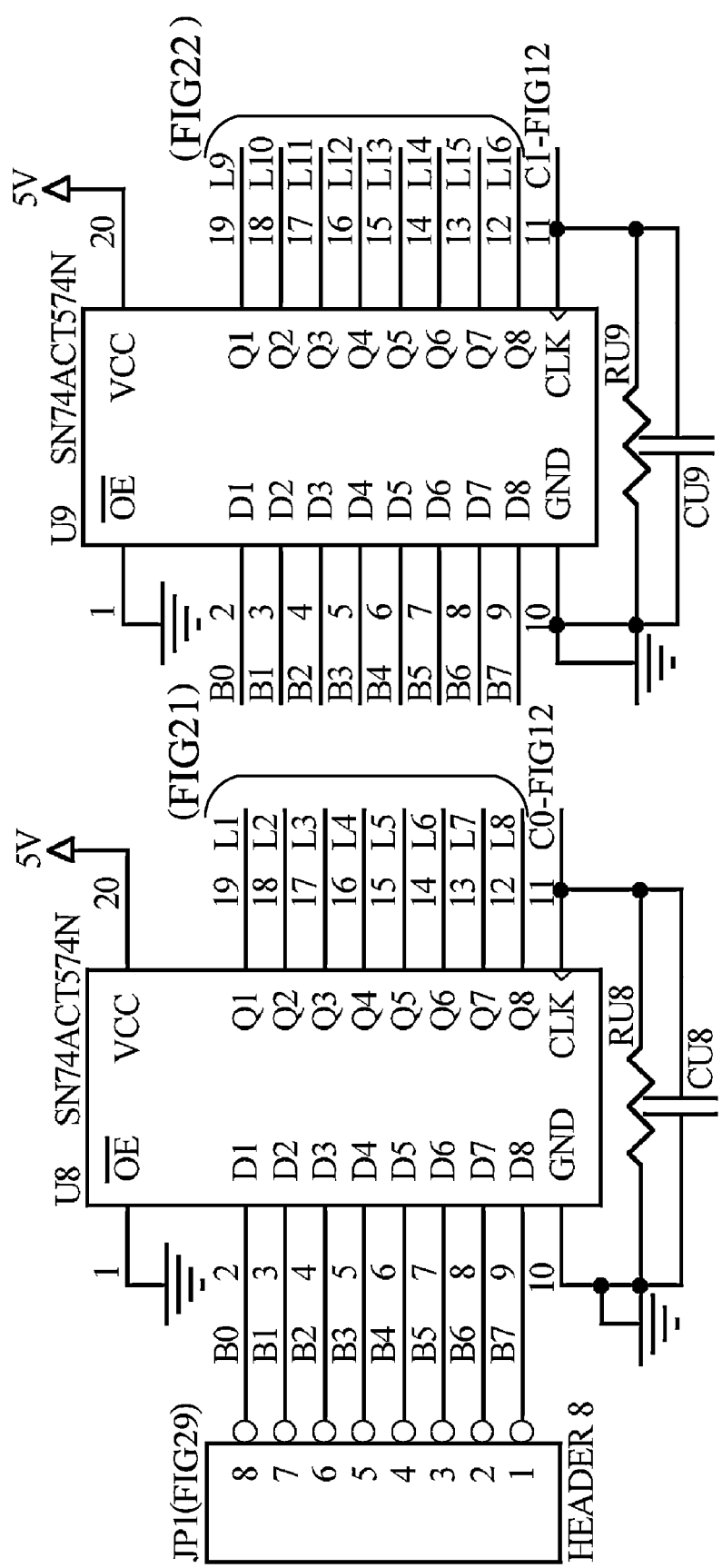
FIG. 13 is a circuit diagram of the schematic of the first two clocked buffers going to the LED bargraph

IC 74ACT573N Buffers Used in Circuitry FIG. 5 U2, FIG. 8 U7, FIG. 12 U17

The three 74ACT573 buffers used in the circuitry were replace with something else. U7 was replaced with wire jumpers between D1-Q1, D2-Q2 and D3-Q3. So instead of a semiconductor buffer a short circuit was used.

For U2 and U17 the IC was replaced by a shunt switch, all eight conducting across, IC with a 16-DIP package. There were eight. These shunt switches, all eight shorted across, were connected between Q1-D1, Q2-D2, Q3-D3, Q4-D4, Q5-D5, Q6-D6, Q7-D7 and Q8-D8. It was found that the two IC's were not needed and produced unwanted time delays in the circuit.

Analog LED Bargraph Display FIG. 12, FIG. 13-FIG. 16, FIG. 17, FIG. 21-FIG. 28

In this embodiment, there are two pair of two 30 super-bright LEDs in the bargraph type displays. Each of the two pair has 30 LEDs of yellow or blue. In this case each of the two 60 LED bargraphs are yellow and blue, which gives the ability to change the color of the display by going from one 60 LED bargraph to the other. The colors for the first pair of bargraphs are yellow for negative data like tailgate severity. The colors for the second pair of bargraphs are and blue for tailgate cushion. For microcontroller U1 each one of the 8 output lines from the MCU are attached to a 74ACT573N buffer/driver U2 FIG. 5. It was decided to replace it with 16 DIP shunt switch, all eight shorted across, IC instead. There are 8 lines (B0-B7) from the microcontroller all of which connect to the shunt switch, all eight shorted across, these lines go to J13 and are connected to JP1 of the LEDPCB and are connected to D1 to D8 of the eight 74ACT574's, U8-U15. The MCU also provides four lines to the 3-8 decoder U19, the 74ACT238. One line is the gate G (D7). When G is low the eight output lines are low. Three of these lines provide a binary number (D4-D6) or (A, B, C) which turns on one of eight of the output lines of the 3 to 8, (Y0-Y7) when G is high. And goes through a buffer U17 now using a 16 DIP shunt to the Clock Pulse input of one of the eight 74ACT574 to clock in the 8 bits U8-U15 Then, each 8 bits output lines from U8-U15 go to the pair of 60 LEDs. There are 2 groupings of 4 74ACT574N each with eight lines, to produce two pair of 30 LED bargraphs plus two pair data lines discussed later. The left upper 30 LEDs and the left lower 30 LEDs are selected by a bit from the MCU for yellow and blue respectively. Similarly the right upper 30 LEDs and right lower 30 LEDs are selected by a second bit switch from the MCU for yellow and blue respectively.

The two bits through to two pair of transistor switches to select the upper and lower bargraph of each pair. Say 000 is fed to the 3 to 8 decoder. Then the Y0 output high goes to the rising edge input of the 1st 574 and clocks in the eight bits being presented (B0-B7). These are latched to the output and the LEDs are displayed based on what was clocked in. For the 8 bits going to the LEDs, 0V for LED ON and 5V for LED OFF. This goes on sequentially. The eight bits from the controller are changed. The three bits of the 3 to eight are 001 and Y1 goes high. And B0-B8 are clocked in to the 2nd 574 and updates the LEDs that are be turned on.

The Analog LED Bargraph Display can do more than just a standard bargraph. It can start from the inside and go out or the outside and go in. It can start at one side or the other. And you can switch between two colors for each of the bargraph pairs.

Other embodiments would comprise of variations of the main embodiment. Other 3-8 decoders could be used like the 74ACT138 a normally high one. The 74XXX238 or 74XXX138 could be used in its place where the XXX defines the type of logic used. The Buffer driver chip 74ACT574 could be replaced with a 74XXX274 which has the same pins but in a different arrangement.

Bargraph Patterns FIG. 40-FIG. 44

In this embodiment there are two pair of 60 LED bargraph displays. The upper 60 yellow LEDs and the lower 60 blue LEDs. There are more patterns than the standard bargraph pattern. Firstly, there 60 Blue LEDs for positive values like distance, acceleration, tailgate cushion, tailgate with accel- eration. Secondly, there are 60 yellow LEDs are for negative values like deceleration, tailgate severity with or without acceleration.

And for the left turn right turn bargraph the following occurs. This can only occur when on the right pair of 30 LEDs for XXS. So the right yellow 30 LEDs has a pattern starting at one side and goes to the center for either left right turning.

LCD Serial Display FIG. 33, FIG. 52, FIG. 54

In this embodiment, an LCD Serial Display with 2 lines and 16 characters per line is added to the front driver's display cluster. It runs at 2400 baud. The first line of LCD Display reads '###.#ft' or '##.190 yds' or '##.#m' at 3310. Then '#.##g' at 3320. Then Y, M, A, t or T at 3330. The second line reads 'TG' or 'TA' at 3340. The measurement at 3350 for tailgate with or without acceleration in car lengths or 'CL'. Then the pitch ##° at 3360 then IOS, OIS, LRS, RLS, IOL, OIL, LRL, RLL OR IOs, OIs, LRs, RLs for 3370.

Push button S1 is M>Y>A>t>T and back to M

Push button S2 is IOS>OIS>LRS>RLS>IOL>OIL>LRL>RLL and back to IOS or

Push button S2 is IOs>OIs>LRs>RLs>IOL>OIL>LRL>RLL then back to IOs

Push button S1 and S2, first hold is CALIBRATE x=0 g, y=0 g, z=1 g

Push button S1 and S2, 2nd hold is m>yd>ft and back to m.

Push button S1 and S2, third hold is TG, XXS>TA, XXs>TG, XXs>TA, XXS and back to TG, XXS Other embodiments would comprise of variations of the main embodiment. A 2 line by 20-character LCD Display could be used or any combination of lines and characters. The LCD Display could be changed from serial UART to SPI, I2C nibble or byte input lines. The color of the display and display digits could be changed as well.

Figure 9:
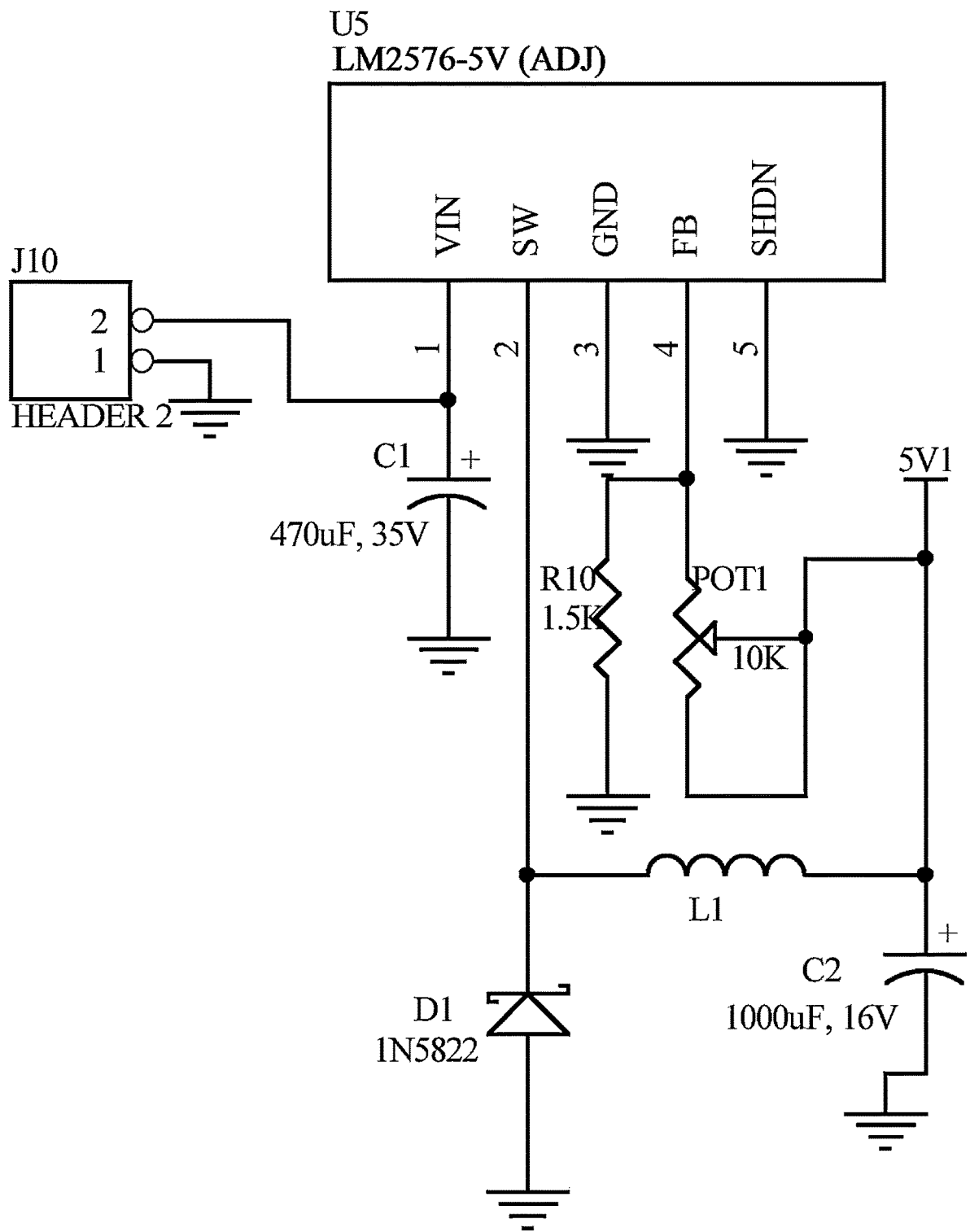
FIG. 9 is a circuit diagram of the schematic of the 5V switching voltage regulator
Figure 10:
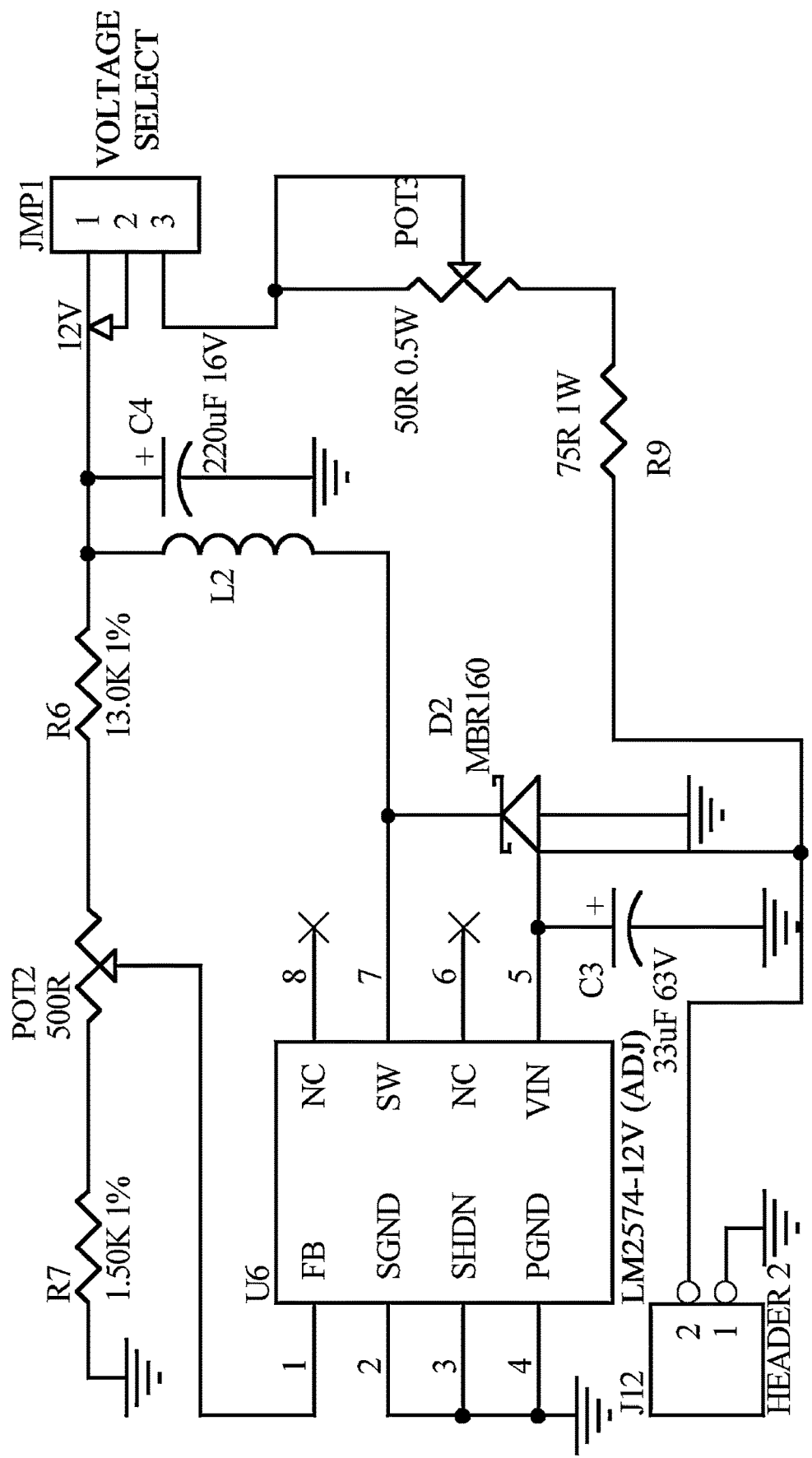
FIG. 10 is a circuit diagram of the schematic of the 12V switching voltage regulator
Figure 18:
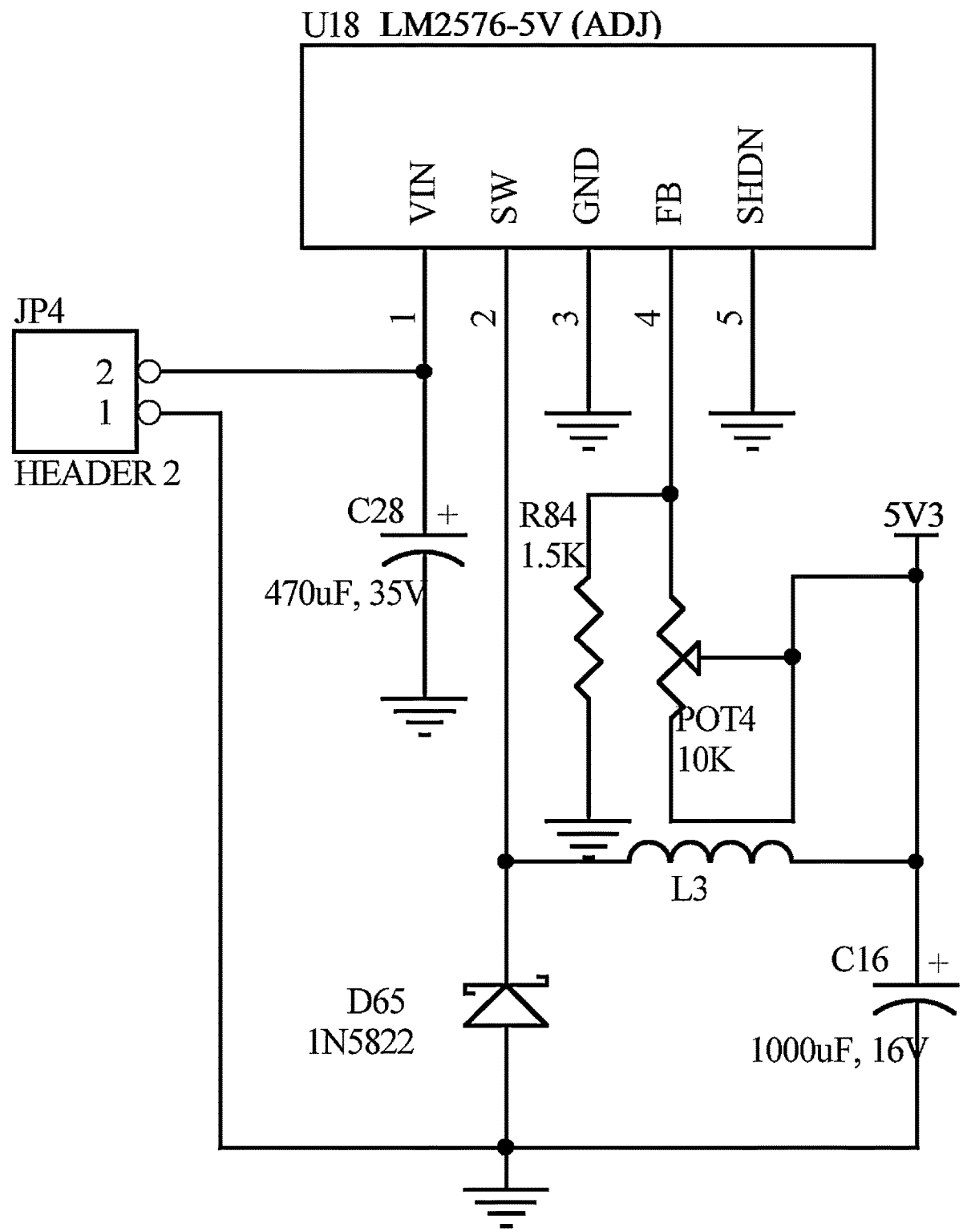
FIG. 18 is a circuit diagram of the schematic of a 5V switching regulator for the LEDPCB if needed

Voltage Regulators FIG. 9, FIG. 10 FIG. 18

In this embodiment, on MCUPCB is the Adjustable Switching Voltage Regulator Circuits consist of two voltage regulators. The first one accepts 14V from the car battery and has an output 12V and up to 0.5 A for the digital display. The two 6.5-inch 7 segment LCD Displays run at 12V, exactly. The second voltage regulator accepts 14V from the car battery and provides 5V and up to 3 A to the rest of the circuitry if selected. Its voltage rail is 5V1. It is a switching regulator which produces less heat and is more efficient. If an adjustable in the series is used, the voltage can be adjusted to 5V or 12V with a voltage divider. The 5V is selectable between the regulator or USB.

In this embodiment, on LEDPCB, The Switching Voltage Regulator Circuit is a backup 5V, 3 A one the same part as on the MCUPCB. Its voltage rail is 5V3. This is to be used if the current gets too high. If it is not used, 5V from the USB or 5V from the MCUPCB could be used.

Other embodiments would comprise of variations of the main embodiment. The 5V regulator would change to 3.3V if the Sensors were 3.3V. The 12V regulator that powers the two LED digits could be changed to accommodate another pair of LED digits. Because of this, current requirements could change, changing the voltage regulator IC's. If the car had a USB port with high enough current it could power the circuitry. Except the 12V 7-segment display would need the car battery to establish 12V.

Figure 11:
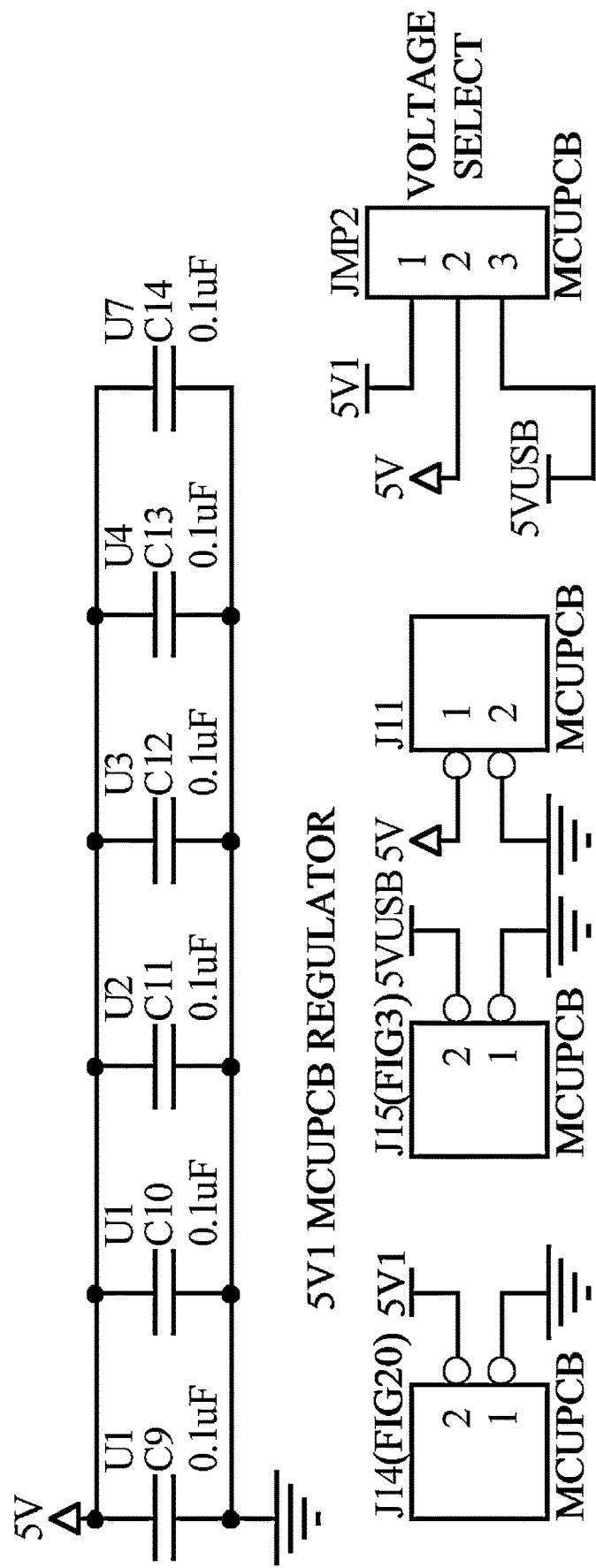
FIG. 11 is a circuit diagram of the schematic of decoupling capacitors for MCUPCB and the headers and jumper switch for the various 5V sources
Figure 20:
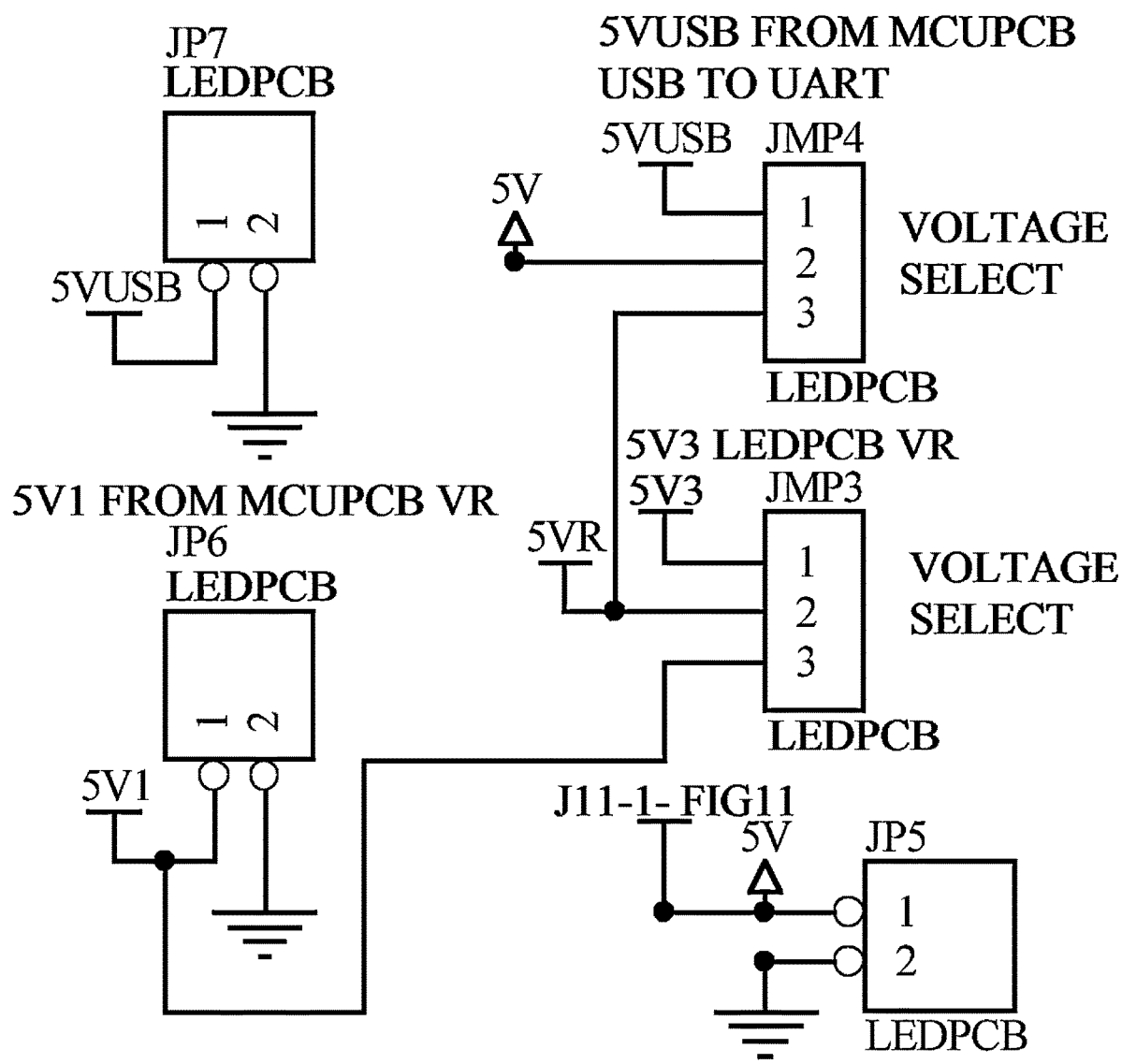
FIG. 20 is a circuit diagram of the schematic of the headers and jumper switches on the LEDPCB for the various 5V sources
Figure 21:
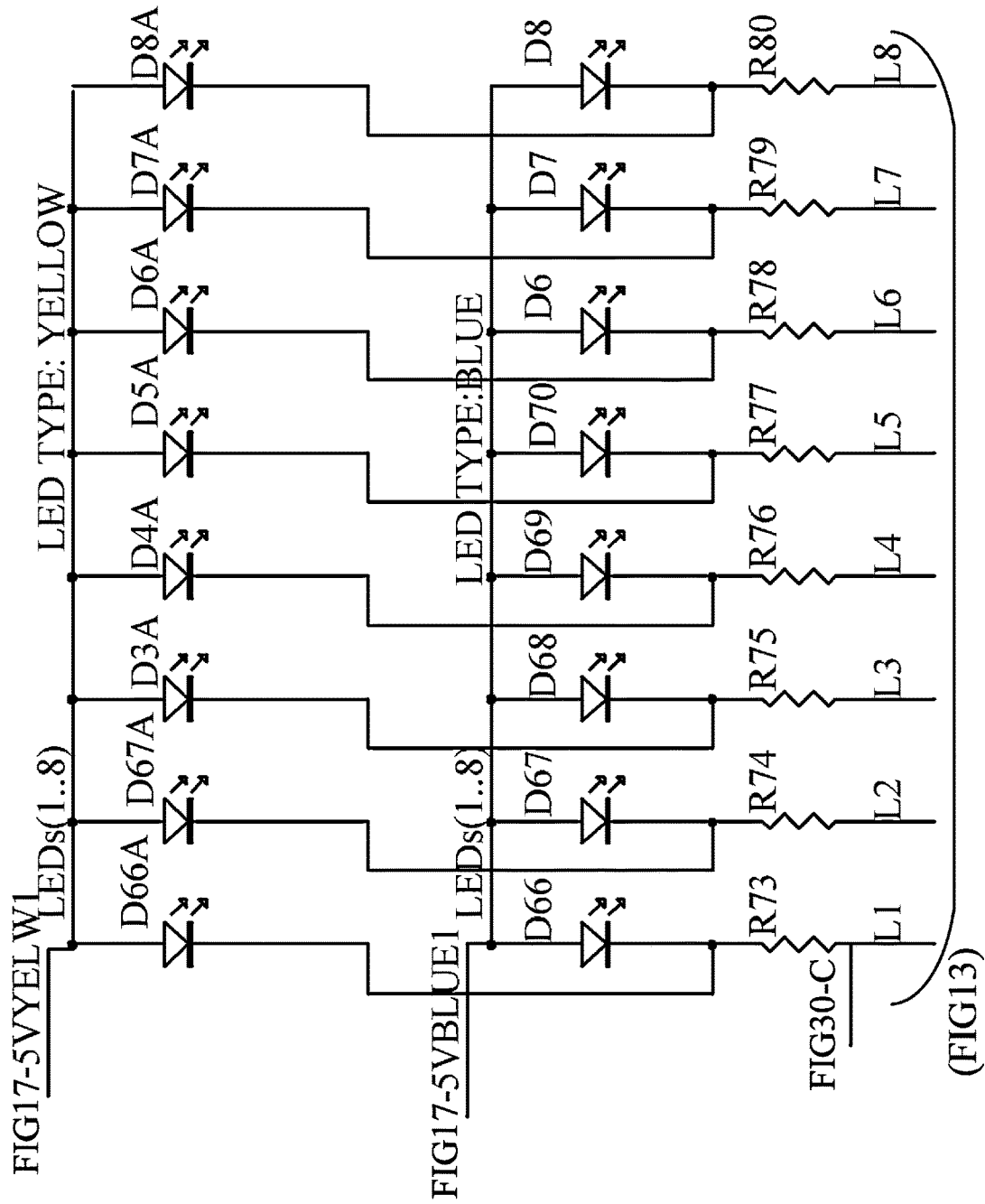
FIG. 21 is a circuit diagram of the first eight upper and lower LEDs for the left bargraph
Figure 22:
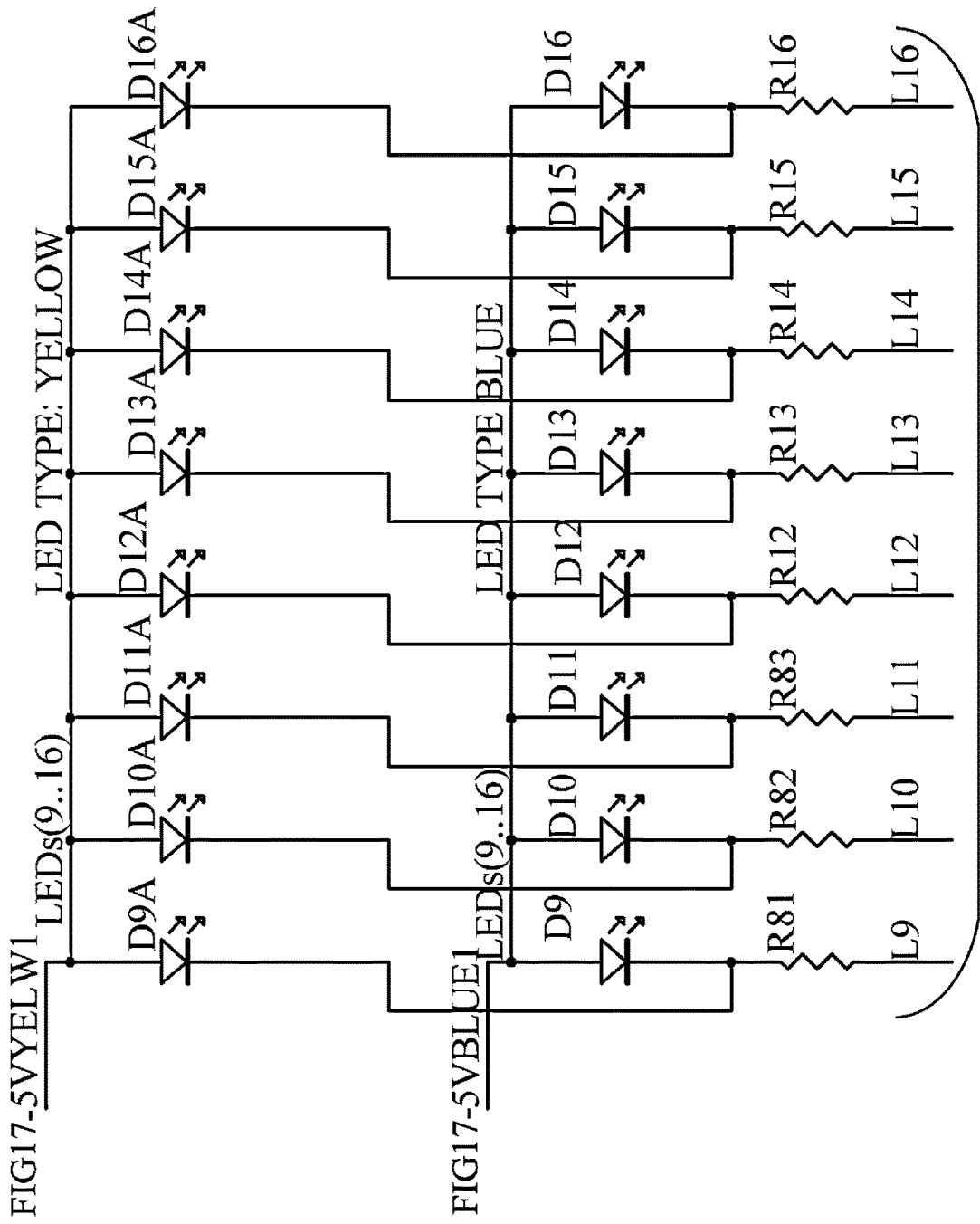
FIG. 22 is a circuit diagram of the second eight upper and lower LEDs for the left bargraph
Figure 23:
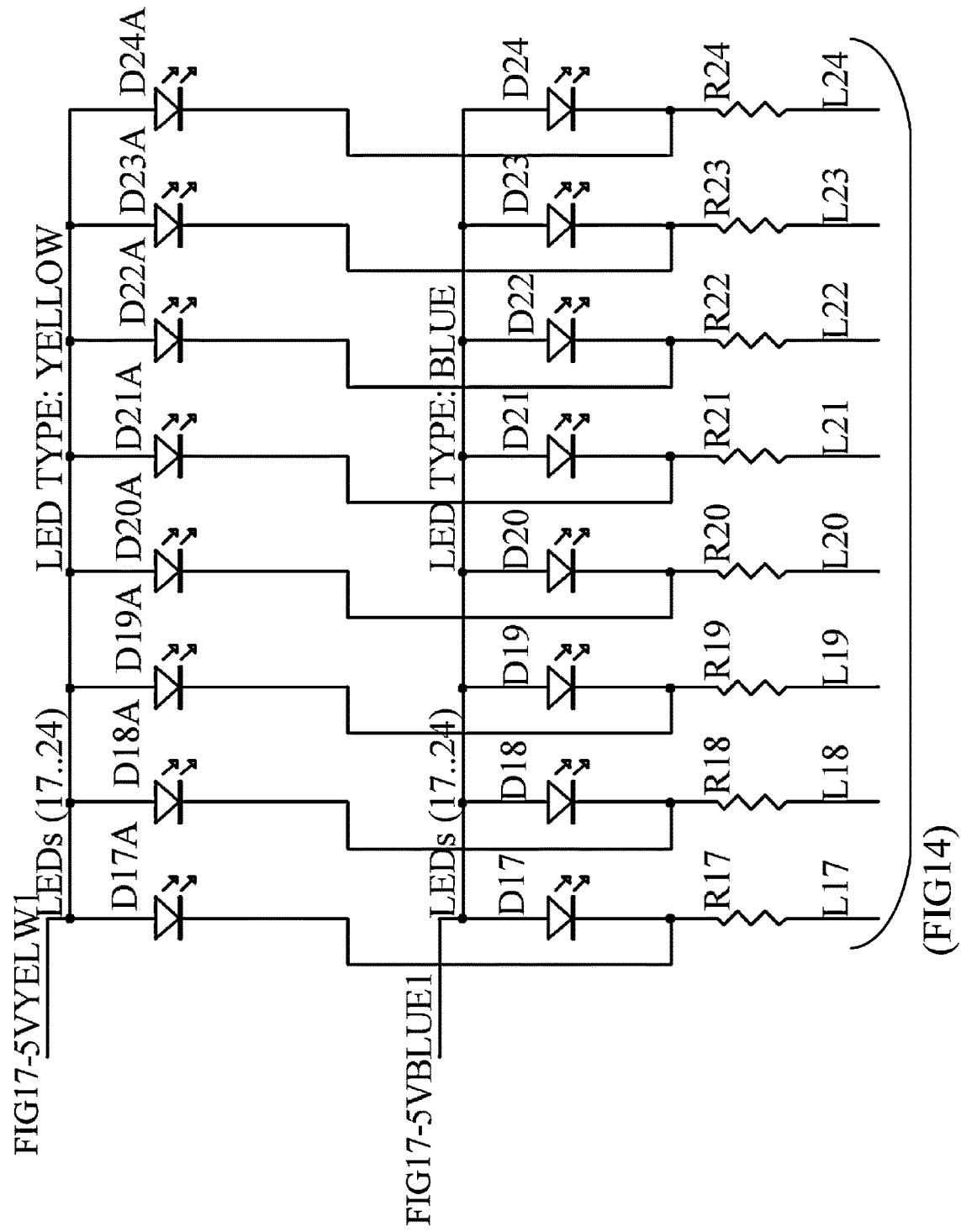
FIG. 23 is a circuit diagram of the third eight upper and lower LEDs for the left bargraph
Figure 24:
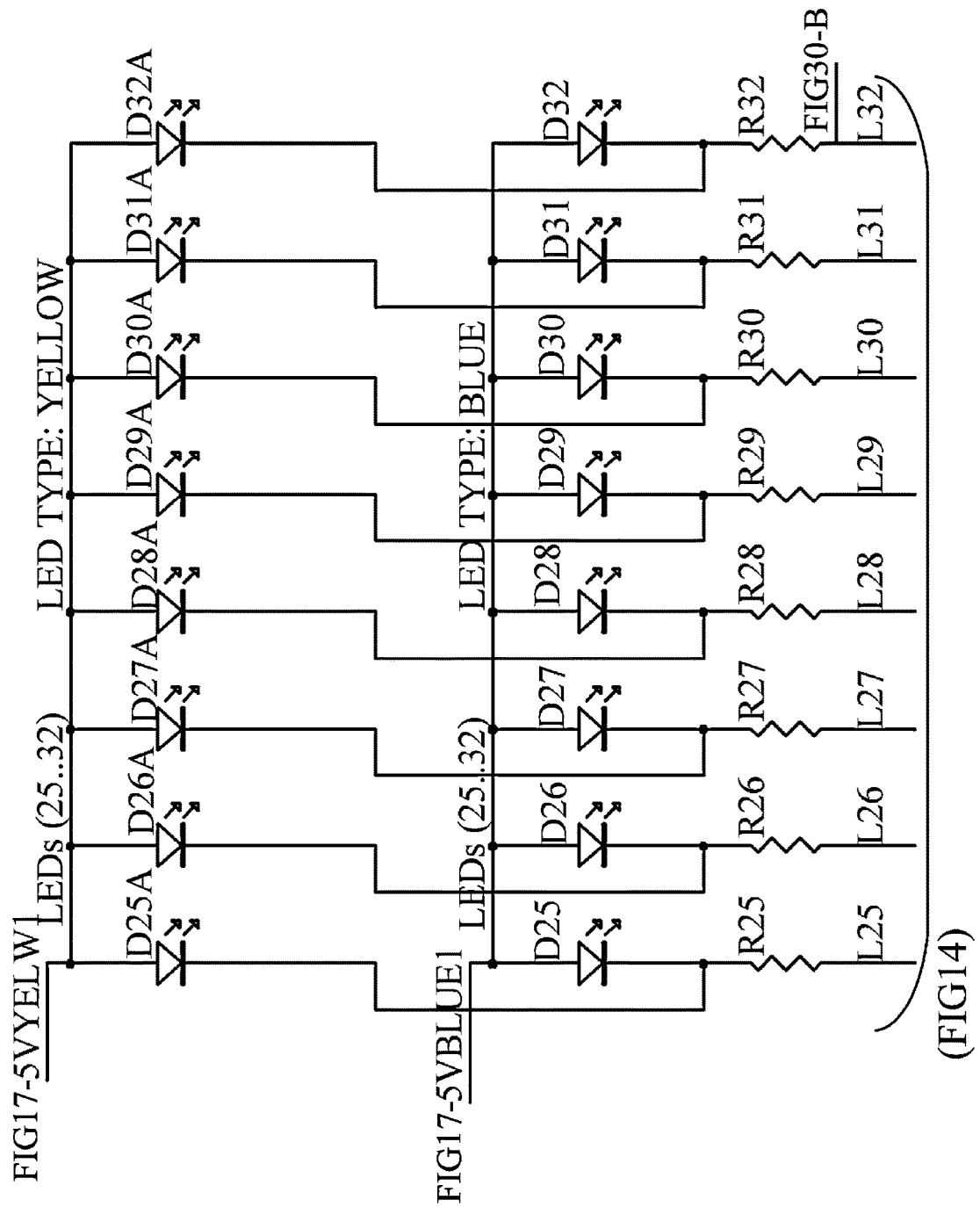
FIG. 24 is a circuit diagram of the fourth eight upper and lower LEDs for the left bargraph
Figure 25:
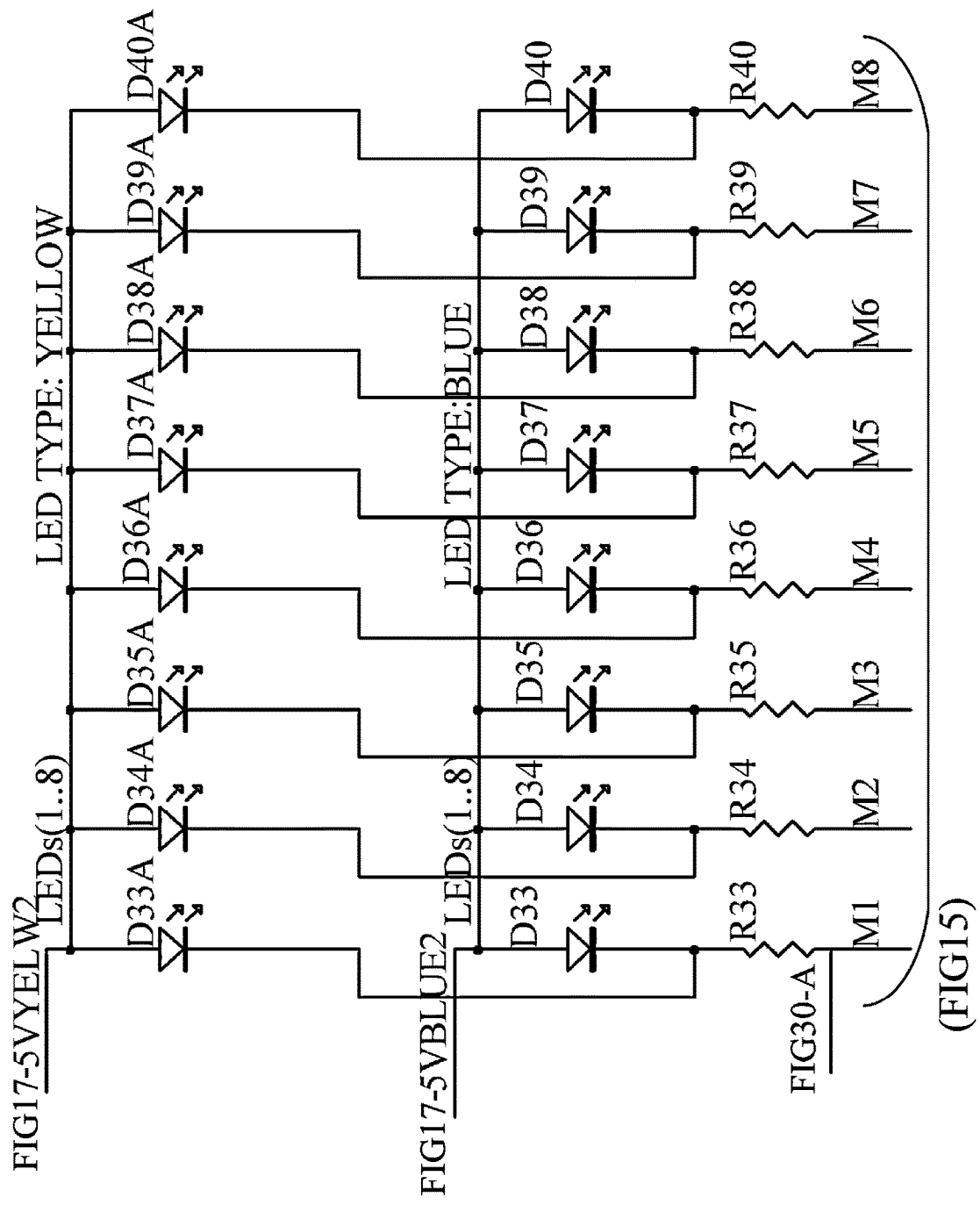
FIG. 25 is a circuit diagram of the first eight upper and lower LEDs for the right bargraph
Figure 26:
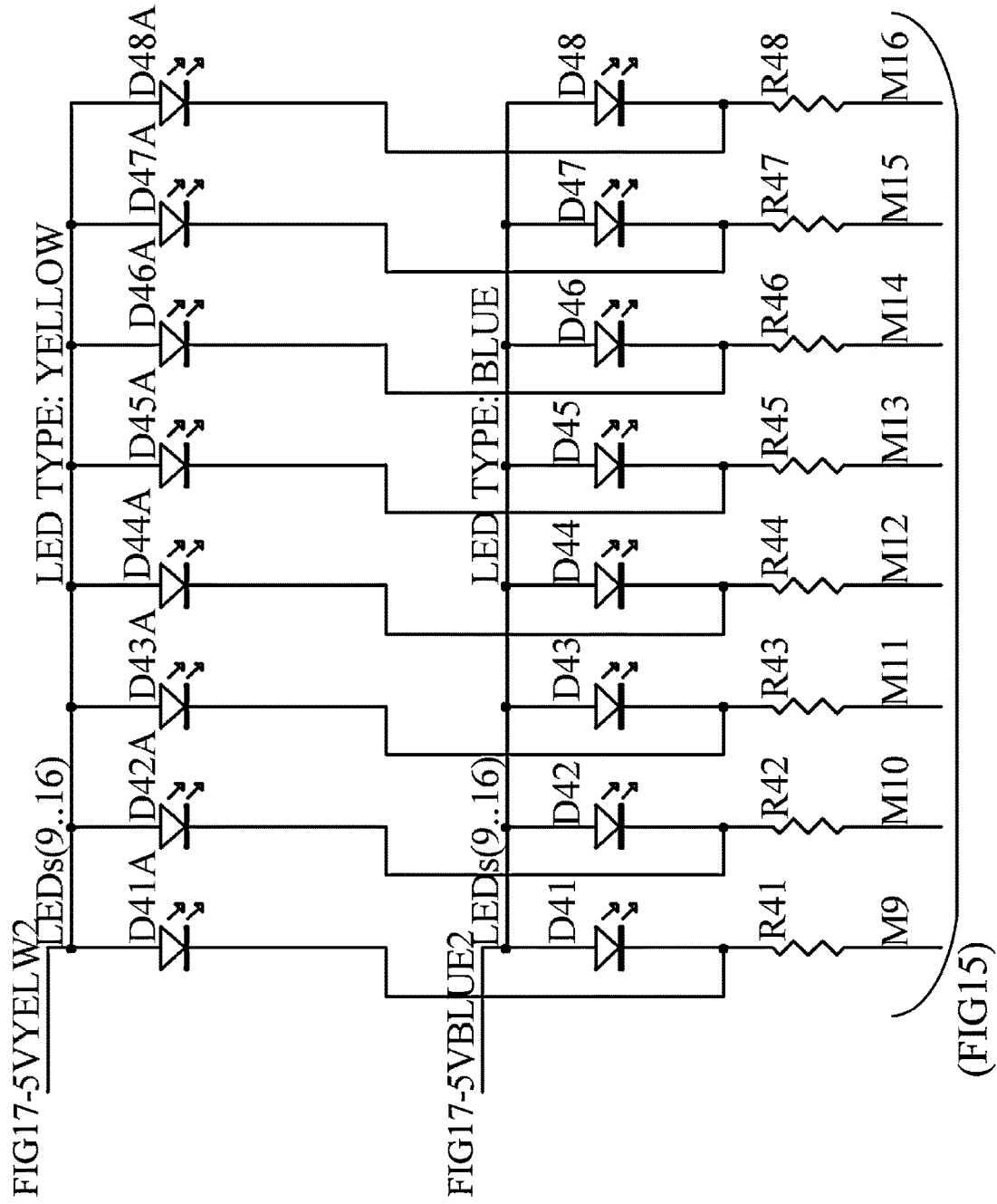
FIG. 26 is a circuit diagram of the second eight upper and lower LEDs for the right bargraph
Figure 27:
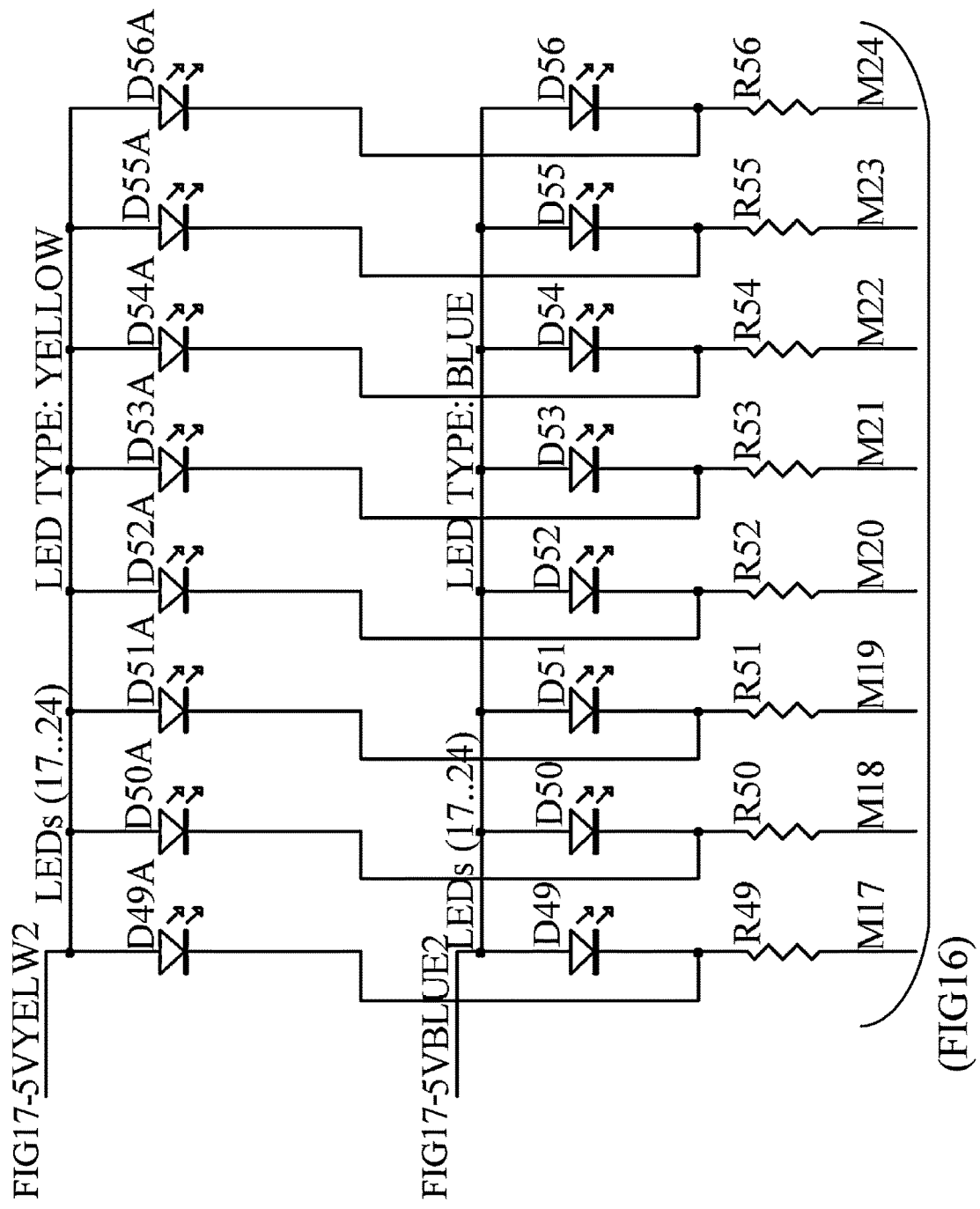
FIG. 27 is a circuit diagram of the third eight upper and lower LEDs for the right bargraph
Figure 28:
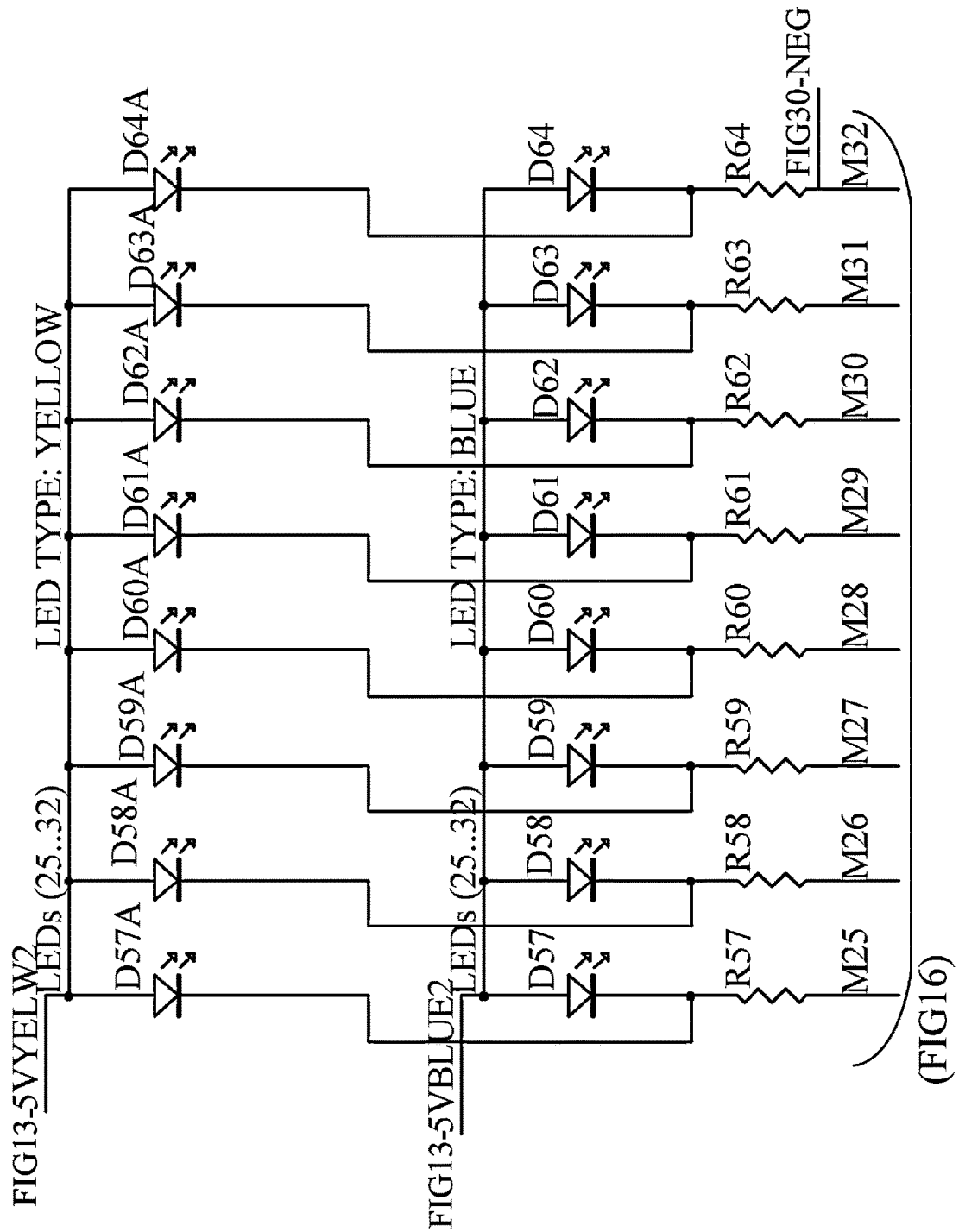
FIG. 28 is a circuit diagram of the fourth eight upper and lower LEDs for the right bargraph

Voltage Connections for Power-Up FIG. 10, FIG. 11, FIG. 20

On FIG. 10, 12V is required for the 7-segment display digits. So the car battery through the cigarette lighter is connected to J12 which is connected to the 12V switching regulator or a resistor-potentiometer that would drop the voltage to 12V. Selectable at JMP1.

Voltage selection on the MCUPCB is done with JMP1 of FIG. 11. Either 5V1, which is the 5V switching regulator on MCUPCB (J14) or 5VUSB (J15) which comes from the USB connector in the car. The selection is called 5V for the MCUPCB.

Voltage selection on the LEDPCB is done with JMP3 and JMP4 of FIG. 20. JP6 receives 5V1 from the MCUPCB. JP7 receives the USB 5V from the car's USB connector. The 5V switching regulator on the LEDPCB has a voltage rail called 5V3. JMP3 selects between 5V1 and 5V3. This selection goes to JMP4 and along with 5VUSB the final selection is made. This rail is called 5V for the LEDPCB.

It should be that only one of the two PCB's provides power so 5V on J11-1 of the MCUPCB can be connected to 5V on JP5-1 of the LEDPCB. And J11-2 could be connected to JP5-2 for ground Tailgate with Acceleration Equation The Tailgate with acceleration equation is a function of distance of car behind in cm. Velocity from OBD-II in KPH converted to MPH. And acceleration in the x direction in g's. The distance of the car behind is converted to car lengths. A car length is 450 cm so divide the Dcm/450.0. Converting KPH to MPH gives MPH=KPH×0.6214. When you divide MPH by 10.0 this gives you the number of car lengths before you start to tailgate. So the equation is $$TGinCL=(Dcm/450.0)-(KPH\times 0.06214) \quad (2)$$

So if $$(Dcm/450.0)>(KPH\times 0.06214) \quad (3)$$

the car is further away than the speed tailgate distance. So this is a tailgate cushion. If instead of greater than it is less than $$(Dcm/450.0)<(KPH\times 0.06214) \quad (4)$$

The car's distance to the car behind is smaller than it is supposed to be so it is a tailgate severity. But acceleration should play a part. If the car starts decelerating quickly, even though it is going slower, the driver behind sees it coming towards him and this is dangerous. If the car is accelerating the driver behind sees it going away from him so it is less dangerous. So we add acceleration factor. If the car is neither accelerating nor decelerating nothing should change so the factor is one. So the factor is (1.00−Axg).

$$TGAinCL=(Dcm/450.0)-((KPH\times 0.06214)\times(1.00-Axg)) \quad (5)$$

Deceleration of 0.5 g give a factor of 1.5 which increases the allowed tailgate distance decreasing cushion then increasing severity.

If there is an acceleration of 0.5 g the factor of 0.5 decreases the allowed tailgate distance decreasing the tailgate severity and increasing the cushion. A more robust equation scales the acceleration so it can be tuned appropriately $$TGwAinCL=(Dcm/450.0)-((KPH\times 0.06214)\times(1.00-(Axg/SCALE))) \quad (6)$$

The equation can be written in firmware in the C language and the distance of the car behind can be compared to the allowed tailgate modified by acceleration using subtraction. Positive TGwAinCL is cushion, negative TGwAinCL is severity.

$$\text{float } Dcm, KPH, Axg, TGwAinCL; \quad (7)$$

$$TGwAinCL=(Dcm/450.0)-((KPH\times 0.06214)*(1.00-(Axg/SCALE))); \quad (8)$$

Additionally, Written Firmware

Figure 55A:
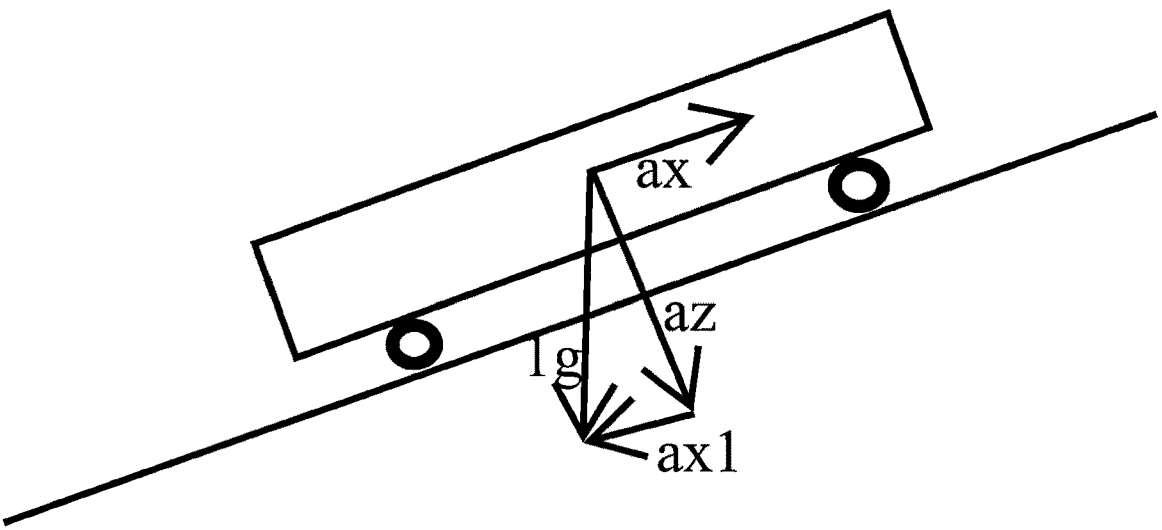
FIG. 55 is a diagram of the acceleration forces when the car goes up and down the hill to calculate pitch and ax based on the force of gravity of 1.0 g
Figure 55B:
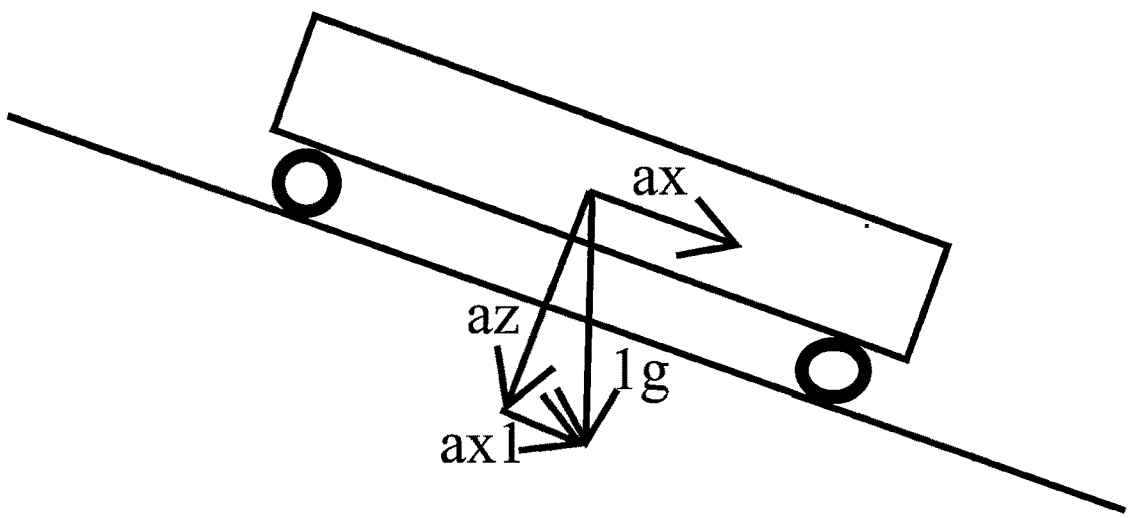
Figure 56:
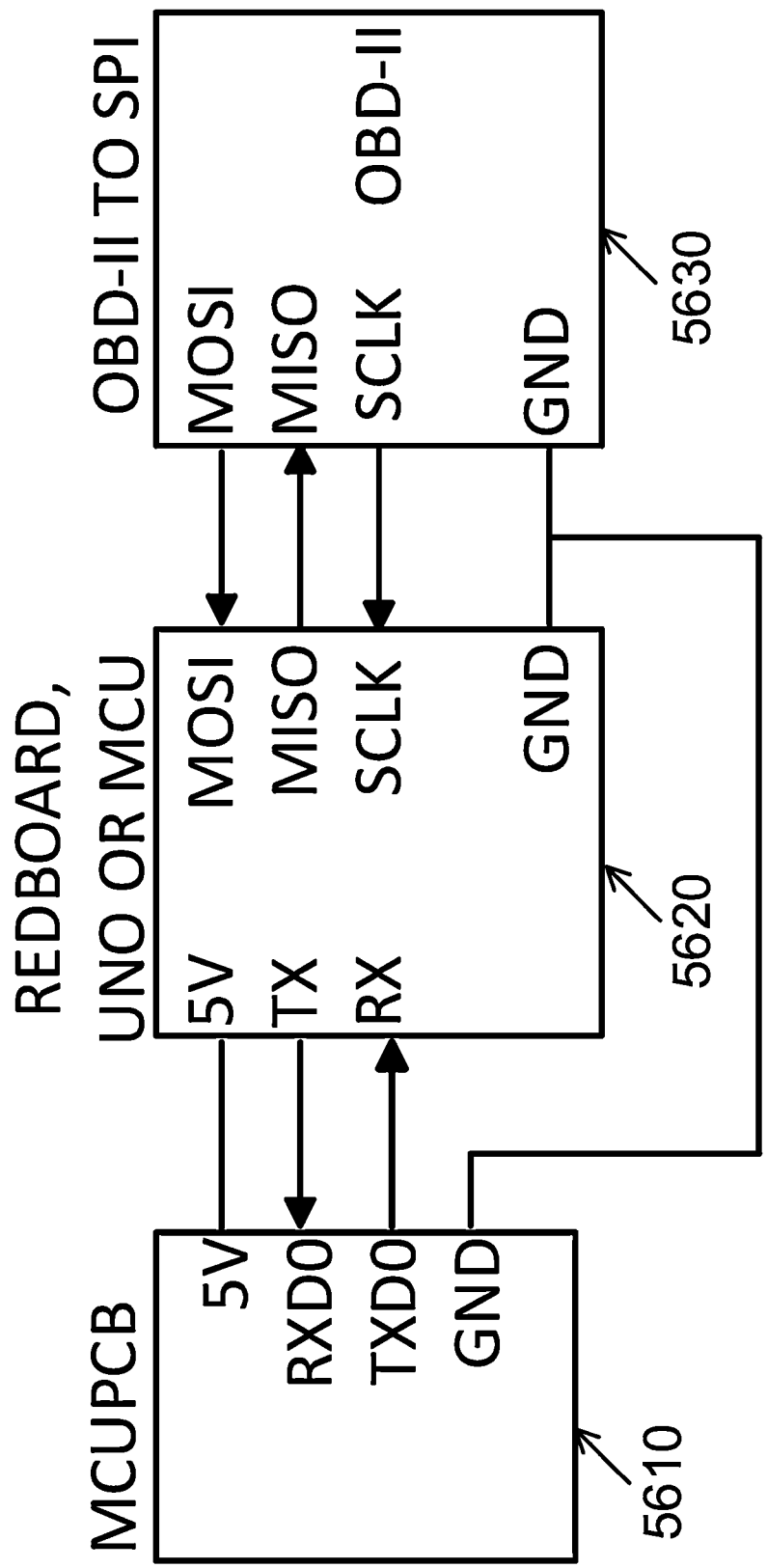
FIG. 56 is a diagram of the connection between the OBD-II connector on the car, the small interface MCU and the main MCU on the MCUPCB to get velocity

In this embodiment, Additional Firmware was written to calm the accelerometer readings from the Accelerometer Module. Fifty readings or more of acceleration data were added up and then divided by the number of readings. The angle pitch was taken along with stationary g-force or acceleration due to gravity alone due to the X and Z axis as a zeroing technique. Programming use of the serial monitor is a UART that ran at 38400 baud For simplicity we will say the acceleration due to gravity is 1 g for all angles. In FIG. 55 (*a*) and FIG. 55 (*b*) the acceleration of the car has to be calculated when it goes up and down a hill. Pitch angle in degrees data can determine if the car is going up or down the hill. In FIG. 55 (*a*) the car is going up a hill. The g-force due to gravity is always present. The acceleration in the z-direction from the sensor is az. az plus another vector perpendicular to it called ax1 will give the 1 g value. From Pythagoras $$ax1=\sqrt{(1^2-az^2)} \quad (8)$$

The acceleration in the x-direction from the sensor is ax. ax is the sum of ax1 a negative number going up the hill and the acceleration due to the car $ax_{CAR}$ up the hill. This is shown in equation (9) and equation (10)

$$ax=ax_{CAR}-ax1 \quad (9)$$

$$ax_{CAR}=ax+ax1 \quad (10)$$

The car acceleration going down the hill is a similar problem. The acceleration due to gravity 1 g is the vector sum of the az sensor and the perpendicular vector az1. This results in Equation (8) again. Again, the acceleration ax is the sum of ax1 a positive number coming down the hill and the acceleration due to the car $ax_{CAR}$ down the hill. This is shown in Equation (11) and Equation (12).

$$ax=ax_{CAR}+ax1 \quad (11)$$

$$ax_{CAR}=ax-ax1 \quad (12)$$

The value of $ax_{CAR}$ is calculated and sent to the displays. The value of $ax_{CAR}$ is displayed on the serial LCD display in g's. The value of $ax_{CAR}$ is displayed on the first pair of bargraph displays. Yellow for negative acceleration and blue for positive acceleration.

Ranging Firmware inspects the distance data to see if it should be displayed as X.X or XX. And switches ON the MCU port pin to BJT Transistor to turn on the decimal point when need.

Time Division Multiplexing Firmware was written to send 8 bits of data from the MCU representing ON and OFF LEDs to each pair of four octal drivers. One by one each driver of the bargraph turns on a light pattern of 8 LEDs until 32 LEDs are done. This is done very quickly so the bargraph runs seamlessly. There are two MCU pins. Each pin goes through half a 4041 IC and two transistors to produce a low-high or high-low pair to turn on or off the four 32 LEDs display. Four lines of the 2 colours of two 32 LEDs are used as data lines so the effective number of LEDs for the display 2 colours two 30 LEDs The LCD Serial Display was programmed with an LCD Firmware Driver, printing to the display. The written program was incorporated with "Beerware Licensed" Firmware Drivers. They state "Do What Ever You Want With The Code". This completes the Firmware.

Operation of Preferred Embodiment

The system is set up to have the 2-digit LED display and the two pair of 30 LED bargraph, in the back of the car and the LCD Character Display, by the instrument cluster. The power for the circuitry is a line connected to the cigarette lighter. Or built in directly into the car by the manufacturer. Additionally, the OBD-II connector would be plugged into the OBD to Serial board.

The Distance Measuring Sensor is pointed to the car behind on the back of the car. Not through the window. The accelerometer is aimed so the x-axis is parallel to it when the car is driving straight. And the accelerometer is placed flat.

Once the car's ignition is turned ON the circuitry is powered through the cigarette lighter. Or built in directly into the car by the manufacturer. It will start up with the last configuration setting before it was turned OFF. Usually this is in default mode.

The back two digits display the distance to the car behind. One pair of bargraph shows the acceleration in blue and deceleration in yellow in the x direction. The other pair of bargraphs shows the acceleration in the y direction due to turning left or right when that menu item is selected.

The driver's serial LCD character display, near the instrument cluster, shows distance to the car behind, acceleration, tailgating severity/cushion −/+ respectively and pitch. The lower left side of the LCD displays tailgate with or without acceleration, TA or TG respectively in Car Lengths or CL FIG. 34 to FIG. 54, 3400 to 5400 are fairly self-explanatory by their titles. The flowcharts themselves are in depth and will not be repeated in depth here in text, but are contained in the claims It is important to show how they affect the LCD Display of FIG. 33.

Firstly, FIG. 34-FIG. 39 Pressing S1 toggles through yards Y 1.2, acceleration A 1.3, Tailgate t 1.4, Tailgate with acceleration T 1.5 and meters M 1.1. The letters for each toggle are displayed on the 3330. The menu items are briefly displayed on the 7 segment display and on 3330. The EEPROM saves the state the pushbutton called up. So after power down and power up you don't have to reenter the state. It was loaded in on power up.

Secondly, FIG. 40-FIG. 49 pressing S2 toggles the LED patterns through left LED bank outside-inwards IOX 2.2, left LED bank left to right LRX 2.3, left LED bank right to left RLX 2.4, both LED banks inside-outwards IOL 2.5, both LED banks outside-inwards OIL 2.6, both LED banks left to right LRL 2.7, both LED banks right to left RLL 2.8, left LED bank inside-outwards IOX 2.1. The X is either a small s or large S depending on how it is set on the fifth paragraph. The letters for each toggle are displayed on 3370. The menu items are displayed briefly on the 7 segment display and 3370. The EEPROM saves the state the pushbutton called up. So after power down and power up you don't have to reenter the state. It was loaded in on power up.

Thirdly, FIG. 50, pressing S1 and S2 together calibrates the accelerometer and gyroscope in all three directions. You can see the zeroing of the acceleration in the x direction on the LCD display 3320. The EEPROM saves the state the pushbutton called up. So after power down and power up you don't have to reenter the state. It was loaded in on power up.

Fourthly, FIG. 51-FIG. 52, pressing S1 and S2 together toggles the unit of distance behind on the LCD display between meters yards and feet. You can see this change on the LCD Display on 3310.

Fifthly, FIG. 53-FIG. 54, pressing S1 and S2 together toggles between Tailgate with acceleration 'TA' and tailgate without acceleration 'TG' as well as the right LED bank not being used 'XXs' or the right LED bank displaying left and right turn 'XXS'. The order is 'TG' 'XXS' then 'TA' 'XXs' then 'TG' 'XXs' then 'TA' 'XXS'. One can see the changing between 'TG' and 'TA' on the LCD Display 3340 and the 'XXS' or 'XXs' on 3370.

The Tailgate has the negative value of severity and the positive value of cushion. Negative severity is displayed on the LCD Display 3350 as a negative number with 2 digits left of the decimal place in CL or car lengths. Positive Cushion is displayed on the LCD Display 3350 as a positive number with 2 digits left of the decimal place in CL or car lengths.

The angle of the car in the x direction is shown as positive or negative degrees on the LCD display 3360.

When the system is operating, the driver behind can see the rear displays and monitor and be warned and react to dangerous driving conditions based on the data displayed. One could slow down if the yellow bargraph shows high deceleration. Similarly, the driver of the car can see the LCD character display and monitor, be warned and react to dangerous driving conditions. This may be speeding up for a tailgater or reducing the rate of one's deceleration when slowing down. Making car travel safer for both.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated. Any headings utilized within the description are for convenience only and have no legal or limiting effect.

INDEX OF ELEMENTS

10: Microcontroller Accepts Data
11: Wire Harness From Sensors Connected To Microcontroller
12: Firmware for Distance Measuring Sensor To Get Distance Data
13: Firmware for Accelerometer Module To Get X, Y, Z Acceleration
14: Firmware for Velocity To Get Car Speed in Km/hr
20: Distance Measuring Sensor
21: Distance Measuring Sensor UART Transmits And Receives, 5V Supply
22: Wire Harness for Tx1 Rx1 From DMS To Microcontroller
23: Wire Harness for 5V And Ground From Microcontroller To DMS
30: Accelerometer Module With Pitch
31: Accelerometer Module, I2C, 5V Supply
32: Wire Harness 5V And Ground From Microcontroller To Module
33: Wire Harness SDA, SCL From Module To Microcontroller
40: Velocity Sensor on Car's OBD-II System
41: Car's OBD-II Connector With 12V And Ground on Connector 42: OBD-II To DB9 Connector
43: OBD-II To Serial Board With DB9 Connector Powered By Car's 12V Battery
44: UART From OBD-II To Serial Board
45: Tx Rx Ground Wire Harness To Microcontroller Tx0 Rx0
50: Data Selection
51: Two pushbutton switches normally OFF or open circuit
52: Two debounce circuits with resistors and a capacitor
53: Connected to the Microcontroller to sample in main loop of firmware
60: Digital Display
61: Two 7 segment 6.5" displays
62 Two BCD to 7 segment display IC's 74LS247
63: A group of four outputs lines from microcontroller for each IC
64: One further Microcontroller output line for decimal point display.
65: A group of 7 lines a-f connected from 74LS247 to LED display for each 74LS247
66: Each 7 segment display connected to 12V
70: Analog Display
71: Three to Eight Decoder Active High 74ACT238
72: Eight Driver IC's 74ACT574.
73: One of Eight lines of decoder connected to CP of 74ACT574
74: Eight output lines of microcontroller connected to 74BCT573 Driver
75: and then in Parallel to 8 74ACT574
75: Output of each 74ACT574 connected to two super bright LEDs
76: Produces two pairs of 32 LEDs Bargraphs
77: Two Pairs of LEDs controlled by two transistors.
78: In One Pair, If One Bargraph is Off the Other is On
80: Serial LCD Display
81: A serial LCD display with 2 lines of 16 characters that runs at 9800baud
82: Wire Harness with 5V Ground and Transmit from microcontroller
83: Software UART for Transmit can be used
90: Voltage Regulators
91: 1st Voltage Regulator for 12V
92: Input Anti-ripple Capacitor in Parallel Connected To Car Battery
93: Output Anti-ripple Capacitor Connected To 12V And 7 Segment Display
94: Regulator for 5V High Current Required Choose Switching Regulator
95: Voltage Programming Resistors may be needed
96: 2nd Voltage Coil Used for Switching Capacitor
97: Input Anti-ripple Capacitor in Parallel Connected To Car Battery
98: Output Anti-ripple Capacitor Connected To 5V Supply Additional Information about Three Boards The Embedded Firmware for the Microcontroller has been placed in a Sequence Listing as a text file called Firmware.txt, Firmware2.txt and Firmware3.txt. It contains firmware that controls IC's on MCUPCB the interface MCU and the secondary MCU respectively.

For the main MCU, where the firmware.txt is used that collects data for the sensors for distance, (ax,ay,az) acceleration and velocity. Additionally, the serial LCD display and 2 digit seven segment display with a decimal point and two pushbuttons. Data is extracted from the sensors and calculations done and sent out to the displays. It also contains firmware that controls IC's on LEDPCB. That is firmware that multiplexes eight lines with 4 inputs, one an enable to a 3-8 decoder and two lines for row select to control the LED's. This is for two of two rows of 30 LED's. Different LED display patterns can be programmed displaying sensor data. Display Patterns may be selected using pushbuttons. Display patterns can be from the center outward, from the edges inward, left to right and right to left.

Left and right acceleration in the y direction from turning, would be on one of the right yellow 30 LEDs. The 2 digit seven segment display with decimal point would display the acceleration. The digits would blink when acceleration is negative.

The LCD Serial Display in the instrument cluster, typically would show the distance of car behind, acceleration in g's and severity of tailgate with and without acceleration in car lengths 'CL', the angle of the car in degrees in the x direction and menuing information.

A typical use would be acceleration and deceleration, in the main direction of car motion similar to the x direction using the left two rows of LED's One for acceleration left blue row of 30 LEDs and one for deceleration left yellow row of 30 LEDs.

The interface MCU is the Redboard where the firmware2.txt takes SPI velocity data and sends it by UART to the main MCU. It also requests velocity data from the CAN PCB on the OBD-II computer.

The secondary MCU is the 40 pin ATmega microcontroller where the firmware3.txt takes 3 lines from the 60 LEDs and outputs characters for the units to the 2 character by 16 segment display.

Block Diagram Compares to Schematics
MCUPCB is
   The Microcontroller 100 is U1 in FIG. 2
   The distance sensor 105 is J7 in FIG. 3, FIG. 29
   The Accelerometer 110 is J5 in FIG. 3, FIG. 29
   The Velocity Sensing 115 is J8 in FIG. 7, FIG. 30
   The Pushbuttons 125 are S1 and S2 in FIG. 6
   The LCD Serial Display 130 is J3 in FIG. 3, FIG. 29, FIG. 33
   The BCD to Seven Segment 135 are U3 and U4 in FIG. 4
   The Two Seven Segment Digits 140 are J1 and J2 in FIG. 4, FIG. 31
   The 8 bit bus going to 145 LEDPCB is J13 in FIG. 29
   The two bits going to 145 LEDPCB is J4 in FIG. 29
   The four bits going to 145 LEDPCB is J6 in FIG. 29
LEDPCB is
   The 3-8 decoder with enable 145 is U19; U17 is the driver in FIG. 12
   The 8 Octal Drivers 145 are U8-U15 FIG. 13-FIG. 16
   The row select IC's and BJT's 145 is U16 and Q2-Q5 FIG. 17
   The first two rows of 30 LED's 150 and 155 are contained in FIG. 21-FIG. 25
   The second two rows of 30 LED's 160 and 165 are contained in FIG. 26-FIG. 31

FIGURES SCHEMATICS WITH REFERENCE DESIGNATORS PART AND FUNCTION

FIG. 2 U1 MCU
FIG.; J3 LCD display, J4 LED banks, J7 DME, J5 accelerometer, J6 3 to 8 decoder, J9 programming UART, USB to UART
FIG. 4; U3 and U4 74LS247N; J1, J2 connects to 2 by 16 segment digits; Q1 and R5 decimal point driver FIG. 5; U2 74ACT573N replaced with 16-DIP shunt switch, all eight shorted across; Y1, C5, C6 crystal circuit.

Figure 14:
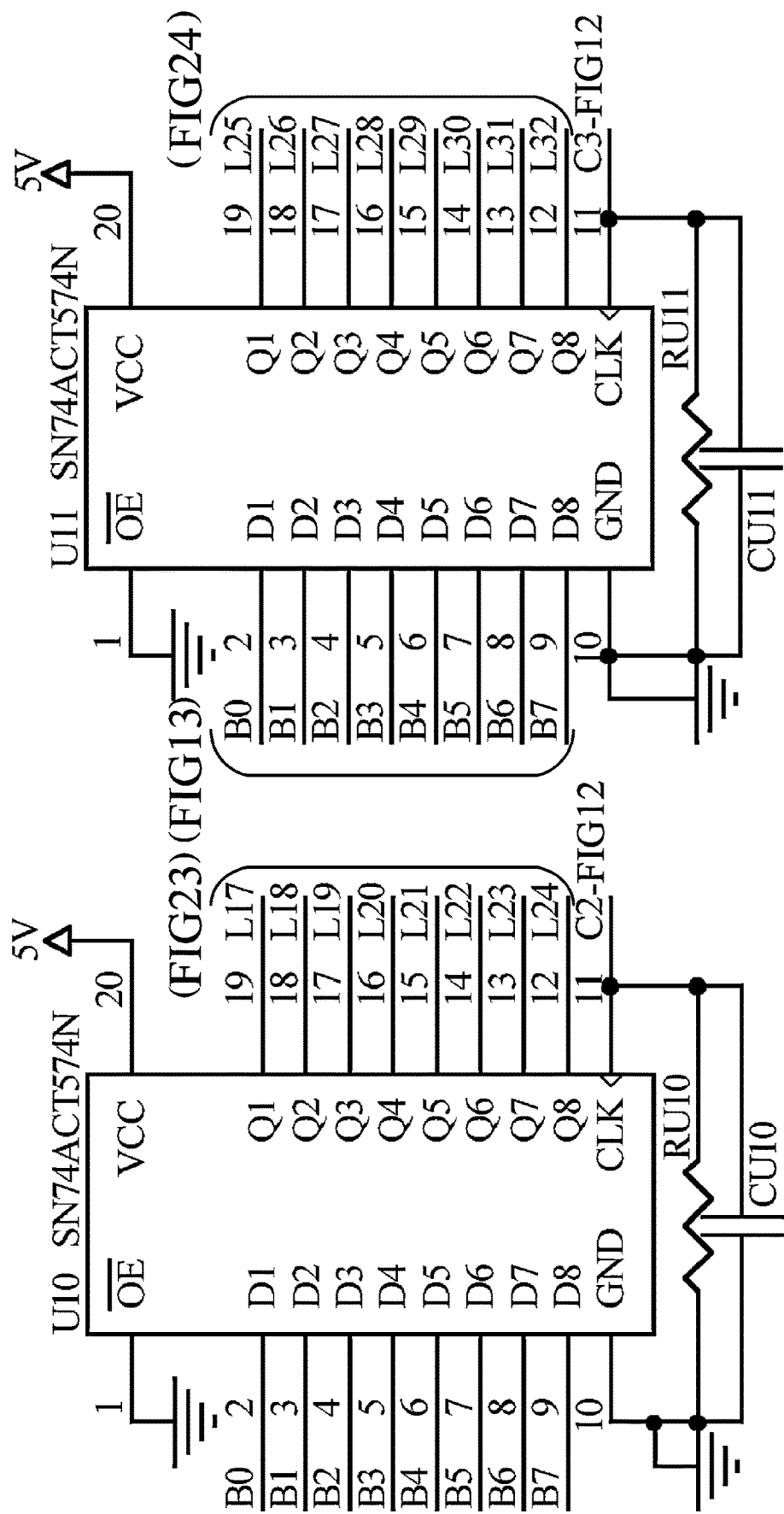
FIG. 14 is a circuit diagram of the schematic of the second two clocked buffers going to the LED bargraph
Figure 15:
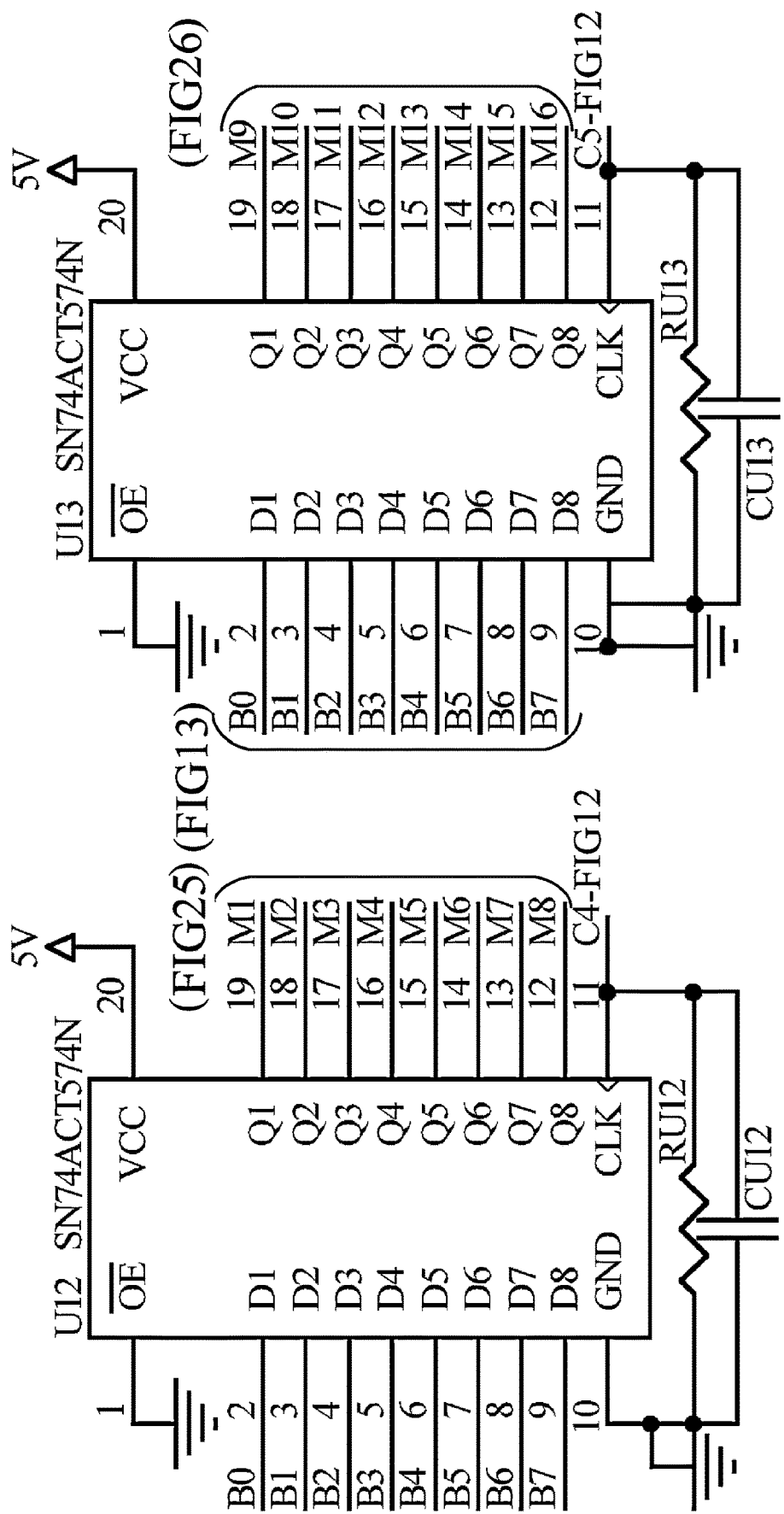
FIG. 15 is a circuit diagram of the schematic of the third two clocked buffers going to the LED bargraph
Figure 16:
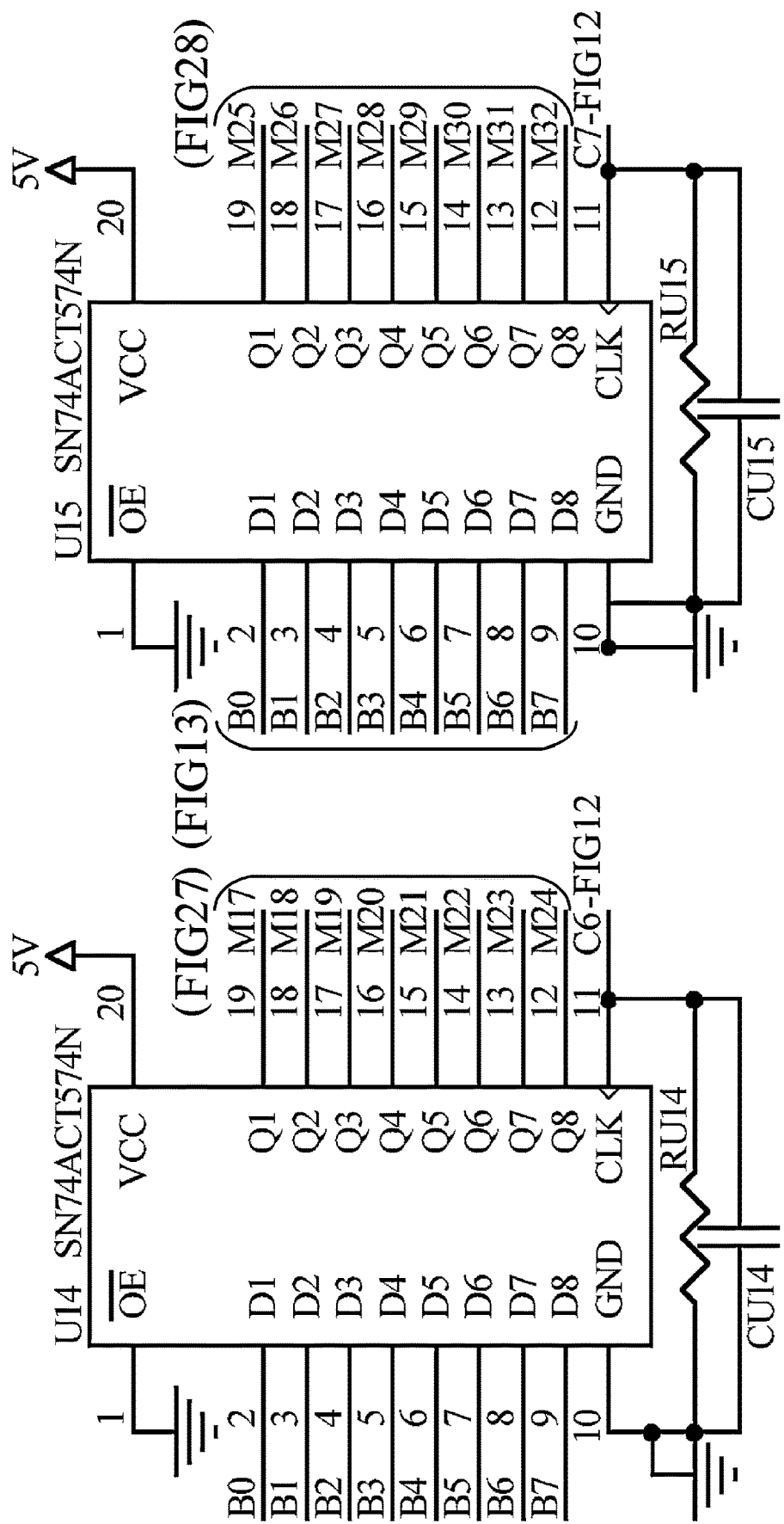
FIG. 16 is a circuit diagram of the schematic of the fourth two clocked buffers going to the LED bargraph
Figure 17:
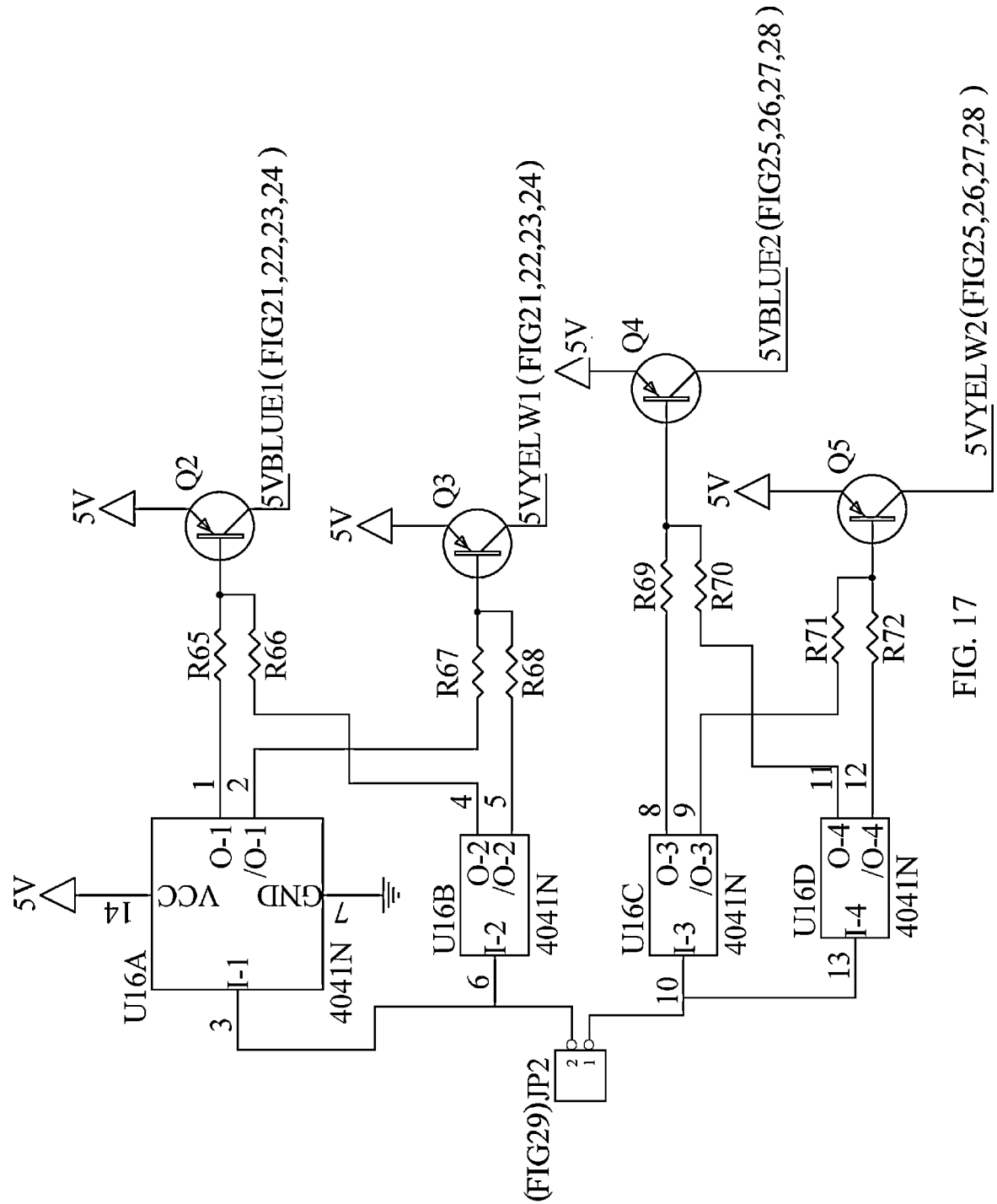
FIG. 17 is a circuit diagram of the schematic of two binary lines from the MCU going to current drivers to switch left upper and lower and right upper and lower LED banks.

FIG. 6; S1, C7, R2, R1 S1 pushbutton with debounce; S2, C8, R4, R3 S2 pushbutton with debounce FIG. 7; S3, UART TO Redboard switch; J8 to Redboard; R11, D3 Power on LED FIG. 8 U7 74ACT573N replaced with jumpers; S4, R8 reset switch; J9 UART programmer; D4, D5, C15 UART reset circuit FIG. 9 U5, C1, D1, C2, L1, J10, POT1, R10 switching regulator circuit 5V FIG. 10; U6, J12, C3, D2, R9, POT3, C4, R6, POT2, R7, JMP, L2 12V 0.5 A switching regulator circuit FIG. 11; C9, C10, C11, C12, C13, C14; FIG. 14 5V regulator header, J15 5V USB header; J11 5V selected header, JMP2 Jumper select between 5V regulator and 5V USB FIG. 12; U19 74ACT238N 3 to 8 decoder, U17 74ACT573N changed to 16 DIP Shunt switch, all eight shorted across; JP3 header on LEDPCB connected to J6

Figure 19:
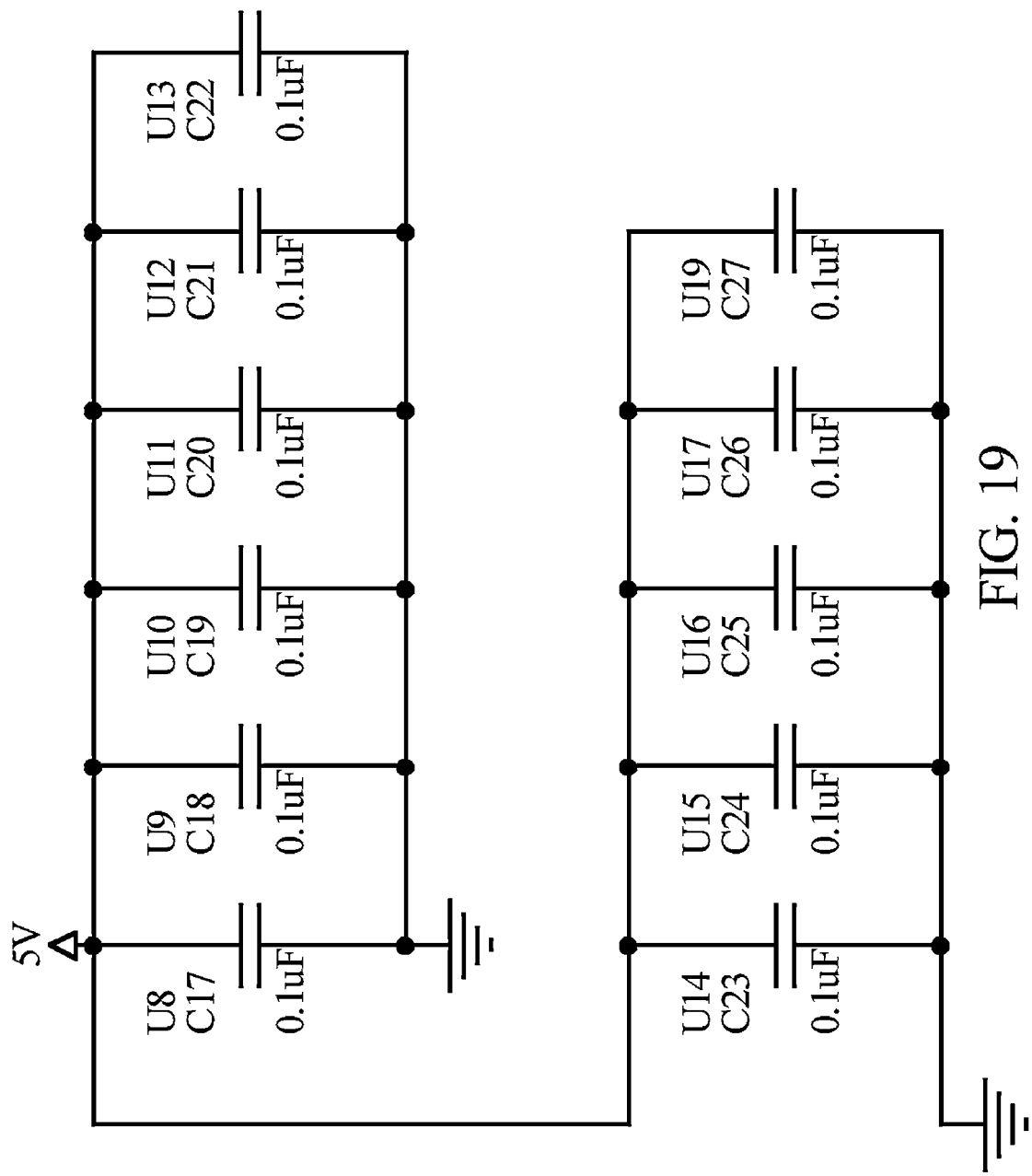
FIG. 19 is a circuit diagram of the schematic of the decoupling capacitors for the LEDPCB

FIG. 13-FIG. 16; U8-U15 74ACT574N one of 8 clocked in 8 line driver; CU8-CU15, RU8-RU15 filters out clock ripple; JP1 8 data bit header connected to J13 MCUPCB FIG. 17; U16 4041 driver, inverting driver, Q2-Q5 ZTX550 high current drivers for yellow blue LEDs FIG. 18 U18, JP4, C28, D65, R84, POT4, C16, L3 5V switching regulator circuit FIG. 19 C17-C27 decoupling capacitors for U8-U17, U19 on LEDPCB FIG. 20 JP7 5V USB header LEDPCB; JP6 5V MCUPCB header; JMP3 jumper select between 5V MCUPCB regulator and 5V LEDPCB regulator; JMP4; jumper select between 5V regulator and 5V USB; JP5 selected 5V on LEDPCB that goes to 5V on MCUPCB FIG. 21; D66A D67A, D4A-D8A Yellow LEDs; D66-D70, D6-D8, Blue LEDs, R73-R80 LED resistors FIG. 22; D9A-D16A Yellow LEDs; D9-D16 Blue LEDs; R81-R83, R12-R16 LED resistors FIG. 23; D17A-D24A Yellow LEDs; D17-D24 Blue LEDs; R17-R24, LED resistors FIG. 24; D25A-D32A Yellow LEDs; D25-D32 Blue LEDs; R25-R32 LED resistors FIG. 25; D33A-D40A Yellow LEDs; D33-D40 Blue LEDs; R33-R40, LED resistors FIG. 26; D41A-D48A Yellow LEDs; D41-D48 Blue LEDs; R41-R48, LED resistors FIG. 27; D49A-D56A Yellow LEDs; D49-D56 Blue LEDs; R49-R56, LED resistors FIG. 28; D57A-D64A Yellow LEDs; D57-D64 Blue LEDs; R57-R64, LED resistors FIG. 29 J13 to JP1 headers connected between MCUPCB and LEDPCB 8 lines for eight 74ACT574N; J3 LCDU-ART; J5 Accelerometer; J7 Distance meter, J6 to JP3 3 to 8 decoder headers between MCUPCB and LEDPCB; J4 to JP2 colour switching of LEDs between MCUPCB and LEDPCB.

FIG. 30 SECPCB secondary PCB U1 40 pin ATmega 1284; U2, U3, R1, R2 16 segment LED display circuit; U5-U7 74ABT573N 8 line drivers Q1, D1, D2, D3, D4 4 LED MINUS sign with transistor driver; voltage regulator circuit, programming connector circuit

The invention claimed is:

1. An MCU-based tailgate acceleration measuring device configured to read sensor data, calculate acceleration, and display tailgate distance and acceleration data, comprising:

a) firmware programmed to calculate tailgate acceleration using the equation TailgatewithAcceleration=(Distance to car behind in car lengths)−(miles per hour of car)/10.0)×((1.00−(acceleration in x direction of car)/(scale factor));

b) an OBD-II connector cable that connects to a PCB to retrieve the car's velocity;

c) an interface board configured to receive velocity data and transmit it to the main MCU;

d) a three-axis accelerometer with a gyroscope for capturing motion data and transmitting it to the main MCU;

e) a distance sensor for measuring the distance to the car behind and transmitting the data to the main MCU;

f) two push buttons, wherein: i) one button controls the type of sensor and tailgate data displayed, ii) the other button controls the bar graph pattern and the distance units displayed on the car driver character display via the main MCU;

g) a car driver character display that shows sensor data, tailgate acceleration, and menu information controlled by the main MCU;

h) two decoder ICs, interfacing with the MCU, to drive a two-digit numeric display for presenting sensor and tailgate data with and without acceleration, as well as menu numbers;

i) an EEPROM integrated with the MCU for storing user preferences, including units of measurement and LED bar graph patterns, ensuring data retention during power cycles;

j) a 5V voltage regulator to power the MCU PCB, with an option to select power from a 5V USB port via a jumper switch;

k) a 12V voltage regulator to power two large numeric digit displays located at the rear of the car;

l) a secondary MCU configured to accept three input bits and output data to three drivers connected to two alphanumeric display digits at the back of the car, showing measurement units on a two-digit LED display;

m) a decoder circuit to select one of eight 8-line drivers that power 64 output lines, wherein: i) 60 lines are used for the bar graph display, and ii) 3 lines control the units for the alphanumeric display and one line controls the minus sign for the numeric display;

n) a left-side LED bar graph comprising 30 LEDs in two levels, capable of switching between two color levels and displaying various patterns via firmware;

o) a right-side LED bar graph comprising 30 LEDs in two levels, similarly capable of switching between two color levels and displaying various patterns via firmware;

p) a 5V voltage regulator to power the LED, with an option to select power from a 5V USB port via a jumper switch;

q) wherein the tailgate acceleration is calculated using the equation (Dcm/450.0)−((KPH*0.6214/10))×(1.00−(AXg/SCALE;

wherein the Dcm is the distance in centimeters to the car behind, KPH is the speed of the vehicle in kilometers per hour, and AXg the acceleration in the x-direction in g's; and wherein pushbutton S1 toggles between displaying distance, acceleration, and tailgate data, and pushbutton S2 toggles between bar graph patterns including in-out, out-in, left-right, and right-left for the LED bar graphs.

2. The device of claim 1, wherein the car's OBD-II connector is plugged into a connector on the lower left of the steering wheel, and the other end is connected to the CAN-bus PCB.

3. The device of claim 1, wherein the CAN-bus PCB reads the car's velocity in kilometers per hour (KPH) and transmits it to the interface board PCB.

4. The device of claim 1, wherein the main MCU includes firmware to request the car's velocity and relay it via UART to the main MCU through the interface board.

5. The device of claim 1, wherein the accelerometer transmits acceleration data to the MCU pins, controlled by firmware.

6. The device of claim 1, wherein the UART distance sensor can measure distances up to several meters and transmits the data in centimeters to the MCU.

7. The device of claim 1, wherein pressing S1 and S2 together:
   a. first hold, calibrates the accelerometer,
   b. second hold, switches the character display between meters, feet, and yards, and
   c. third hold, toggles between bargraph pattern and tailgate (TG) or tailgate with acceleration (TA).

8. The device of claim 1, wherein the car driver's UART character display, controlled by firmware, shows:
   a. the distance to the car behind (in meters, yards, or feet),
   b. acceleration (in g's in the x-direction),
   c. tailgate distance with or without acceleration,
   d. pitch (in degrees),
   e. sensor data, and
   f. bar graph patterns.

9. The device of claim 1, wherein the two decoder ICs connected to the MCU drive the two-digit numeric display with a decimal point, measuring 6.0 inches high, located at the rear of the car, to display tailgate distance, acceleration, and related data.

10. The device of claim 1, wherein the MCU's 4k EEPROM retains:
    a. character display units (e.g., meters, feet, or yards),
    b. TG or TA settings,
    c. LED bar graph patterns, and
    d. calibration adjustments for the accelerometer and gyroscope.

11. The device of claim 1, wherein the 5V switching regulator powers the MCU PCB, providing a maximum current of 3.0 A, with an option to select power from a USB UART board.

12. The device of claim 1, wherein the 12V switching regulator powers the two-digit numeric display, providing a maximum current of 500 mA.

13. The device of claim 1, wherein the secondary MCU:
    a. accepts three data lines from the LED bar graph,
    b. uses a lookup table to select display lines for units on the alphanumeric display, and
    c. shows units such as 'm' (meters), 'Yd' (yards), 'g' (acceleration), 'Tg' (tailgate), and 'TA' (tailgate with acceleration).

14. The device of claim 1, wherein the decoder IC:
    a. receives three lines from the main MCU,
    b. triggers one of eight line drivers, and
    c. scans across 64 lines to produce bar graph patterns and display data via firmware.

15. The device of claim 1, wherein the 64 lines include:
    a. four lines for the minus sign on the numeric display,
    b. three lines for units selection on the alphanumeric display at the back of the car.

16. The device of claim 1, wherein the left-side bar graph switches between blue and yellow, controlled by the MCU via an inverted buffer IC and two high-current transistors.

17. The device of claim 1, wherein the right-side bar graph also switches between blue and yellow, controlled by the MCU via a buffer or inverted IC.

18. The device of claim 16, wherein the two transistors controlling the left or right bar graph ensure that when one transistor is on, the other is off, selecting the appropriate LED color.

19. The device of claim 1, wherein the right-side bar graph displays distance, acceleration, tailgate, and tailgate with acceleration, with:
    a. positive numbers represented in blue, and
    b. negative numbers represented in yellow.

20. The device of claim 19, wherein:
    a. a maximum negative measurement activates all yellow LEDs, and
    b. a maximum positive measurement activates all blue LEDs.

21. The device of claim 1, wherein the right-side bar graph can either remain unused or show y-axis accelerometer data, with LEDs lighting progressively from the left or right edge based on turning direction.

22. The device of claim 1, wherein the bar graph, configured in two levels, displays:
    a. distance,
    b. acceleration,
    c. tailgate distance, and
    d. tailgate with acceleration; where positive values are represented in blue, negative values in yellow, and patterns include in-out, out-in, left-right, and right-left.

23. The device of claim 1, wherein the LED bar graph displays a magnitude of the measurement, which is also simultaneously shown on the numeric display and the alphanumeric display for units.

24. The device of claim 1, wherein the 5V switching regulator powers the LED, delivering a maximum current of 3.0 A, and can alternatively draw power from a 5V USB UART board selectable via a jumper switch.

25. The device of claim 1, wherein pushbutton S1 is used to sequentially toggle through measurements displayed at the back of the car, including:
    a. yards,
    b. acceleration,
    c. tailgate distance,
    d. tailgate with acceleration, and
    e. meters, shown on the numeric display, alphanumeric display, and bar graph.

\* \* \* \* \*